United States Patent

Ulrich et al.

[15] 3,643,032

[45] Feb. 15, 1972

[54] COOPERATIVE PROCESSOR CONTROL OF COMMUNICATION SWITCHING OFFICE

[72] Inventors: Werner Ulrich, Glen Ellyn; Frank S. Vigilante, Naperville, both of Ill.

[73] Assignee: Bell Telephone Laboratories, Incorporated, Murray Hill, Berkeley Heights, N.J.

[22] Filed: Sept. 19, 1969

[21] Appl. No.: 859,470

[52] U.S. Cl. ....................179/18 ES

[51] Int. Cl. ....................H04q 3/54

[58] Field of Search ....................179/18 ES

[56] References Cited

UNITED STATES PATENTS 3,365,548 1/1968 Lucas et al. ....................179/18 ES

*Primary Examiner*—Kathleen H. Claffy
*Assistant Examiner*—Thomas W. Brown
*Attorney*—R. J. Guenther and R. B. Ardis

[57] ABSTRACT

A communications switching office in which each of a plurality of separate processors independently hunts idle paths between terminals of an associated network and in which two separate processors cooperatively hunt idle paths between terminals of the two associated networks by means of data messages exchanged between the two processors. A data transmission arrangement is provided between the processors and internetwork junctors provide connections between the networks.

22 Claims, 40 Drawing Figures

INVENTORS: W. ULRICH
F. S. VIGILANTE

BY: Daniel E. Nester
ATTORNEY

PATENTED FEB 15 1972

3,643,032

SHEET 13 OF 25

FIG. 16A
B-LINK WIRING PATTERN

| FROM JSF | | TO TSF |
|---|---|---|
| FRAME NO. | GRID NO. | SWITCH LEVEL NO. |
| EVEN | 0 | 0 |
| ,, | 1 | 1 |
| ,, | 2 | 2 |
| ,, | 3 | 3 |
| ODD | 0 | 4 |
| ,, | 1 | 5 |
| ,, | 2 | 6 |
| ,, | 3 | 7 |

FIG. 16B
B-LINK WIRING PATTERN

| FROM JSF | | TO TSF |
|---|---|---|
| FRAME NO. | SWITCH NO. | SWITCH NO. |
| 0,1 | 0,1 | 0 |
| 2,3 | 0,1 | 1 |
| 0,1 | 2,3 | 2 |
| 2,3 | 2,3 | 3 |
| 0,1 | 4,5 | 4 |
| 2,3 | 4,5 | 5 |
| 0,1 | 6,7 | 6 |
| 2,3 | 6,7 | 7 |

FIG. 16C
B-LINK WIRING PATTERN

| FROM JSF | TO TSF |
|---|---|
| SWITCH LEVEL NO. | GRID NO. |
| 0,4 | 0 |
| 1,5 | 1 |
| 2,6 | 2 |
| 3,7 | 3 |

FIG. 16D
B-LINK WIRING PATTERN

| FROM JSF | | TO TSF |
|---|---|---|
| SWITCH NO. | SWITCH LEVEL NO. | FRAME NO. |
| EVEN | 0–3 | 0 |
| ,, | 4–7 | 1 |
| ODD | 0–3 | 2 |
| ,, | 4–7 | 3 |

MESSAGE FORMAT

* WHEN BITS 9-7 SPECIFY EQT. BITS 5-0 WILL NOT BE MESSAGE TYPE BUT WILL SPECIFY THE TOTAL NO. OF WORDS TRANSMITTED.

EQT = END OF TRANSMISSION

** 1 = 1ST WORD OF MESSAGE
0 = NOT 1ST WORD OF MESSAGE

NO. OF WORDS TO FOLLOW = NO. OF WORDS IN MESSAGE MINUS THE CONTROL WORD.

"INITIAL" MESSAGE FORMAT

"HUNT" MESSAGE FORMAT

"CONNECTED" MESSAGE FORMAT

"RETRY" MESSAGE FORMAT

* MAY OR MAY NOT BE PRESENT; THIS DETERMINES THE SETTING OF BITS 12←10 IN WORD 0

"ANSWER" MESSAGE FORMAT

"PATH" MESSAGE FORMAT

"DISCONNECT" MESSAGE FORMAT

"DIGITS" MESSAGE FORMAT

"END CALL" MESSAGE FORMAT

COOPERATIVE PROCESSOR CONTROL OF COMMUNICATION SWITCHING OFFICE

BACKGROUND OF THE INVENTION

1. Field of the Invention

This invention is concerned with large communication switching offices and the control thereof by a plurality of interconnected cooperating data processors. Such system organizations are of particular interest with respect to the control of a large switching office which is divided into a plurality of independently controlled interconnected suboffices. Each suboffice is allocated a separate processor for control of its own network.

2. Description of the Prior Art

All communication switching offices are limited in size by the call processing capacity of the control arrangements which perform the administrative, supervisory and switching control functions for the office. In the past, when the call handling capacity of a communication switching office was exceeded due to an increased number of network terminations from and to which calls are serviced, an additional switching office was added. Additional network terminations were serviced by the new office.

It was previously recognized that time and equipment could be saved and other economies achieved by the provision of a data channel between the control circuits of two separate switching offices. For example, in the No. 5 crossbar switching system, an intermarker group channel was provided between the marker circuits of two switching offices. This arrangement is described briefly in U.S. Pat. No. 2,590,262 issued Mar. 25, 1952 to R. K. McAlpine. In this arrangement selected supervisory and administrative information is passed directly from the marker of the incoming office to the marker of the outgoing office by way of the data channel.

The aforenoted intermarker group arrangement caused a connection to be established through the network of one office from an incoming line or trunk to an intermarker group trunk. Information defining the intermarker group truck and the outgoing line or trucks was then transmitted to the marker of the other office and a connection established from the intermarker group trunk to the outgoing line or truck in the second office. At the time the network connection was established in the first office there was no guarantee that the outgoing line or trunk was not busy or that a path through the network of the second office was available. Accordingly, the connection established through the network of the first office might serve no useful purpose. Further, all control functions in the first office had to be completed before any action could be taken in the second office. Thus, noninterfering functions could not be performed concurrently in both offices and substantial time was consumed.

When a communication switching office is initially installed it is economical to provide only as much equipment as will be needed in the near future to provide service for the lines and trucks terminated in the office. Many areas in which such offices are installed experience substantial growth in line and trunk terminations in the course of time. The addition of completely separate switching offices for each increment of growth in service requirements is both technically complex and economically prohibitive.

It has been proposed in the past to divide the work functions of a switching office into categories and divide such functional work categories for a single switching office between a plurality of processors. Such an arrangement is described in U.S. Pat. No. 3,408,628 issued Oct. 29, 1968 to R. L. Brass et al. Such a system organization is economical when the initial office installation is for a relatively large number of network terminations. However, the division of system work functions amongst a plurality of processors is not economical when the initial office installation is relatively small. Furthermore, functional division is not as flexible because each further subdivision of tasks requires substantial rearrangements of equipment and/or the controlling programs.

SUMMARY OF THE INVENTION

It is an object of this invention to facilitate the orderly and economical growth of a small switching office installation into a large installation.

The networks of a plurality of independent switching suboffices are interconnected by groups of intersuboffice junctors. Each suboffice includes a separate processor which implements call processing for calls within or through that suboffice. Calls incoming to and outgoing from the same suboffice are processed independently by that suboffice. Calls incoming to one suboffice and outgoing from another suboffice are processed cooperatively by the processors of both suboffices by means of data messages transmitted between the processors. The incoming suboffice processor informs the outgoing suboffice of the call destination. The outgoing suboffice processor determines all idle network paths between the outgoing terminal and a group of the intersuboffice junctors connecting the networks of the incoming and outgoing suboffices. This partial path hunt information is sent over the data channel to the processor of the originating suboffice. The originating suboffice processor selects an idle path from the incoming terminal to an idle one of the same group of junctors between the incoming and outgoing suboffices and communicates this path hunt information to the outgoing suboffice processor. Both incoming and outgoing suboffices now have sufficient information to set up the necessary connections for establishing a complete communication path between the incoming and outgoing terminals. This communication path is established following the performance of other necessary supervisory and administrative functions in each of the suboffices.

In the event that any of the partial path hunts are not successful in finding an idle path, messages are exchanged which initiate another cooperative path hunt using a different group of intersuboffice junctors.

If the outgoing terminal is a specific trunk or line, a busy test is performed by the outgoing suboffice processor prior to the path hunt. If the line or trunk is found busy, a message is sent to the incoming suboffice processor which causes an appropriate tone to be connected to the incoming terminal.

In a copending application of D. A. Lawson, R. W. Peterson and A. A. Stockert, Ser. No. 638,500 filed May 15, 1967, there is disclosed a program controlled telephone switching system. The Lawson et al. application makes reference to another copending application of A. H. Doblmaier, R. W. Downing, M. P. Fabisch, J. A. Harr, H. f. May, J. S. Nowak and F. F. Taylor, Ser. No. 334,875 filed Dec. 31, 1963, wherein there is disclosed in greater detail a program controlled telephone switching system. Both of these applications are directed to aspects of the Bell System No. 1 ESS communication switching system. The Bell System Technical Journal of September, 1964, Parts I and II, also includes a description of the No. 1 ESS telephone switching system. The aforenoted applications and publication include a considerable amount of detailed description which is not necessary for a complete understanding of the present invention but which provides background for facilitating an understanding of the specific illustrative embodiment of the present invention described herein.

The above and other objects and features of this invention will be more readily understood from the following description when read with respect to the drawing in which:

FIGS. 1 and 2, when taken together as shown in FIG. 34, are a general block diagram of a communication switching office comprising two suboffices;

FIGS. 3–5, arranged as shown in FIG. 35, are a block diagram of a typical processor such as those shown in FIGS. 1 and 2;

Figures 1, 34:
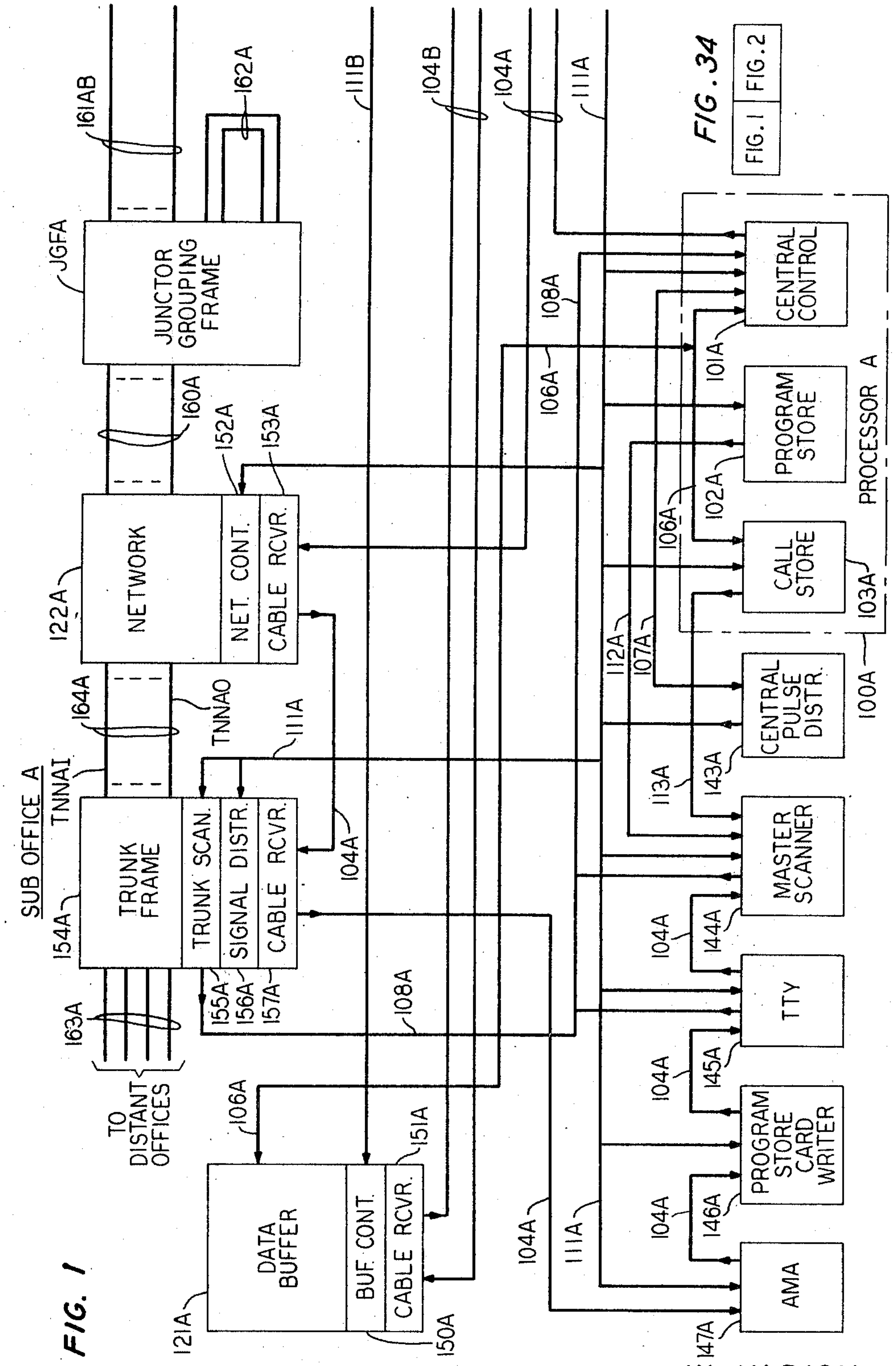
Figure 2:
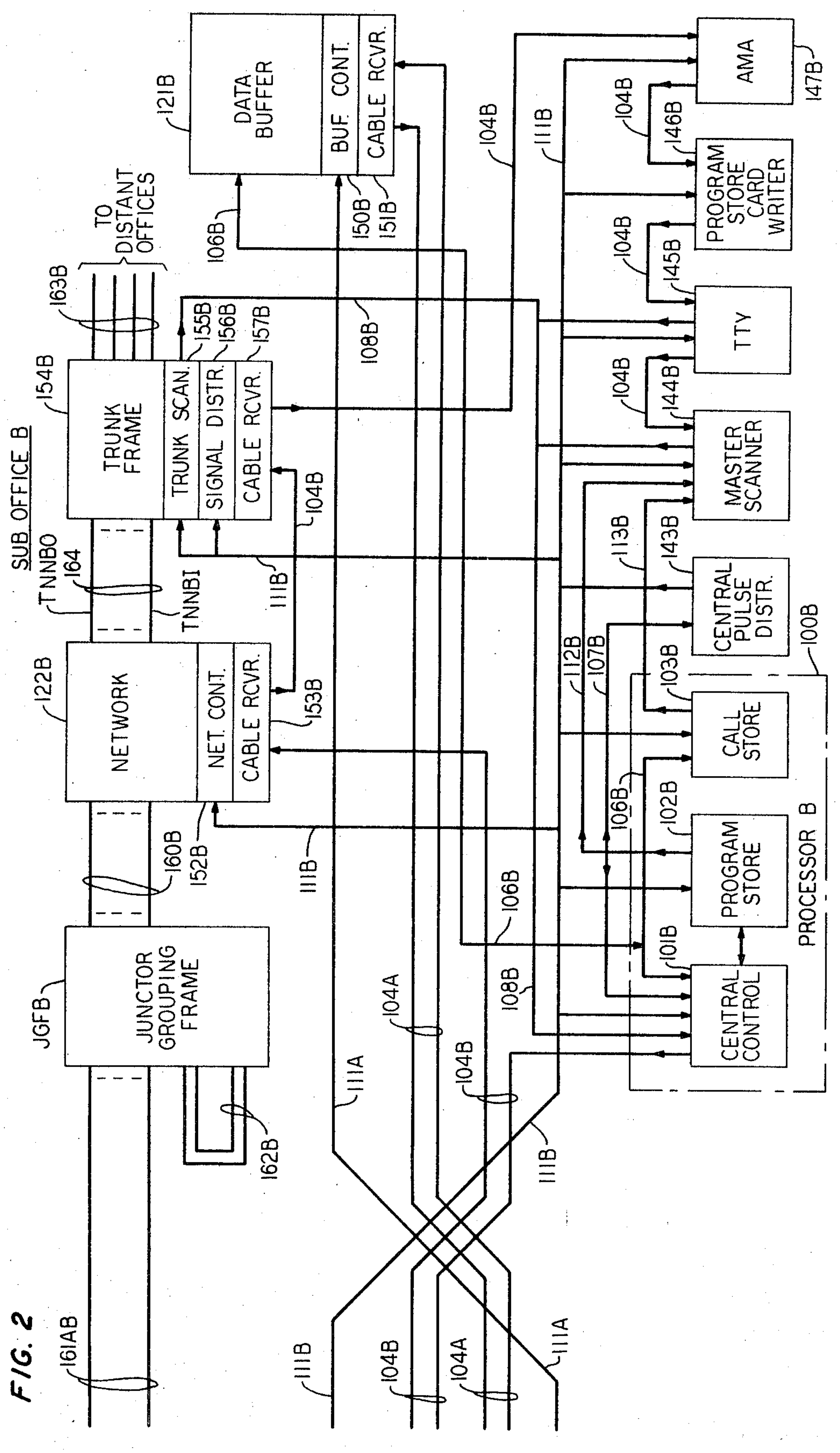
Figure 3:
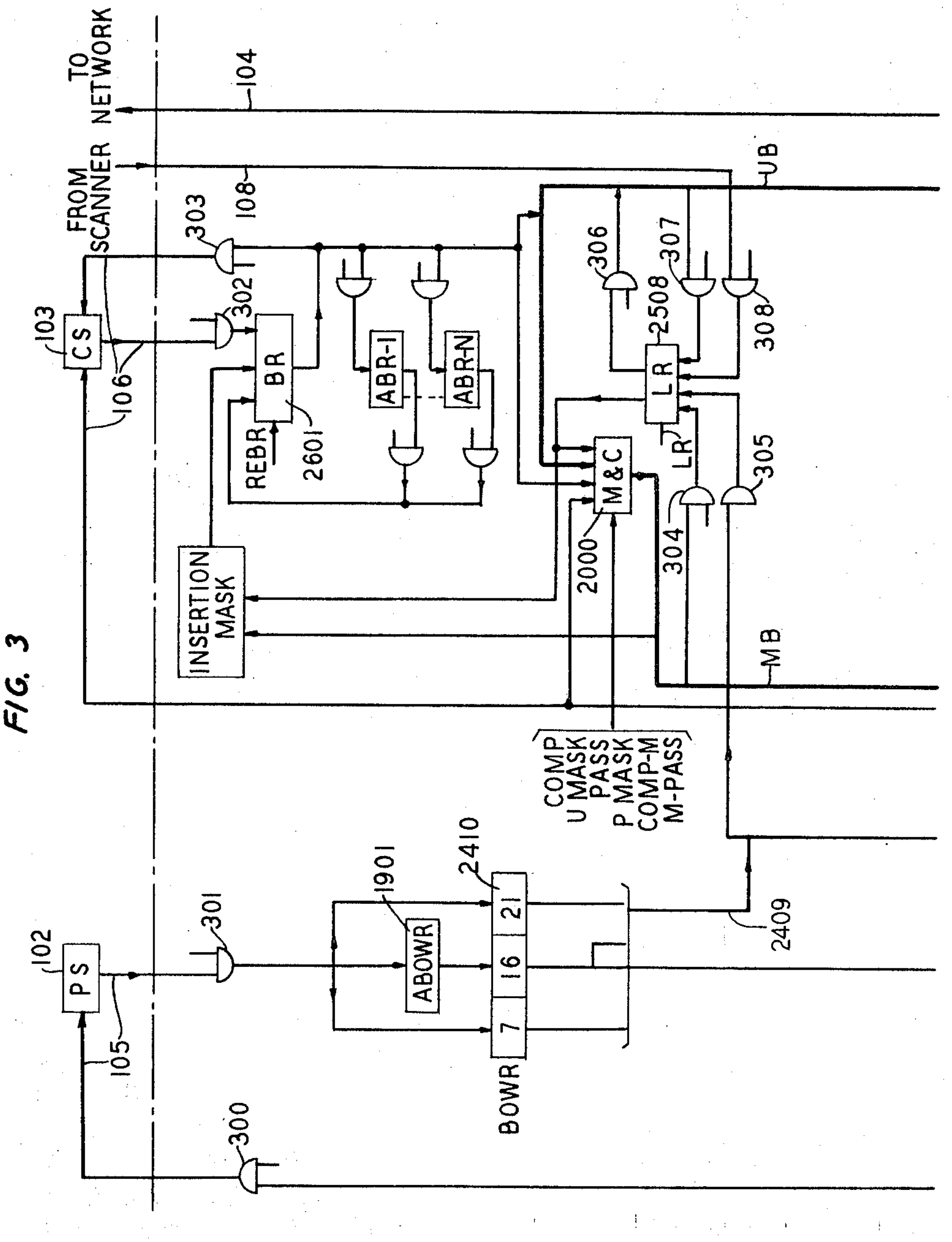
Figure 4:
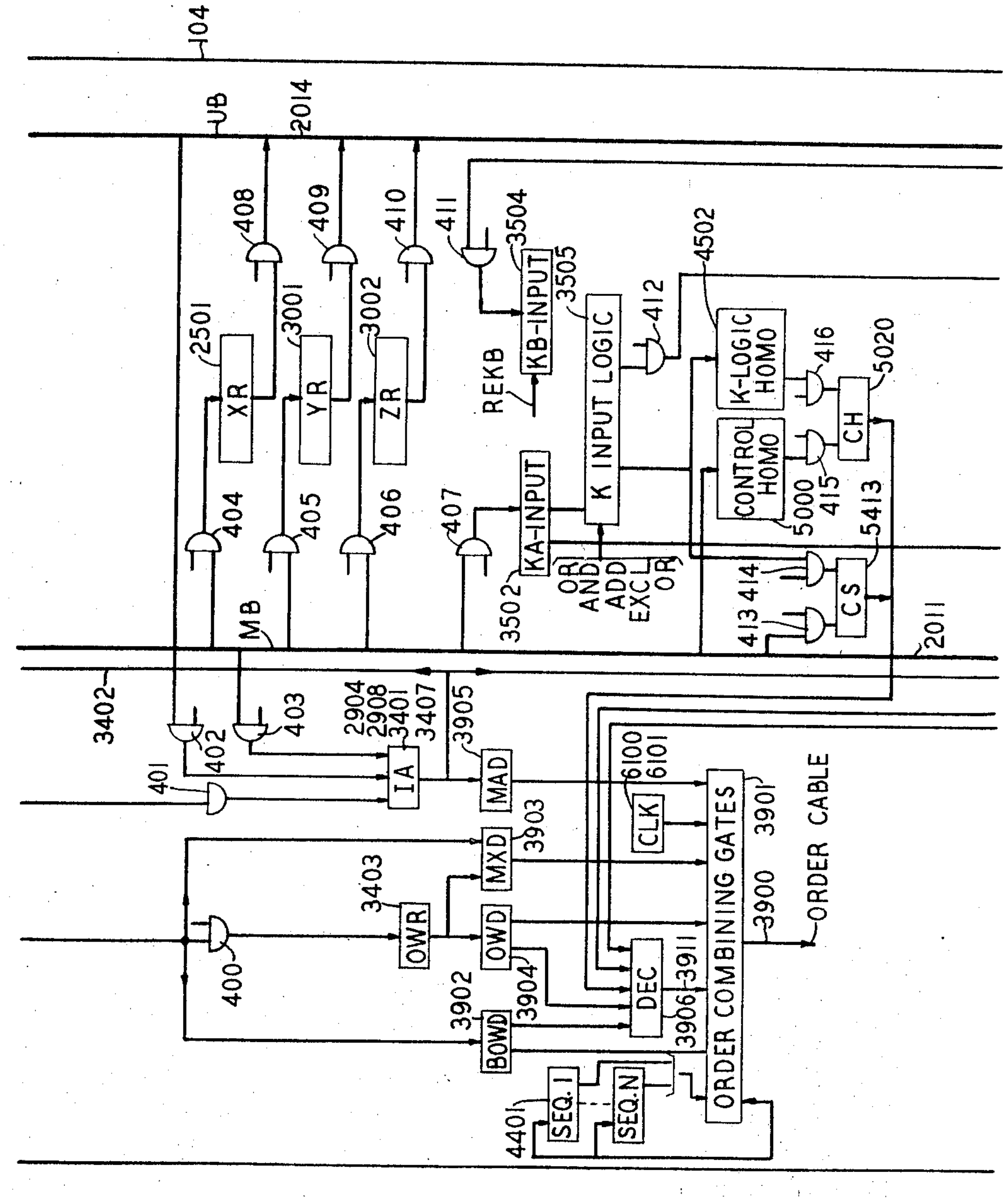
Figure 35:
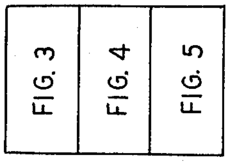
Figure 5:
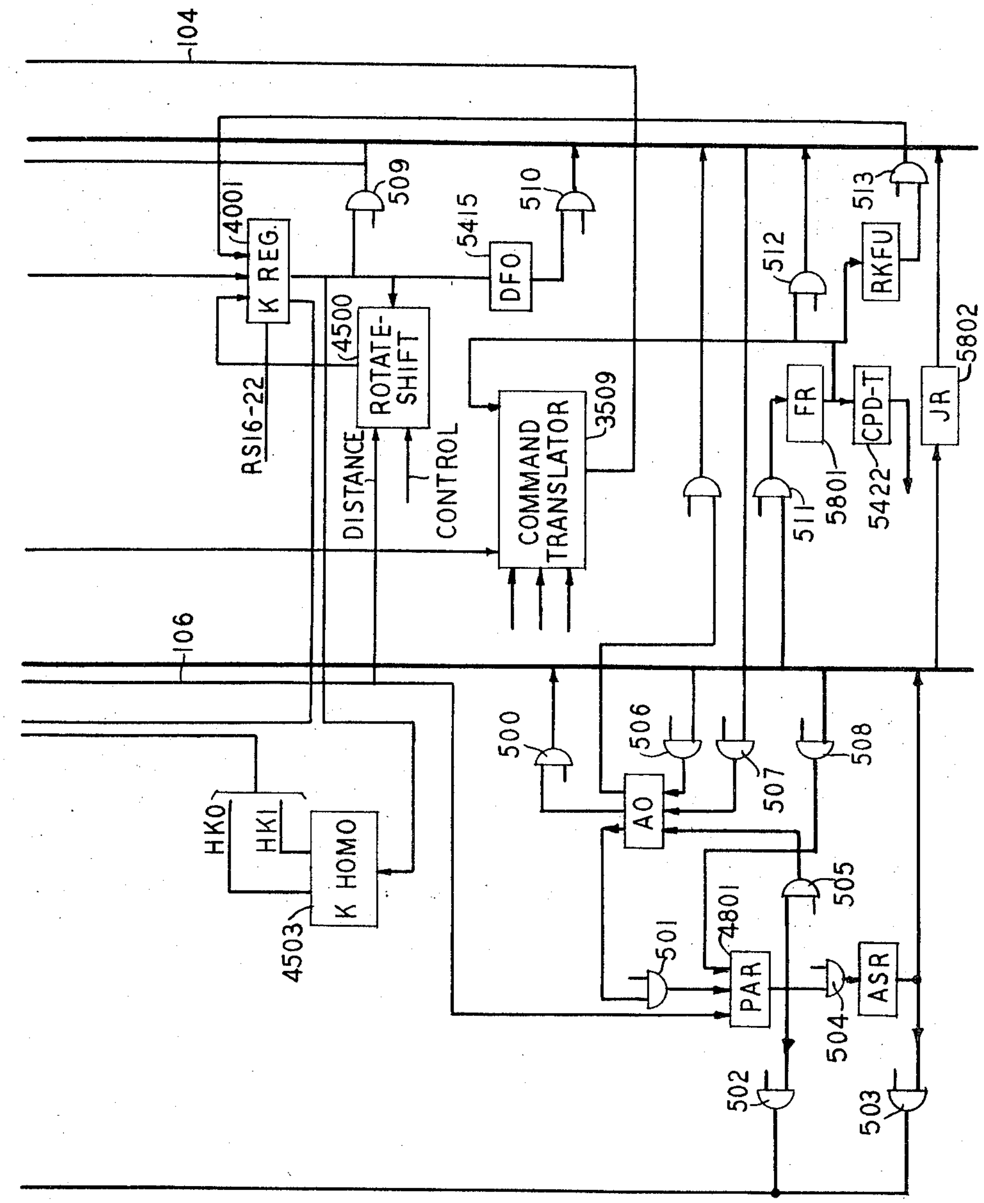
Figure 10:
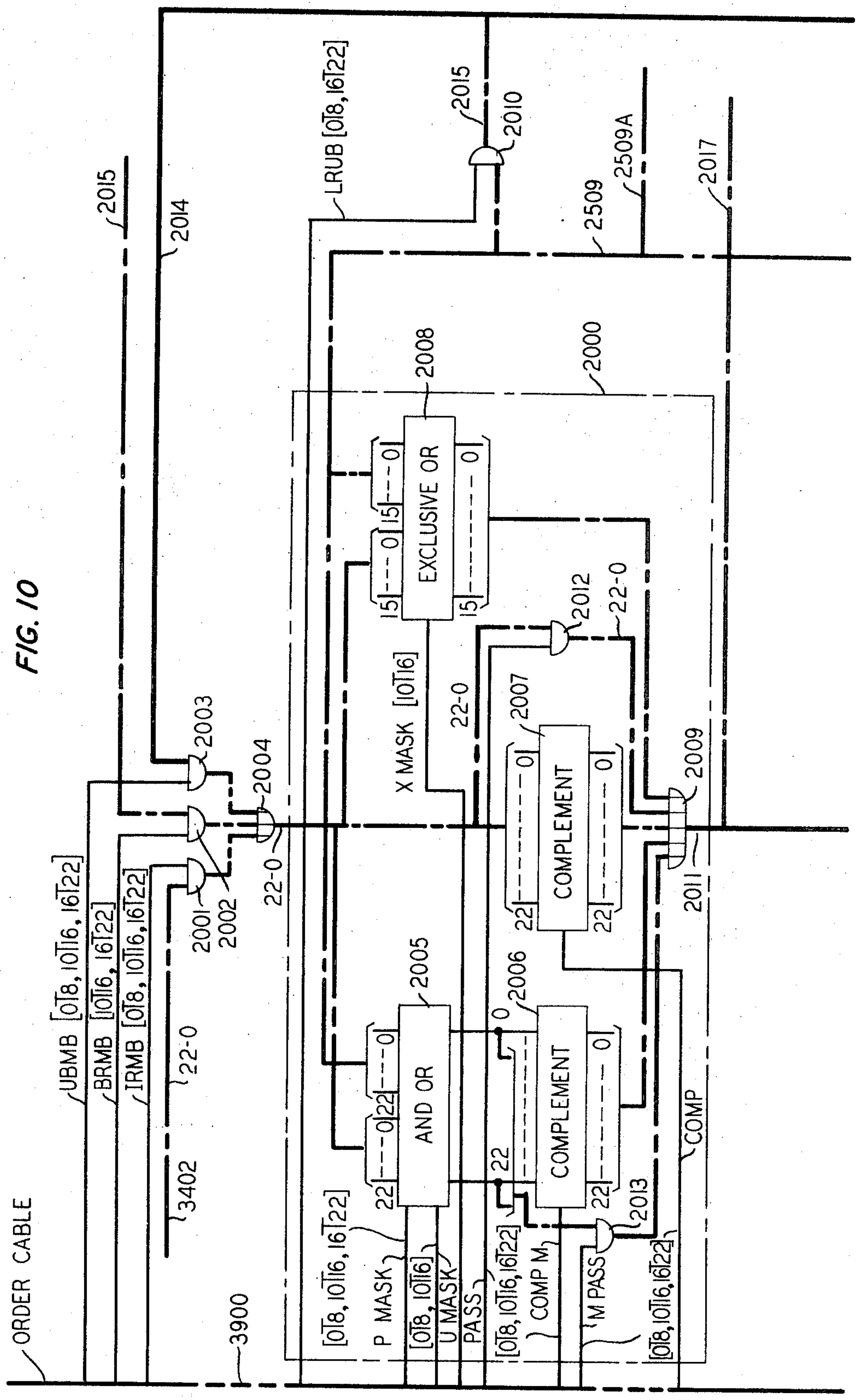
Figures 11, 36:
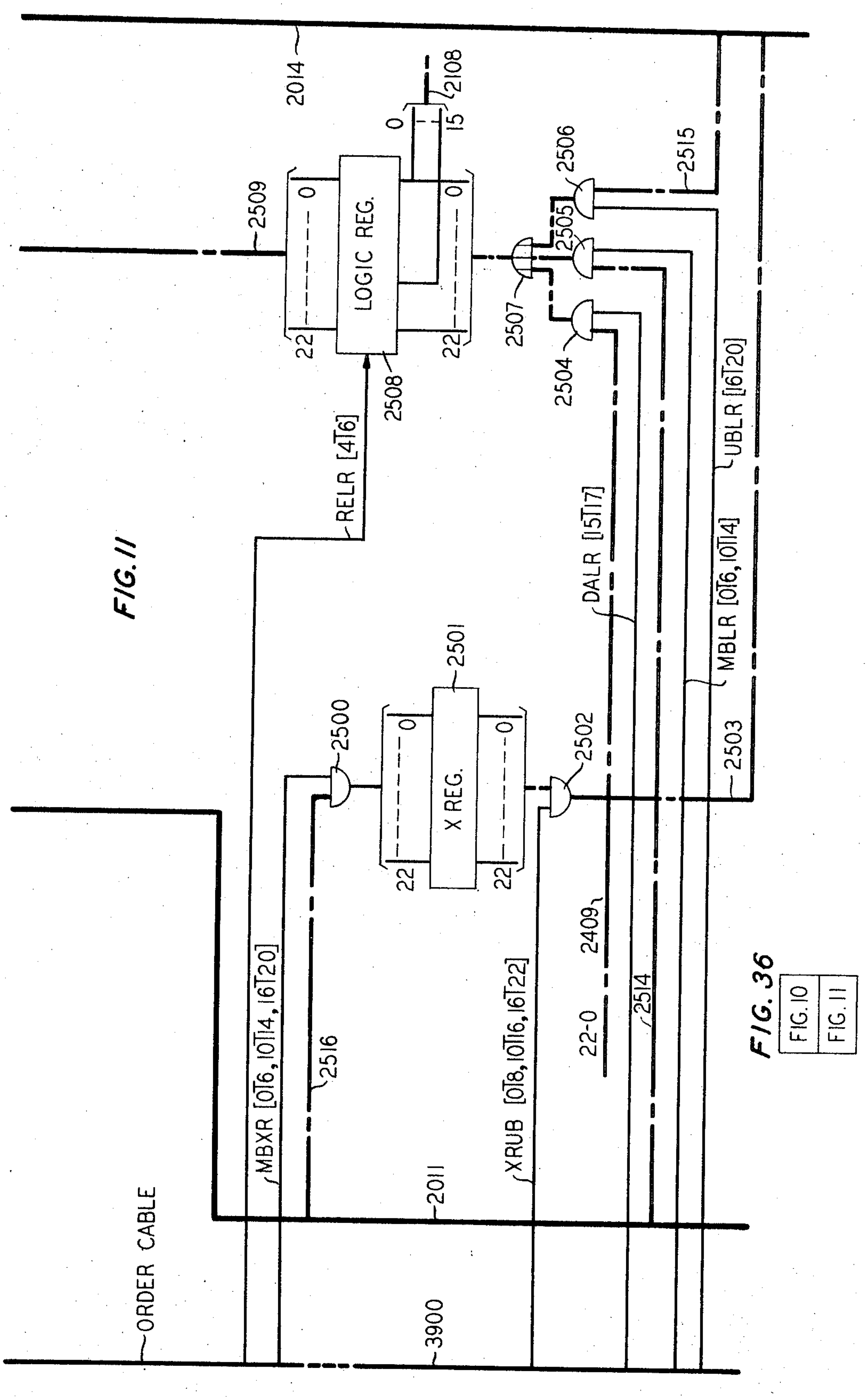
Figure 12:
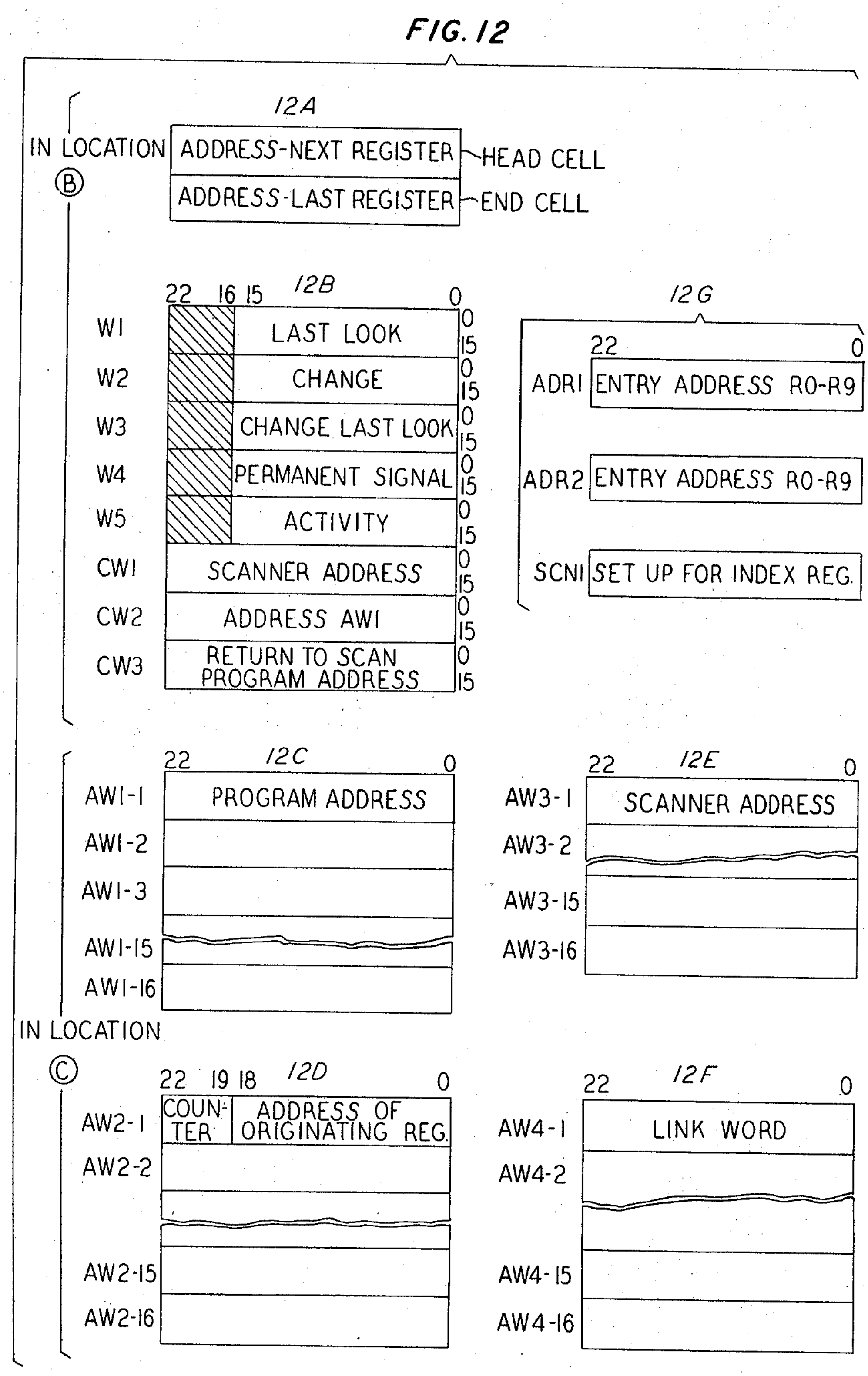
Figure 13:
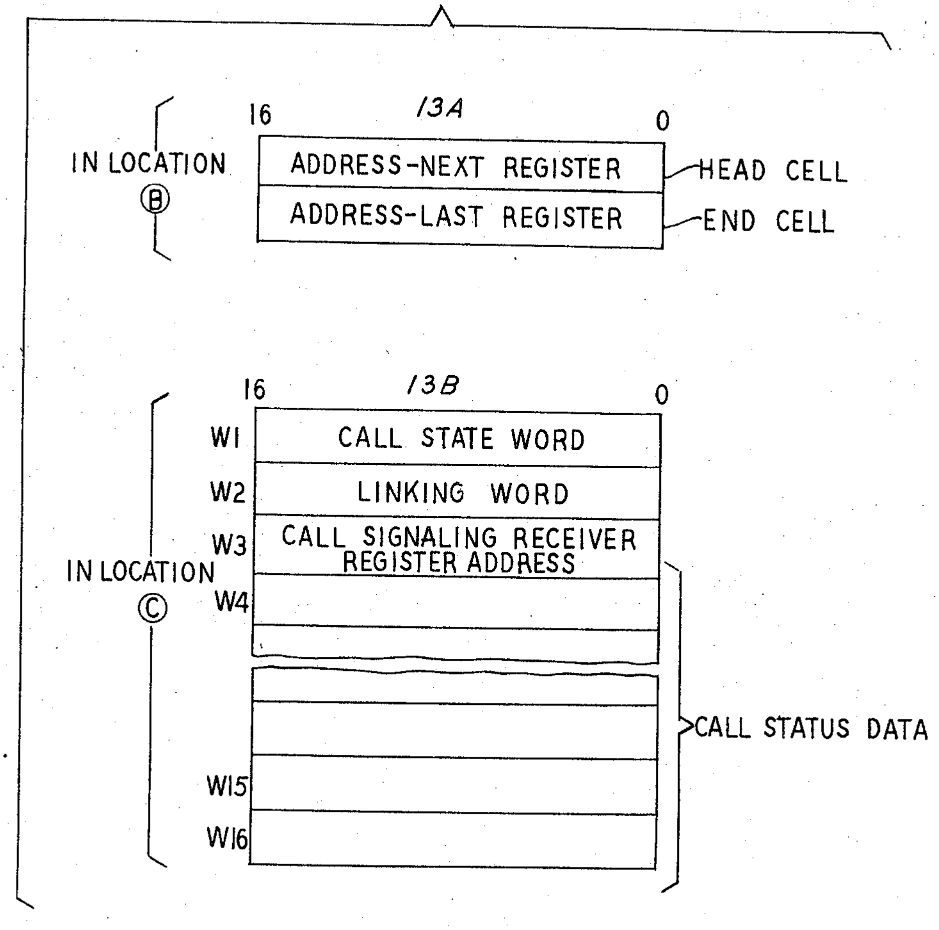
Figure 14:
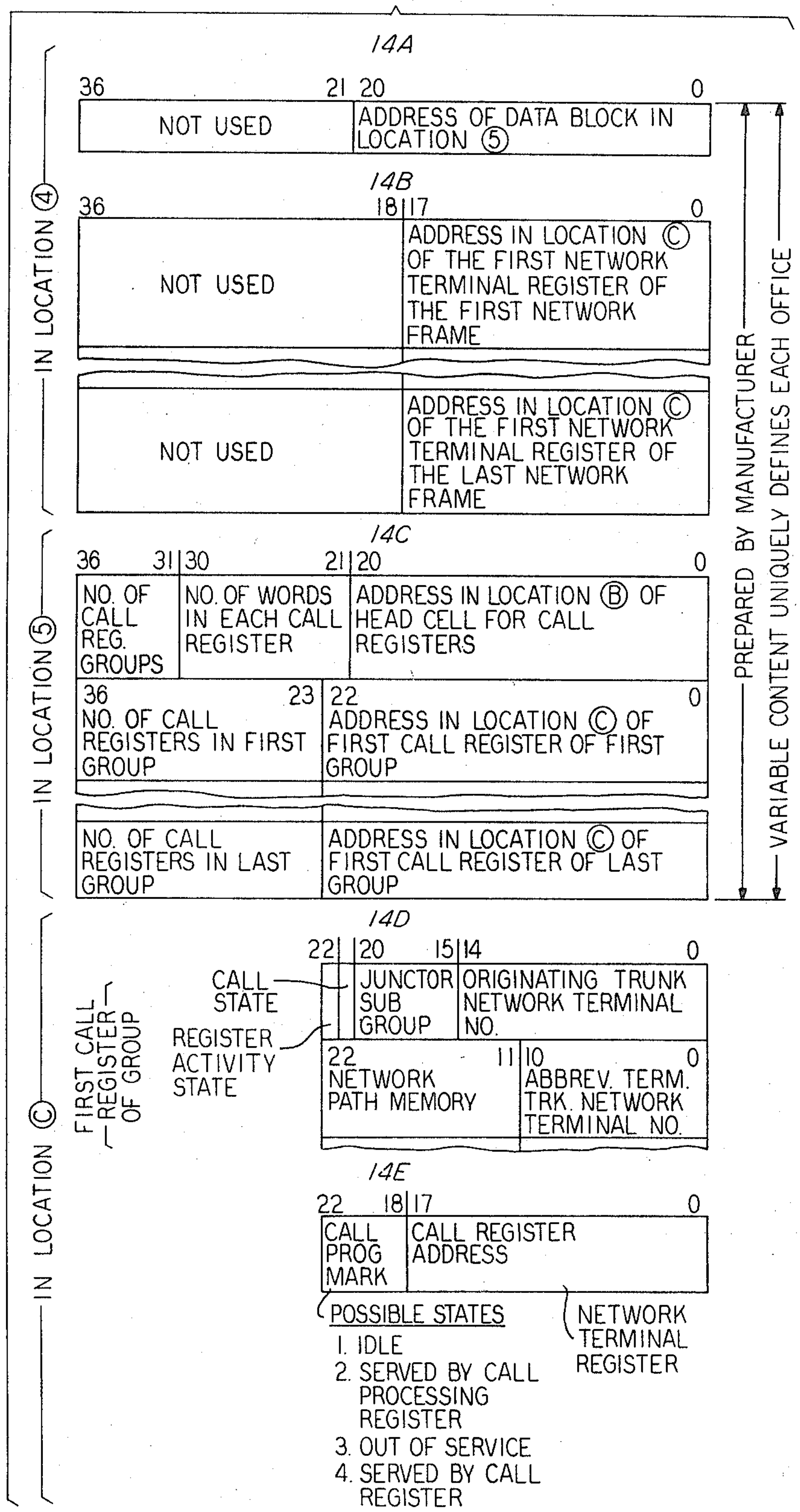
Figure 15:
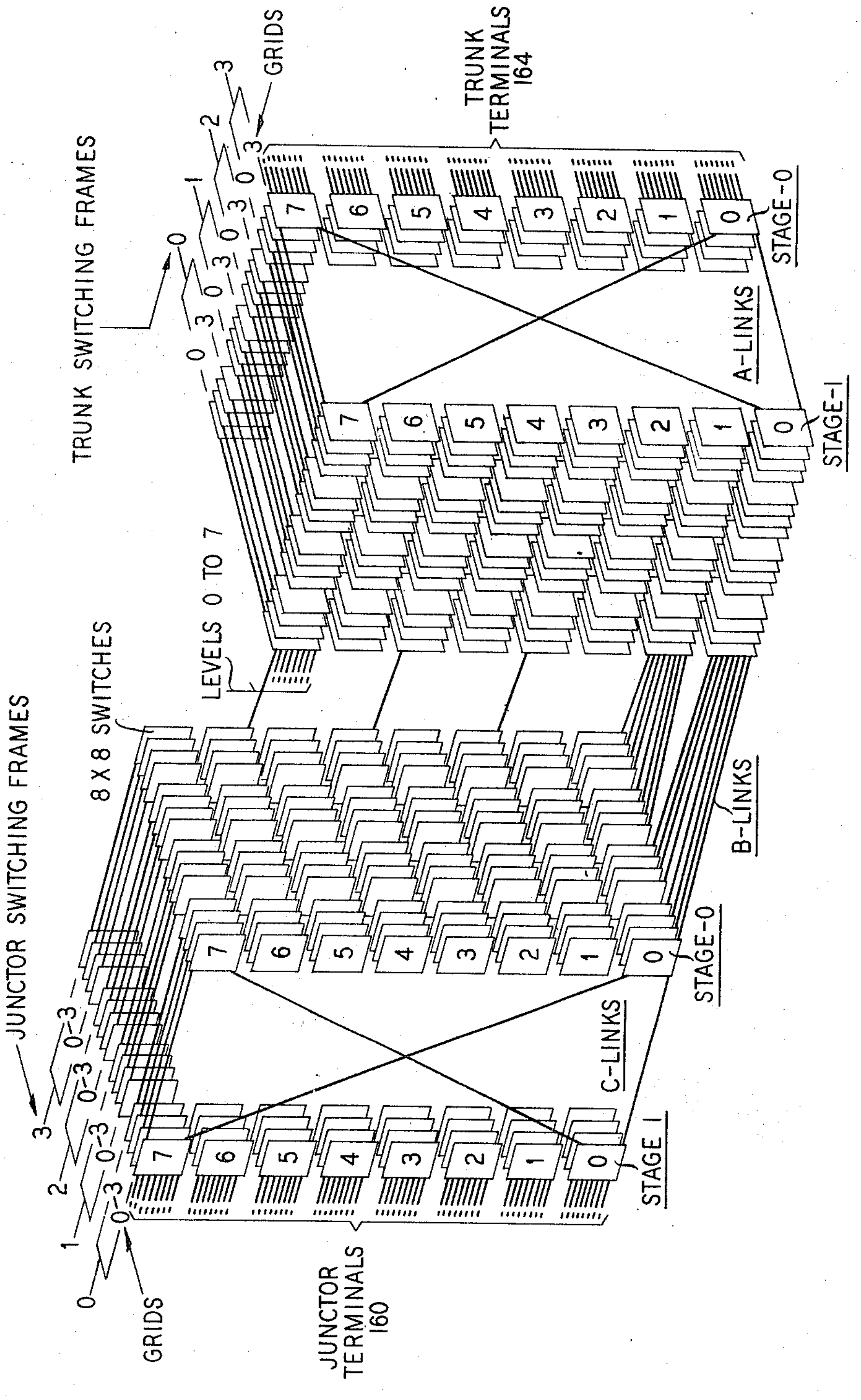
Figure 17:
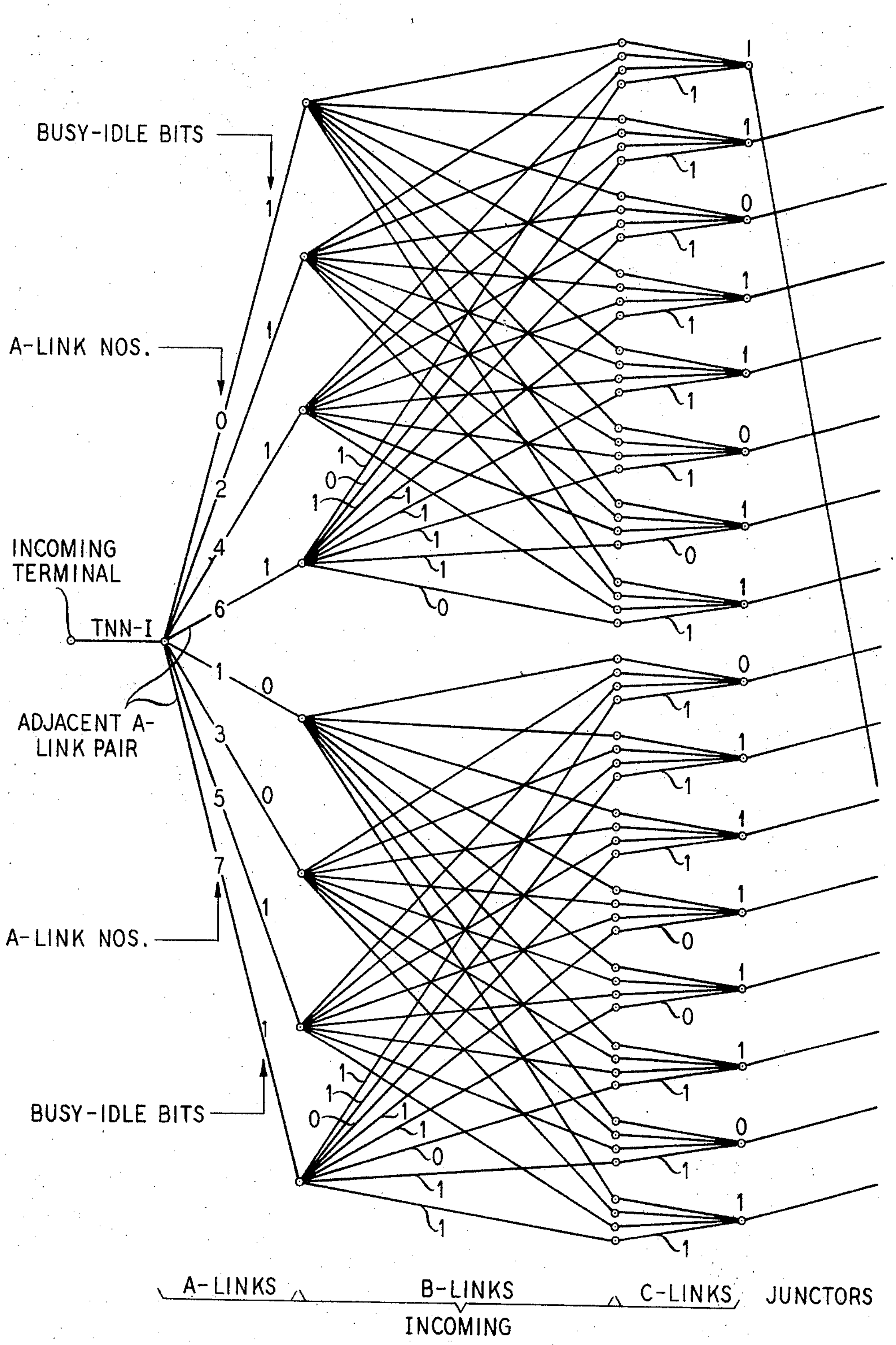
Figures 18, 33:
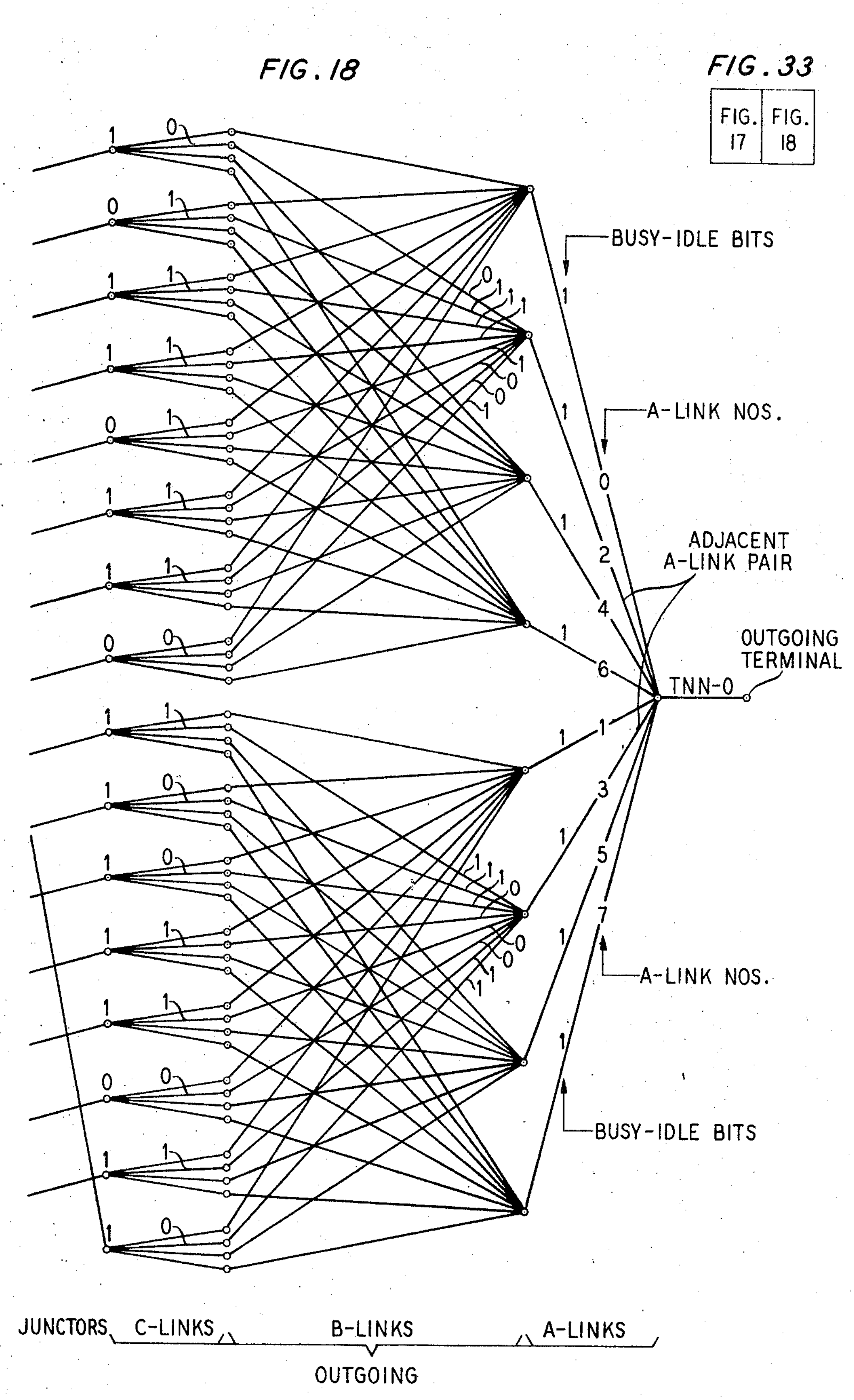
Figure 19:
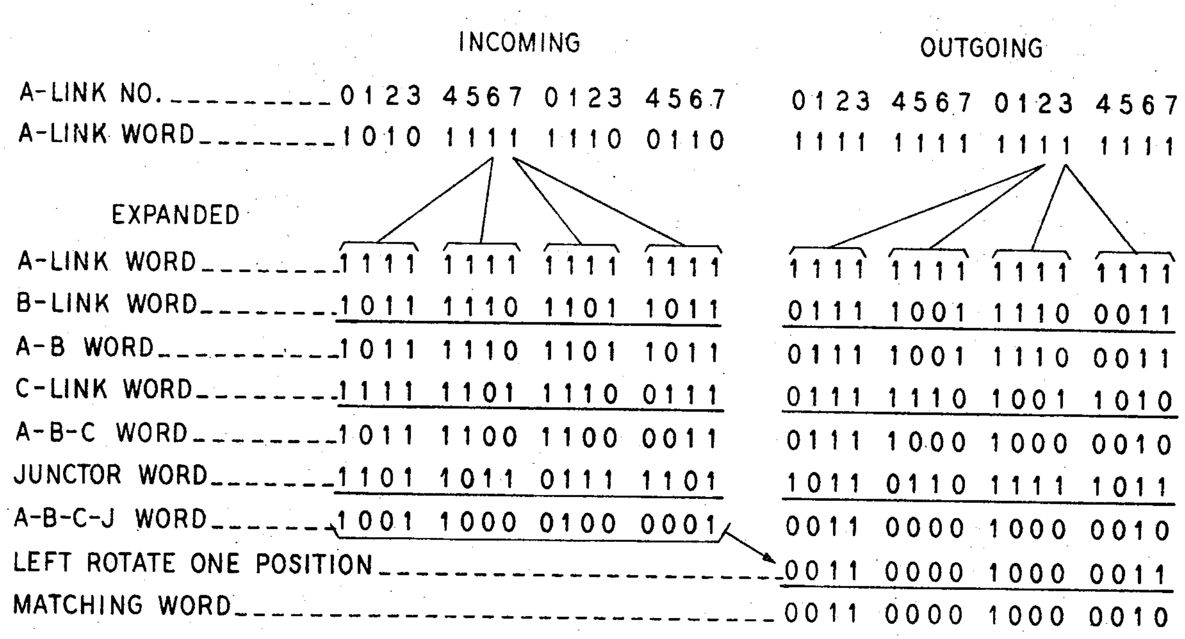
Figure 31:
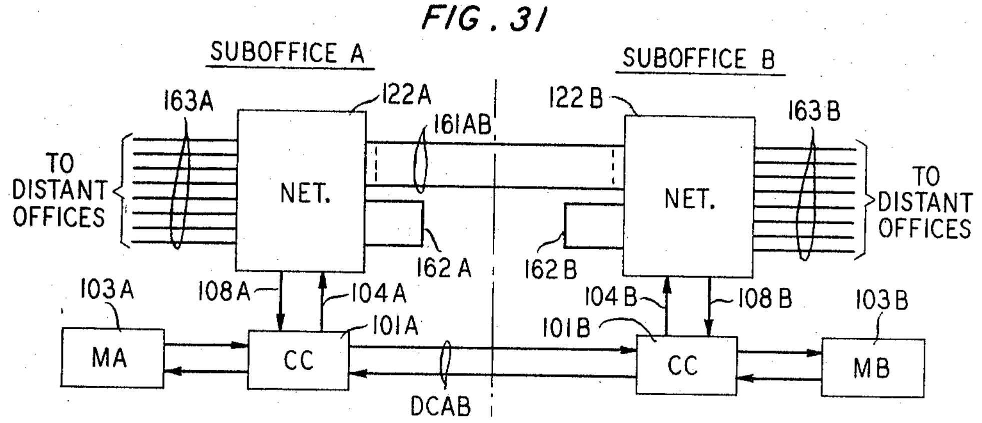
Figure 30:
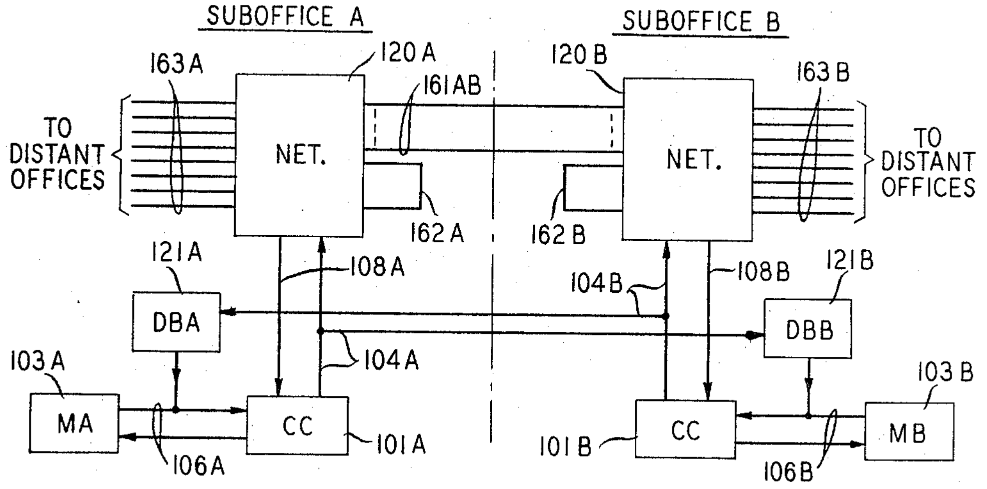
Figure 32:
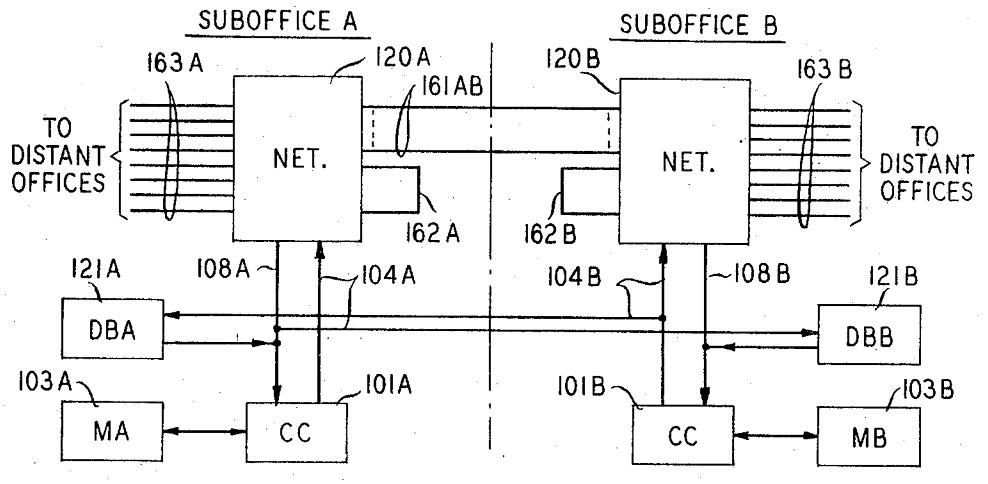

FIGS. 10 and 11, when arranged as shown in FIG. 36, show in detail a portion of the processor of FIGS. 3–5;

FIGS. 12–14 show a detailed organization of certain information within the memory;

FIG. 15 illustrates in detail the organization of a complete network such as those shown in FIGS. 1 and 2;

FIG. 16 is a group of tables defining the pattern of interconnection between and within the switch frames of the network shown in FIG. 15;

FIGS. 17 and 18, when arranged as shown in FIG. 37, illustrate the paths provided by one junctor subgroup between two network terminals of one suboffice network or of two interconnected suboffice networks;

FIG. 19 is a table illustrating the logical functions performed in a path hunt for an idle path between the network terminals shown in FIGS. 17 and 18;

FIGS. 20–29 illustrate the formats of data messages transmitted between the processors of the suboffices shown in FIGS. 1 and 2 in the course of processing an intersuboffice call;

FIGS. 30–32 illustrate in block diagram form various embodiments of the present invention; and FIGS. 33–36 are key diagrams showing the relationships between various other figures of the drawings.

The communications switching office shown in FIGS. 1 and 2 comprises two suboffices A and B connected together by intersuboffice junctors and data channels which will be described in more detail later herein. The equipment of suboffice B shown in FIG. 2 is a substantial duplicate of the equipment of suboffice A shown in FIG. 1. As seen in FIG. 1 the processor 100A comprises the central control 101A and the memory system, which in turn comprises program store 102A and call store 103A. The remaining elements shown in FIG. 1 may be classified as input-output devices. In this illustrative example, the trunk scanner 155A, the TELETYPE 145A, the data buffer 121A, and the master scanner 144A provide input signals to the processor 100A. The network controller 152A, the signal distributor 156A, the AMA 147A, the program store cardwriter 146A and the central pulse distributor 143A all comprise output devices for the processor 100A. Additionally, the data buffer 121B of suboffice B in FIG. 2 comprises an output device for central processor 100A.

The communications switching office of FIGS. 1 and 2 has as its principal objective the provision of switching service to demands originating from a plurality of communication paths 163A and 163B which connect the respective suboffice networks 122A and 122B to distant offices. The principal service rendered to the communication paths is the establishment of connections through the suboffice networks 122A and 122B in accordance with service demand information obtained from a calling or incoming communication path and the restoration of the communication paths and the network connections to idle states after a connection has served its purpose.

GENERAL DESCRIPTION

The following description is directed primarily to a single suboffice A. As stated earlier, the equipment configuration in each suboffice is a substantial duplicate of the other suboffices. The network 122A serves only to provide connections between terminals 164A and 160A and includes means for establishing and releasing such connections. The processor 100A maintains a record of the operational states, busy and idle, of all network terminals 164A and 160A and network links and also maintains a record of the makeup of every established or reserved path through the network 122A. These status records concerning elements of the network 122A are maintained in call store 103A of processor 100A. The record relating to the busy-idle states of the network elements is referred to herein as the network map. The record of the makeup of the established and reserved paths through the network 122A is termed a path memory. The processor 100A interprets demands for connections between specific pieces of equipment. For example, a demand from an incoming terminal TNNAI for a connection to an outgoing terminal TNNAO is interpreted by the processor 100A. In response to the demand information and interpretation thereof, processor 100A determines an available connection through the network 122A by examining the connection requirements and the aforenoted network map.

NETWORKS

The following brief description of one illustrative embodiment of the network 122A is presented to provide background information for an understanding of the present invention. The trunk circuits for trucks 163A are located in the trunk frame 154A and terminate on terminals 164A on one side of the network 122A. The terminals 160A on the other side of network 122A are termed junctor terminals. Connections between trunk circuits, both of which are terminated on the same network 122A, are established through junctor grouping frame JGFA by way of intraoffice junctors 162A. Connections between a trunk circuit terminated on network 122A and a trunk circuit terminated on the network of a different suboffice, e.g., network 122B of suboffice B, are established by way of intersuboffice junctors 161AB. Additionally, in the trunk frame 154A there are a number of service circuits which also terminate on the terminals 164A of network 122A. The several service circuits provide the various tones required in the office, e.g., dial tone, ringing tone, audible tone, etc., and provide for the collection and transmission of call signaling information. During the course of establishing a connection through the network 122A between two trunk circuits, connection are first established from the trunk circuits to be connected to service circuits. Subsequently, talking path connections are completed between the two trunk circuits in accordance with information obtained from a calling trunk.

Network 122A comprises four switching stages without concentration between the terminals 164A and the junctor terminals 160A. The junctor terminals 160A either are directly connected in accordance with a prescribed pattern to others of junctor terminals 160A of the same network 122A or are directly connected in accordance with a prescribed pattern to junctor terminals 160B (FIG. 2) of the network 122B of a different suboffice B. The junctor grouping frame JFGA serves as a cross section medium for connecting the junctors in the aforenoted prescribed patterns. A similar junctor grouping frame JGF- is provided in each of the other suboffices, e.g., frame JGFB of suboffice B. Thus, it is possible to complete a path through the network 122A between two trunk circuits terminating on the same suboffice network 122A or between trunk circuits terminating on different suboffice networks, e.g., networks 122A and 122B. For purposes of the immediately preceding discussion, connections between trunk circuits and service circuits may be completed only through a single suboffice network.

Control of the network 122A and control and supervision of the trunk and service circuits of trunk frame 154A is distributed through a number of control and supervisory circuits. This distribution of control and supervision provides a buffer between the high-speed processor 100A and the slower network elements. The principal control and supervisory elements are listed below.

1. The network control circuits, e.g., 152A, accept commands from the processor 100A via the peripheral bus 104A and the enable cable 111A. In response to such commands, the network control 152A selectively establishes portions of a selected path through the network 122A.

2. The trunk scanner 155A comprises a ferrod scanning matrix to which elements of the trunk circuits and the service circuits in trunk frame 154 are connected for purposes of determining the supervisory states of the connected elements. The trunk scanner 155A responds to commands from the processor 100A over the peripheral bus 104A and the enable cable 111A. The trunk scanner 155A transmits to the processor 100A indications of the supervisory states of a selected group of circuit elements defined by the command. In this one illustrative embodiment, the scanning elements, i.e., ferrods, are arranged in ordered groups of 16 elements each.

3. The signal distributor 156A, in response to commands from the processor 100A via the peripheral bus 104A and the enable cable 111A, provides an operate or a release signal on a selected signal distributor output terminal. Signal distributor output signals are employed to operate and release control relays in the trunk and service circuits of trunk frame 154A. A magnetically latched relay is used in the circuits for purposes of releasing transmission paths and for circuit control in general. The signal distributors generate operate signals of a first plurality and release signals of an opposite plurality. The output signals comprise short pulses.

A more complete description of the control and supervision of a switching network including a subnetwork such as 122A is presented in U.S. Pat. No. 3,281,539 issued Oct. 25, 1966, to K. S. Dunlap et al. The descriptions of the networks 122A and 122B presented herein are sufficiently detailed to provide an understanding of the invention. Further details may be ascertained by reference to the aforenoted Dunlap et al. patent.

Data Buffers 121A and 121B

The data buffer 121A accepts data messages on command from processor 100B of suboffice B (FIG. 2) transmitted via peripheral bus 104B and enable cable 111B. Data buffer 121A transmits data messages stored therein to central control 101A on command from processor 100A. In this one illustrative embodiment, data buffer 121A comprises a memory organization similar to that of call store 103A. Messages received over peripheral bus 104B from processor 100B are stored in successive memory locations in the data buffer 121A. Information is retrieved by central control 101A from data buffer 121A over the same memory communications system 106A and in the same manner employed by central control 101A to access call store 103A. The communications system 106A and in the same manner employed by central control 101A to access call store 103A. The communication between a central control and a call store such as 101A and 103A is fully described in the aforenoted Doblmaier et al. patent application and in the aforementioned Bell System Technical Journal publication. No further description is presented herein.

In this one specific illustrative embodiment, the peripheral bus 104A serves as a data channel from processor 100A of suboffice A to processor 100B of suboffice B utilizing data buffer 121B of suboffice B as a temporary buffer for transmitted data messages. Similarly, peripheral bus 104B of suboffice B to processor 100A of suboffice A. As described in the above-noted Dunlap et al. patent and Bell System Technical Journal publication, the enable cables 111A and 111B of the respective suboffices A and B are employed to transmit signals which enable the appropriate peripheral units of the office. Thus, when data messages are transmitted from a processor, e.g., 100A, in one suboffice to a data buffer, e.g., 121B, in the other suboffice, enable signals on the enable cable, e.g., 111A, of the transmitting office are used to enable the appropriate data buffer, e.g., 121B, in the receiving office.

DETAILED DESCRIPTION

Processors 100A and 100B

A processor 100, as seen in FIGS. 1 and 2, comprises a central control 101, a program store 102, and a call store 103. The central control 101, shown below the dotted line in FIG. 3 and in FIGS. 4 and 5, performs system data processing functions in accordance with sequences of program order words. The program order words fall into two general classifications, namely, decision orders and nondecision orders.

Decision orders are generally employed to institute desired actions in response to present conditions with regard to trunks served by the switching system or present conditions with respect to the maintenance of the system.

Decision orders dictate that a decision shall be made in accordance with certain observed conditions and the result of the decision causes the central control 101 to advance to the next order of the current sequence of order words or to transfer to an order in another sequence of order words. Decision orders are also termed "conditional transfer orders."

Nondecision orders are employed to communicate with units external to central control 101 and to both move data from one location to another to logically process the data in accordance with certain defined instructions. For example, data may be merged with other data by the logical functions of AND, OR, EXCLUSIVE-OR, product mask, et cetera, and also data may be complemented, shifted, and rotated.

Nondecision orders perform some data processing and/or communicating actions, and upon completion of such actions most nondecision orders cause the central control 101 to execute the next order in the sequence. A few nondecision orders are termed unconditional transfer orders and these dictate that a transfer shall be made from the current sequence of program orders to another sequence of order words without benefit of a decision.

The sequences of order words which are stored principally in the program store comprise ordered lists of both decision and nondecision orders which are intended to be executed serially in time. The processing of data within the central control is on a purely logical basis; however, ancillary to the logical operations, the central control 101 is arranged to perform certain minor arithmetic functions. The arithmetic functions are generally not concerned with the processing of data but, rather, are primarily employed in the process of fetching new data from the memories such as from the program store 102, the call store 103, or particular flip-flop registers within the central control 101.

The central control 101, in response to the order word sequence, processes data and generates and transmits signals for the control of other system units. The control signals which are called commands are selectively transmitted to the program store 102, the call store 103, and to the input-output.

The central control 101 is, as its name implies, a centralized unit for controlling all of the other units of the system. A central control 101 principally comprises:

A. A plurality of multistage flip-flop registers, such as XR, YR, ZR, JR and K reg;

B. A plurality of decoding circuits, such as OWD, BOWD and MXD;

C. A plurality of private bus systems for communicating between various elements of the central control, such as the masked bus MB and the unmasked bus UB;

D. A plurality of receiving circuits for accepting input information from a plurality of sources, such as gates 301, 302, 308;

E. A plurality of transmitting circuits for transmitting commands and other control signals, such as gates 300, 303, 502, 503 and the command translator;

F. A plurality of sequence circuits, such as SEQ1–SEQN;

G. Clock sources, such as CLK; and

H. A plurality of gating circuits (order combing gates) for combining timing pulses with DC conditions derived within the system.

The operation of these elements is further described in the above-mentioned Doblmaier et al. application.

The central control 101 is a synchronous system in the sense that the functions within the central control 101 are under the control of a multiphase microsecond clock 4CLK–CLK which provides timing signals for performing all of the logical functions within the system. The timing signals which are derived from the clock 4CLK–CLK are combined with DC signals from a number of sources in the order combining gate circuit. The details of the order combining gate circuit are not shown in the drawing as the mass of this detail would merely tend to obscure the inventive concepts of this system.

Sequence of Central Control Operations

All of the system functions are accomplished by execution of the sequences of orders which are obtained from the program store 102 or the call store 103. Each order of a sequence directs central control 101 to perform one operational step. An operational step may include several logical operations as set forth above, a decision where specified, and the generation and transmission of commands to other system units.

The central control 101 at the times specified by phases of the microsecond clock 6100 performs the operational step actions specified by an order. Some of these operational step actions occur simultaneously within central control 101, while others are performed in sequence. The basic machine cycle, which in this one illustrative embodiment is 5.5 microseconds, is divided into three major phases of approximately equal duration. For purposes of controlling sequential actions within a basic phase of the machine cycle each phase is further divided into one-half microsecond periods which are initiated at one-quarter microsecond intervals.

The basic machine cycle for purposes of designating time is divided into one-quarter microsecond intervals, and the beginning instants of these intervals are labeled T0 through T22. The major phases are labeled phase 1, phase 2, and phase 3. These phases occur in a 5.5 microsecond machine cycle as follows:

A. Phase 1–T0 to T8,

B. Phase 2–T10 to T16,

C. Phase 3–T16 to T22.

For convenience in both the following description and in the drawing, periods of time are designated *b T e* where *b* is the number assigned the instant at which a period of time begins and *e* the number assigned the instant at which a period of time is ended. For example, the statement 10T16 defines phase 2 which begins at time 10 and ends at time 16.

The clock 6100,6101 comprises a microsecond clock 6100 and a millisecond clock 6010. The microsecond clock 6100 generates output signals which are transmitted to the order combining gate 3901. Further, the microsecond clock 6100 provides input signals to the millisecond clock 6101. These input signals occur once every 5.5 microseconds.

The millisecond clock 6101 comprises 12 binary counter stages along with counter recycling circuitry. The 12 stages are arranged as a series of recycling counters, the output of each counter providing an input to the next succeeding counter. Stages 1 through 4 provide a count of 13 and thus, with 5.5 microsecond input signals, provide an output signal once every 71.5 microseconds. Stages 5 through 7 provide a count of seven and thus, with an input once every 71.5 microseconds, provide an output once every 500.5 microseconds (once per half millisecond). Stage 8 provides a count of two and thus, with a half-millisecond input interval, provides an output pulse once every millisecond. Stages 9, 10, and 11 provide a count of five and, with input pulses once per millisecond, provide output pulses once every 5 milliseconds. Stage 12 provides a count of two and thus, with input pulses once every 5 milliseconds, provides an output pulse once every 10 milliseconds.

The output conductors of the "1" side of each counter stage of the millisecond clock 6101 are connected to the order combining gate circuit 3901.

In order to maximize the data processing capacity of central control 101 three-cycle overlap operation is employed. In this mode of operation central control simultaneously performs:

A. The operational step for one instruction;

B. Receives from the program store 102 the order for the next operational step; and C. Sends an address to the program store 102 for the next succeeding order.

Three-cycle overlap operation is made possible by the provision of both a buffer order word register 2410, an order word register 3403 and their respective decoders, the buffer order word decoder 3902 and the order word decoder 3904. A mixed decoder 3903 resolves conflicts between the program words in the order word register and the buffer order word register 2410. The auxiliary buffer order word register 1901 absorbs differences in time of program store response.

The initial gating action signals for a first order X (herein designated the indexing cycle) are derived in the buffer order word decoder 3902 in response to the appearance of order X in the buffer order word register 2410. The order X is gated to the order word register 3403 (while still being retained in the buffer order word register 2410 for the indexing cycle) during phase 3 of cycle 2; upon reaching the order word register 3403 the final gating actions (herein indicated as the execution cycle) for the order X are controlled via order word decoder 3904.

The indexing cycle and the execution cycle are each less than a 5.5 microsecond machine cycle in duration. In the executing of the operational steps of a sequence of single cycle orders each order remains in the order word register 3403 and the buffer order word register 2410 for one 5.5 microsecond cycle. The buffer order word decoder 3902 and the order word decoder 3904 are DC combinational circuits; the DC output signals of the decoders are combined with selected microsecond clock pulses in the order combining gate circuit 3901. This order combining gate circuit 3901 thus generates the proper sequences of gating signals to carry out the indexing cycle and the execution cycle of each of the sequence of orders in turn as they appear first in the buffer order word register 2410 and then in the order word register 3403.

The performance of the operational steps for certain orders requires more time than one operational step period, i.e., more than 5.5 microseconds. This requirement for additional time may be specified for directly by the order; however, in other instances this requirement for additional time is imposed by indicated trouble conditions which occur during the execution of an order. Where an order specifies that the execution thereof will require more than one operational step period, the additional processing time for that order may be gained by:

1. Performing the additional data processing during and immediately following the indexing cycle of the order and before the execution cycle of the order; or 2. Performing the additional data processing during said immediately after the normal execution cycle of the order.

The performance of these additional work functions is accomplished by way of a plurality of sequence circuits within central control 101. These sequence circuits are hardware configurations which are activated by associated program orders or trouble indications and which serve to extend the time in the operational step beyond the normal operational step period. The period of time by which the normal operation step period is extended varies depending upon the amount of additional time required and is not necessarily an integral number of machine cycles. However, the sequences circuits which cause delays in the execution of other orders always cause delays which are are an integral number of machine cycles.

The sequence circuits share control of data processing within the central control 101 with the decoders, i.e., the buffer order word decoder 3902, the order word decoder 3904, and the mixed decoder 3903. In the case of orders in which the additional work functions are performed before the beginning of the execution cycle, the sequence circuit or, as more commonly referred to, the "sequencer" controls the central control 101 to the exclusion of decoders 3902, 3903, and 3904. However, in the case of orders in which the additional work functions are performed during are immediately after the execution cycle of the order, the sequencer and the decoders jointly and simultaneously share control of the central control 101. In this latter case there are a number of limitations placed on the orders which follow an order which requires the enablement of a sequencer. Such limitations assure that the central control elements which are under the control of the sequencer are not simultaneously under control of the program order words.

Each sequence circuit contains a counter circuit, the states of which define the gating actions to be performed by the sequence circuit. The activation of a sequence circuit consists of starting its counter. The output signals of the counter stages are combined with other information signals appearing within central control 101 and with selected clock pulses in the order combining gate circuit 3901 to generate gating signals. These signals carry out the required sequence circuit gating actions and cause the counter circuit to advance through its sequence of internal states.

Sequence circuits which extend the period of an operational step by seizing control of a central control 101 to the exclusion of the decoders 3902, 3903, and 3904 are arranged to transmit the address of the next succeeding program order word concurrently with the completion of the sequencer gating actions. Thus, although the execution of the order immediately succeeding an order which enabled the sequencer of the above character is delayed, overlap is maintained.

Sequence circuits which do not exclude the decoders BOWD, OWD, and MXD provide additional overlap. That is, the transmission of the address of and acceptance of the order immediately succeeding an order, which enabled a sequencer, are not delayed. The additional gating actions required by such sequence circuits are carried out not only concurrently with the indexing cycle of the immediately succeeding order, but also concurrently with at least a portion of the execution cycle of the immediately succeeding order.

A few examples will serve to illustrate the utility of the sequence circuits. A program order which is employed to read data from the program store 102 requires an additional two 5.5 microsecond machine cycle periods for completion. This type of order gains the additional two cycles by delaying the acceptance of the immediately succeeding order and performs the additional work operations after termination of the indexing cycle of the current order and before the execution cycle of the current order.

When errors occur in the reading of words from the program store 102, the program store correct-reread sequencer is enabled to effect a correction or a rereading of the program store 102 at the previously addressed location. This sequence circuit is representative of the type of sequence circuit which is enabled by a trouble indication and which seizes control of the central control 101 to the exclusion of the decoders.

The command order sequencer 4902 which serves to transmit data messages to data buffers 121 in other suboffices and network commands to the switching network 122 and to the miscellaneous network units, i.e., master scanner 144, AMA tape unit 147, and card writer 146, is representative of the sequence circuits which, when enabled, increase the degree of overlap. That is, the transmission of network commands or data messages extends into the execution cycle of the order following the network command or data message order.

In the processing of certain multicycle orders a plurality of sequence circuits may be activated so that the processing of the multicycle order may include both kinds of gating actions; first additional gating cycles may be inserted between the indexing cycle and the execution cycle of the order, and then a second sequence circuit may be activated to carry out gating actions which extend the degree of overlap to an additional cycle or cycles.

CENTRAL CONTROL RESPONSES TO PROGRAM ORDER WORDS

FIGS. 3–5 aid in understanding the basic operational step actions that are performed by central control 101 in response to various program order words. Each program order word comprises an operational field, a data-address field, and Hamming error detecting and correcting bits.

The operation field is a 14- or a 16-bit binary word which defines the order and specifies the operational step actions to be performed by the central control 101 in response to the order. The operation field is 14 or 16 bits long, depending on the particular order which is defined by the operation field.

There are sets of "options" that may be specified with each of the program order words. The operational step of each order consists of a specific set of gating actions to process data contained in central control 101 and/or communicate information between the central control 101 and other units in the system. When an option is specified with the program order being executed, additional data processing is included in the operational step. A portion of the 14- or 16-bit operation field of a program order word specifies the program order, and the remaining portion of the field may select one or more of the options to be executed.

Certain of the options are compatible with and provide additional data processing for nearly all of the orders. An example of such an option is that of "indexing" in which none or one of seven flip-flop registers within central control 101 are selected for additional data processing. In the orders which permit indexing a three-bit portion of the operation field is reserved as the indexing field to indicate the choice of none or the one of seven registers to be employed.

Other options are limited to those orders for which the associated gating actions do not conflict with other portions of the operational step and are also excluded from those orders to which the options do not provide useful additions. Accordingly, portions of the operation field are reserved for those options only where applicable. That is, central control 101 is responsive to such options only if the program order word being executed is one to which the options are applicable. If an option is not applicable, then that portion of the operation field instead serves in the specification of other program orders or options. The assignment of the binary codes in portions of the operation field to options is therefore selectively conditioned upon the accompanying program order if the option is to have limited availability.

The data-address field of a program order word is either a 23-bit data word to be placed in a selected flip-flop register in central control 101 or a 21-bit word which may be used directly or with indexing to form a code-address for addressing memory or a data buffer. In all order words the sum of the bits of the operation field (16 or 14) plus the bits of the data-address field 21 or 23 is always 37 bits. If the order word has a 16-bit operation field, its data-address field will be 21 bits long; if the operation field is 14 bits long, the data-address is a 23-bit number. The shortened D–A field is utilized to obtain more combinations in the correspondingly lengthened operation field and therefore a larger and more powerful collection of program order words.

The central control 101 performs the operational steps for most orders at the rate of one order per 5.5 microsecond cycle. Although such orders are designated single-cycle orders, the total time involved in obtaining the order word and the central control responses thereto is in the order of three 5.5 microsecond cycles. The overlap operation previously noted herein permits central control 101 to achieve the stated rate of performing one such single-cycle order every 5.5 microseconds.

GENERAL PURPOSE LOGICAL PROCESSING CIRCUIT 2000 (FIG. 3 AND FIGS. 10 AND 11)

The main path for moving data between the principal data sources of the processor and the destination registers includes the general purpose logical processing circuit 2000. The general connections to the circuit 2000 are shown in FIG. 3 and the corresponding details of these connections are shown in FIGS. 10 and 11.

For the purposes of this discussion, the program orders may be divided into three groups, namely: (a) W orders; (b) memory reading orders; and (c) memory writing orders.

Within each of these groups of orders there are particular orders which utilize the facilities of the general purpose logical processing circuit 2000. A program order word may directly specify either one or both of the operands to be processed in the circuit 2000. In the illustrative embodiment, the specification of one or both of the operands by the order is termed an option; however, other orders inherently define both operands. Orders which permit PL and PS masking are examples of orders in which the specification of one or both operands is optional. For example, the orders WF, WJ, WX, etc., have provision for both PL and PS masking. As previously indicated herein, an order word includes an operational field, a data-address field, and error detecting and correcting bits. A portion of the operational field is devoted to specifying the use of options. That is, the operational field of the orders such as WF, WJ, WX, etc., includes a particular portion which is devoted to the specification of the PL and PS options. The PL and PS options are both termed product masking options since the two operands which are processed in accordance with these instructions result in the product (logical AND) of the two operands.

Orders which inherently define both of the operands may specify product masking (AND), union masking (OR), or exclusive OR masking (EXCLUSIVE OR). For example, the orders PWX, PWY, and PWZ are product masking orders that inherently define both operands. Similarly, the orders UWX, UWY, and UWZ are union masking orders that inherently specify both operands. Similarly, the order words PMX, PMY, PMZ, and the orders UMX, UMY, and UMZ are product masking and union masking order words in the group of order words termed memory reading orders. These orders directly specify both operands.

For purposes of illustration only, three main sources of data are described. These are namely the contents of the index adder output register 3401 of the index adder complex of FIG. 4; the contents of any selected one of the plurality of flip-flop registers 2501, 3001, 3002, 4001, 5801, 5802 within the processor; and the contents of the data buffer register 2601.

The group of orders, which are termed W orders, employ the contents of the index adder output register 3401 of the index adder complex of FIG. 4 as the second operand. In these orders the mnemonic W specifies the "word" which is generated in the index adder complex of FIG. 4. The index adder complex includes an index adder addend register 2904, an index adder augend register 2908, and index adder 3407 which is arranged to arithmetically combine the contents of the addend and augend registers, and an index adder output register 3401.

The data-address field of an order word may be selectively gated to the index adder addend register 2904 or to the logic register 2508. The contents of one of the several index registers 2501, 3001, 3002, 4001, 5801, 5802, may be selectively gated to the index adder augend register 2908. Some of the W orders specify that the contents of the addend or augend registers will have the value "0" and in these orders the word appearing at the output of the index adder output register will be the contents of the augend register 2908 or the contents of the addend register 2904, respectively. An example of an order in which the contents of the addend register 2904 will be "0" is the order WX with the PS option specified. This order provides for transmitting the data-address field of the order to the logic register 2508 from the buffer order word register 2410 via conductor group 2409. The data-address field of the order WX, in this instance, is the first operand for the general purpose logical processing circuit 2000.

The second operand of order WX, like all W group orders, is the contents of the index adder output register 3401. These contents are transmitted to the general purpose logical processing circuit 2000 via the conductor group 3402. As seen in FIG. 10, the data word appearing on conductor 3402 may be selectively gated to the circuit 2000 by enabling AND-gate 2001. The enabling signal IRMB for the gate 2001 is one of the signals appearing on the order cable 3900 when the order WX is executed.

As previously indicated, the order WX with PS masking specified results in combining the two operands (i.e., the contents of the logic register 2508 and the contents of the index adder register 3401) by product masking (logic AND). As seen in FIGS. 3 and 10, the first operand is transmitted to the AND- OR-circuit 2005 via the conductor group 2509. The output of the AND gates 2001 is transmitted via OR-gate 2004 to the second input of the AND- OR-circuit 2005, and as specified by the order WX the order cable conductor P mask is enabled. The resulting output word of the AND- OR-circuit 2005 is the logical AND of the two operands and this word may be gated directly to the specified destination register (X register 2501). Alternatively, the resulting word may be complemented in the complement circuit 2006 and the complement word gated to the specified destination register (X register 2501). If the output of the AND- OR-circuit 2005 is to be complemented, the option field portion of the order word will so indicate and the order cable conductor COMP–M of FIG. 10 will be enabled. However, if the word is not to be complemented, the option portion of the operational field will so indicate and the order cable conductor MPASS will be enabled and the output of the AND- OR-circuit 2005 will be transmitted via AND-gate group 2013, the OR-gate 2009, and the bus circuit 2011 to the AND-gate 2500. As indicated by the mnemonics of the order WX, the decoding of this order word will provide for enabling the order cable conductor MBXR to enable the AND-gate 2500 to transfer the word to the X register 2501.

If the PL option is specified in the order WX, the contents of the logic register 2508, as established by a previously executed order word, comprises the first operand. As previously described, the second operand comprises the contents of the index adder output register 3401.

The orders PWX and UWX serve to illustrate the W class orders which inherently define both operands to be processed in the general purpose logical processing circuit 2000. The order PWX, for example, specifies that the contents of the X register 2501 are to be moved to the logic register 2508 to establish the first operand, the contents of the index output register 3401 comprise the second operand; the two operands are to be product masked (form a word which is the logical AND of the two operands); and the resulting word is moved to the X register 2501 via the bus 2011 and the AND-gate 2500. The order UWX specifies the same operands, however, the resulting word is the logical OR of the two operands. As was explained with respect to the order WX, the word which is formed at the output terminals output circuit 2005 may be gated directly to the OR-gate 2009, or, a complement of that word may be formed in the complement circuit 2006, the output of which is then gated to the OR-gate 2009.

In summary, for each of the W class orders the contents of the index adder output register 3401 comprises the second operand for the general purpose logical processing circuit 2000, while the first operand may be selected from one of the several flip-flop registers, from the data-address field of the order, or, the first operand may have been previously established by a priorly executed order word.

Memory reading orders comprise the second group of orders. In these orders information read from memory or a data buffer at an address specified by the order comprises the second operand. The first operand may be derived from the same sources set forth with respect to W class orders. The order PMX serves to illustrate this class of order. The order PMX indicates that the contents of the X register are to be transmitted to the logic register 2508 to establish the first operand, the memory is to be read at an address specified by the data-address field of the order, the data read from the memory is to be gated from the buffer register 2601 via conductor group 2015 and AND-gate 2002 to the input of the general purpose logical processing circuit 2000; and the two defined operands are to be joined by product masking to form the logical AND of the two operands. The resulting word is transmitted to the X register 2501.

The memory reading order UMX follows the same pattern established for the order PMX. However, the two operands are joined by union masking rather than by product masking.

The order KMKX5 provides for forming a word which is the EXCLUSIVE-OR of the two operands. In accordance with this order, the first operand is the contents of the logic register 2408, set by a previous order, and the second operand is the information which is read from the memory 103 at an address location defined by the data-address portion of the order word. As seen in FIG. 10, there is no provision for complementing the word which occurs at the output of the EXCLUSIVE-OR circuit 2008. The EXCLUSIVE-OR circuit is enabled by a signal on the order cable conductor XMASK.

The third class of orders are memory writing orders. The memory writing orders, which utilize the general purpose logical processing circuit 2000 to combine two operands, all are of the class which defines the first operand as a option of the order word. That is, the first operand for each of these orders (e.g., LM, FM, JM, KM, XM, etc.) is the contents of the logic register 2508, as established by a previously executed order word, or, the data-address portion of the order. The second operand is specified by the order word. For example, the order XM specifies that the contents of the X register 2501 comprise the second operand.

In summary, the general purpose processing circuit 2000 provides a convenient means of processing data as it is moved from any one of the principal data sources within the processor to one of the destination registers. In the illustrative embodiment both operands may be selected from a number of data sources and there is provision for performing one logical operation as data is moved from one location to another. Additionally, after certain logical operations, the resulting word may be complemented. The circuit 2000 also permits data in transit to be transmitted directly to a destination register without alteration or, alternatively, the data being transferred may be complemented and the complement word transmitted to the destination register.

K REGISTER 4001 (XR); K LOGIC; DETECT FIRST-ONE CIRCUIT 5415

The K register 4001, the K logic, and the detect first-one circuit 5415 provide a second major internal data processing facility. The K logic comprises input and output circuitry surrounding the K register 4001. The K logic includes the K A input register 3502, the K B input register 3504, the K input logic 3505, the K logic homogeneity circuit 4502; and at the output of the K register 4001 the rotate shift circuit 4500 and the K register homogeneity circuit 4503. The K input logic 3505 may be directed by output signals of the order combining gate 3901 to perform one of four logical operations on two operands. One operand is the content of the K register 4001; the other is the information on the masked bus 2011. The order word decoder 3904 and the K register sequence circuit (one of the sequencing circuits SEQ1–SEQN) generate signals which cause the K input logic 3505 to combine the two operands in the operations of AND, OR, EXCLUSIVE-OR, or ADDITION. The word resulting from the logical combination, according to the order in the order word register 3403, may either be gated to the K register 4001 or to the control homogeneity circuit 5000 and the control sign circuit 5413.

A word appearing on the masked bus 2011 may in some instances be gated directly to the K register 4001 via the K input logic 3505. The K register 4001 may thereby be employed as a simple destination register for data like other flip-flop registers in central control such as XR, YR, ZR, et cetera.

In carrying out the ADDITION operation in the K input logic 3505 the two operands are treated as 22-bit signed numbers. The 23rd bit of each operand is the sign bit. If this bit has the value "0" the number is positive, and the magnitude of the number is given by the remaining 22 bits. If the sign bit is "1" the number is negative, and the magnitude of the number is given by the one's complement of the remaining 22 bits. (The magnitude is determined by inverting each bit of the 22-bit number.) The add circuit within K input logic 3505 can correctly add any combination of positive and negative operands as long as the magnitude of the algebraic sum of the two operand is equal to or less than $2^{22}-1$.

The K logic and the K register 4001 can perform other logical operations on the contents of the K register 4001. One of these operations is given the name "SHIFT." The gating action performed by SHIFT is based, in part, on the least significant six bits of the number that appears in the index adder output register 3401 at the time the shift is to be performed. The least significant five bits constitute a number that indicates the magnitude of the shift, and the sixth bit determines the direction of the shift. A "0" in the sixth bit is interpreted as a shift to the left, and the remaining five bits indicate the magnitude of this shift. A "1" in the sixth bit is interpreted as a shift to the right, and the one's complement of the remaining five bits indicates the magnitude of the shift to the right. Although in shifts to the right the least significant five bits contain the one's complement of the magnitude of the shift, the six-bit number will be referred to hereafter as comprising a sign and a magnitude.

A shift of one to the left results in the contents of each flip-flop in the K register 4001 being gated to the adjacent flip-flop to the left. (The most significant bit of the K register 4001, bit 22, is on the extreme left; and the least significant bit, bit 0, is on the extreme right.) A "0" replaces the contents of the least significant bit position of the K register 4001 (there is no flip-flop to the right of the "0" position flip-flop) and the most significant bit is shifted out of the register. That is, the bit 22 flip-flop has no flip-flop to its left and the information is not retained.

A shift of two to the left is equivalent to two successive shifts of one to the left, a shift of three to the left is equivalent to three successive shifts of one to the left, et cetera. A shift of 23 to the left causes all zeros to be placed in the K register 4001. A shift of one to the right results in the contents of each flip-flop in the K register 4001 being gated to the adjacent flip-flop to the right. A "0" replaces the contents of the most significant bit of the K register 4001, and the original least significant bit of the K register 4001 is thus not retained.

A shift of two to the right is equivalent to two successive shifts of one to the right, a shift of three to the right is equivalent to three successive shifts of one to the right, a shift of 23 to the right results in the contents of the K register 4001 being made all zeros.

A logical operation similar to the shift is the operation "ROTATE." As in shifting, the six bits of the index adder 3401 are treated as a direction and magnitude for the rotation just as described for the shift.

A rotate of one to the left is identical to a shift of one to the left except for the gating of the flip-flops at each end of the K register 4001. In a rotation of one to the left the content of bit 22 is not lost as in the shift but instead replaces the content of the least significant zero bit of the K register. A rotate of two to the left is identical to two rotates of one to the left in succession, a rotate of three to the left is identical to three rotates of one to the left, et cetera. A rotate of 23 to the left has the same effect on the K register 4001 as no rotation. A rotation to the right bears a similar relation to a shift to the right.

In summary, the gating action of rotation is identical to that of shift except that the register is arranged in a circular fashion wherein the most significant bit is treated as being to the right of the least significant bit of the K register 4001.

A complement option may be employed with shift and rotate orders and, where specified, the significance of the sign bit is inverted, that is, where the complement option is specified a "0" in the sixth bit is interpreted as a shift to the right while a "1" in the sixth bit is interpreted as a shift to the left.

A special purpose rotate order applies rotation to only bits 6 through 21 of the K register 4001 and leaves the remaining positions of the K register 4001 unchanged.

Another logical gating action is the determination of rightmost one in the contents of the K register 4001. This action is accomplished by gating the contents of the detect first-one circuit 5415 to the F register 5801 via the unmasked bus 2014, the mask and complement circuit 2000 and the masked bus 2011. The number gated is a five-bit binary number corresponding to the first stage (reading from the right) in the K register 4001 which contains a "1." If the least significant bit of the K register 4001 contains a "1," zero is the number gated to the F register 5801. If the first "1" reading from the right is in the next position, one is the number gated to the F register 5801. If the only "1" appearing in the K register 4001 is in the most significant position, 22 is the number gated to the F register 5801. If the K register 4001 contains no "1's," then nothing is gated to the F register 5801.

INDEX ADDER ARRANGEMENT

A third major data processing configuration within the central control 101 is the index adder 2904, 2908, 3407, 3401 which is used to:

1. Form a quantity designated herein as the indexed DAR word consisting of the sum of the D–A field of the program order word being executed and the contents of an index register specified in an order, or
2. To perform the task of a general purpose adder; the operands in this latter instance may be the contents of two index registers or the D–A field and the contents of an index register.

The index adder arrangement comprises an addend register 2904, an augend register 2908, a parallel adder 3407 and an index adder output register 3401. The output signals of the index adder arrangement are selectively connected to the program address register, the memory address decoder 3905 and the call store address bus system 6401 when employed for indexing; the outputs of the adder may also be connected to the masked bus 2011 via the mask and complement circuit 2000 when employed as a general purpose adder. Access to the masked bus 2011 permits the word formed to be employed for a number of purposes, for example:

1. Data to be placed in the K register 4001 without modification or to be combined with the contents of the K register 4001 in the K input logic 3505;
2. A number for determining the magnitude and direction of a shift or rotate;
3. Data to be placed in a specified index register;
4. Data to be transmitted over the network command bus 104 via the KA input register 3502 and the command translator 3509;
5. Data to be sent to the central pulse distributor via the F register 5801 and the central pulse distributor translator 5422.

Indexing is the adding of two numbers in the index adder 3407. The D–A field of the order as it appears in the buffer order word register 2410 is one operand used in indexing and the other operand, if required, is the contents of one of the seven index registers BR, FR, JR, KR, XR, YR, and ZR. For orders which include the indexing option a three bit number within the operation field specifies either (1)no indexing, or (2) indexing on one of the seven flip-flop registers according to the following table.

| X34 | X33 | X32 | Register |
|---|---|---|---|
| 0 | 0 | 0 | No register |
| 0 | 0 | 1 | BR |
| 0 | 1 | 0 | FR |
| 0 | 1 | 1 | JR |
| 1 | 0 | 0 | KR |
| 1 | 0 | 1 | XR |
| 1 | 1 | 0 | YR |
| 1 | 1 | 1 | ZR |

If no register is specified for indexing, then only the D–A field is gated to the index adder arrangement and the output of the index adder arrangement will be the D–A field (the sum of the D–A field and zero). If an index register is specified, the contents thereof are normally gated onto the unmasked bus 2014 and from there directly into the index adder arrangement.

A number of the orders have as an option specified by a combination of bits in the operation field the loading of the D–A field into the logic register 2508. This option permits the placing of specified new data into the logic register 2508 for use in subsequent masking operations. If the D–A field is used to load the logic register 2508, then it is considered not available for indexing and the only operand gated to the index adder arrangement is the contents of a specified index register.

The sum appearing at the output of the index adder arrangement is referred to as the DAR address or word. If indexing is not specified in an order, the DAR address or word is the D–A field of that order. If indexing is specified and the D–A field is not gated to the logic register 2508, the DAR address or word will be the sum of the D–A field and the contents of the specified index register. If the D–A field is used for loading the logic register 2508, the DAR will be the contents of the specified index register.

The index adder arrangement 2904, 2908, 3407, 3401, as well as the add circuit within the K input logic 3505, utilizes one's complement binary arithmetic. All inputs of the index adder 3407 are treated as 22-bit numbers with the 23rd bit a sign bit. A positive number is indicated by a "0" in the 23rd bit and a negative number by a "1" in the 23rd bit. End-around-carry is provided so that the index adder arrangement can correctly handle all four combinations of positive and negative operands as long as the algebraic sum of the two operands does not exceed $2^{22}-1$.

Some orders, as previously mentioned, have a 23-bit D–A field, and others have a 21-bit D–A field. If the D–A field is only 21 bits long, then the 21st bit is treated as the sign bit; this bit is expanded to also become the 22nd and 23rd bits of the effective D–A field gated to the index adder arrangement. Expansion converts a 21-bit D–A field to an effective 23-bit D–A field for indexing. Expansion preserves the end-around-carry for indexing with 21-bit D–A fields.

DECISION LOGIC 3906

The central control 101 is the execution of a decision order in a sequence of orders either continues with the current sequence of orders or transfers to a new sequence of orders. The decision is made by the Decision Logic 3906 in accordance with the order being processed. The order specifies the information to be examined and the basis for the decision. The information may be obtained from the control homogeneity flip-flop 5020, the control sign flip-flop 5413 or selected outputs of the K logic. The basis of the decision may be that the information examined is (or is not) arithmetic zero, less than zero, greater than zero, et cetera. A decision to advance does not disturb the current sequence of obtaining and executing orders. A decision to transfer to a new sequence of orders is coupled in accordance with the particular word being executed to a determination of whether the transfer is an "early transfer" or a "late transfer." Accordingly, if the decision is made to transfer, either the early transfer conductor ETR or the late transfer conductor LTR of the cable 3911 will be energized and thereby activate the transfer sequencer 4401. Transfer signals from these conductors lead to the gating of the transfer address to the program address register 4801. This causes the next program order word to be obtained from a new sequence of order words. The transfer address may be obtained from a number of sources and the source is indicated by the order being executed. In the case of "early transfer" orders, the transfer address comprises the contents of a preselected one of the J register 5802 or the Z register 3002. In the case of "late transfer" orders the transfer address may be obtained directly, in which case the DAR code-address which is formed in the index adder is employed, or indirectly, in which case the transfer address comprises a memory reading at the location specified by the DAR code-address which is formed in the index adder arrangement. This latter case is referred to herein as indirect addressing.

The distinction between "early transfer" and "late transfer" orders is based on whether or not the decision order requires a memory reading or writing in the event of an advance. A decision order which requires a memory to be read or written into after a decision to advance is an "early transfer" order. If the decision on such an early transfer order is to advance, then the memory reading or writing operation is carried out as a normal gating action under control of the buffer order word decoder 3902 and the order word decoder 3904. However, if the decision is to transfer, the decision is advantageously made "early" to inhibit the gating associated with the memory reading or writing operation.

Other transfer orders which do not require a memory reading operation but which do require extensive data processing prior to making the decision are termed "late transfer" orders. These orders cannot employ the early transfer timing sequence in that the data processing operations required thereby are not necessarily completed by the time the early transfer signal would be generated.

Two input information sources for the decision logic comprise the output signals of the control homogeneity flip-flop 5020 and the control sign flip-flop 5413 which are employed to register homogeneity and sign information which is obtained from a number of locations. For example, a 23-bit data word appearing on the masked bus 2011 may be transmitted to the control homogeneity circuit 5000. If the data word comprises either all "0's" or all "1's," the control homogeneity flip-flop 5020 will be set to its "1" state, otherwise the flip-flop will be reset. The control sign flip-flop 5413 serves to retain the sign of the data word; the control sign flip-flop 5413 is set if the word is negative and is reset if the word is positive.

The control homogeneity circuit 5000 and the control sign arrangement are utilized by some decision orders by gating the output of a selected index register onto the unmasked bus 2014, through the mask and complement circuit 2000 onto the masked bus 2011 and from there into the control homogeneity circuit 5000 and the control sign flip-flop 5020. The contents of one of the seven index registers specified in the decision order being processed are thereby summarized in the control homogeneity flip-flop 5020 and control sign flip-flop 5413. Further gating actions associated with a decision order carry out the transfer or advance according to the output of the decision logic 3906.

Similar homogeneity and sign circuits provide facilities for a class of decision orders which transfer or advance according to combinations of the homogeneity and sign of 23-bit words contained in the K register 4001.

ORGANIZATION OF INFORMATION IN THE MEMORY SYSTEM

Figure 6:
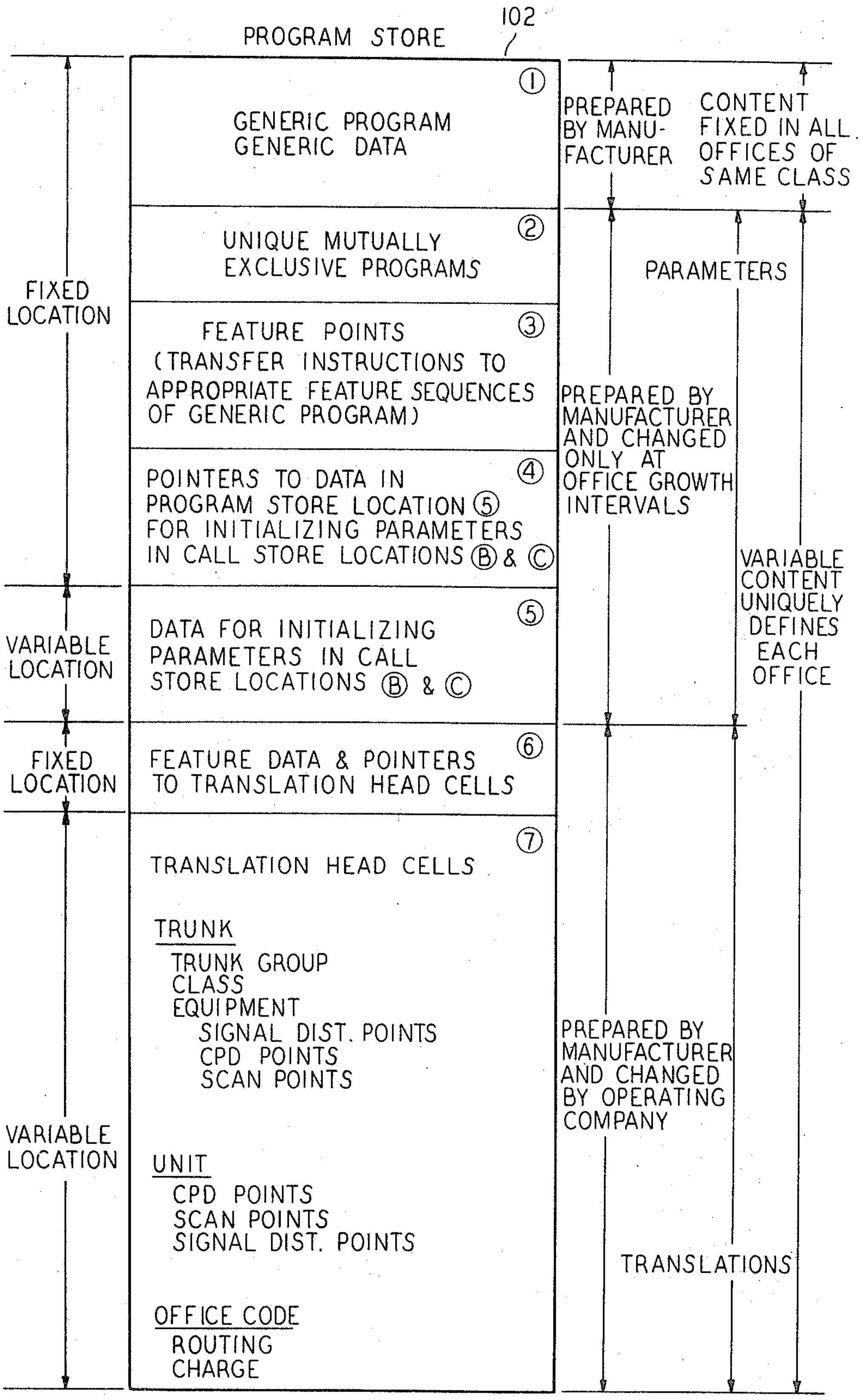
FIG. 6 illustrates an arrangement of information in a program store such as those shown in FIGS. 1 and 2.

FIG. 6 shows the organization of information in the program store 102 in seven locations labeled 1 through 7. In the figure the arrangement of information and the size of the blocks representing the seven locations are not indicative of the absolute locations and sizes of the various blocks but, rather, are merely illustrative of the principles of this invention. The same is true of the three blocks labeled A, B, and C in FIG. 7 which shows the arrangement of information in the call store 103.

GENERIC PROGRAM-GENERIC DATA

In FIG. 6 location 1 contains the generic program and the generic data which is common to all offices of particular class. The information in this area is always located at the same absolute addresses in the program store and the content is fixed for all offices of the same class. These assignments are made by the manufacture and, generally, the information is placed in the memory by the manufacturer. The generic program comprises, with only minor exceptions, all of the program sequences required to implement both the call processing and maintenance functions of the class of office for which a program is prepared. The minor exceptions comprise the unique mutually exclusive programs, which are in location 2 in the program store and which will be described later herein, and a few maintenance programs which are located in the call store and which are not further described herein.

The generic data comprises information for generating tables which are frequently used in the course of call processing. The generic program, in accordance with this data, is able to prepare the tables and store them in location A in the call store. An example of the type of table which is generated and stored in the call store is a "diagonal table." The data word employed in the illustrative embodiment comprises 23 bits of information. The diagonal table comprises 23 words arranged sequentially in location A of the call store 103. In the first word the rightmost bit position is a binary "1" and all other bit positions are binary "0." In word 2 the second bit position is a binary "1" and the first and other bit positions are binary "0." In the remaining words of the table the bit position corresponding to the word number is a binary "1" and all other bit positions are binary "0." Thus the name diagonal table is obtained.

The generic program and the generic data are prepared by the manufacturer, and this information in the program store 102 is generally changed only if the growth of the office is such that the office becomes a member of a new generic class. Such a change is most unlikely since a single generic program covers both a wide range of traffic and a wide range of service features.

MUTUALLY EXCLUSIVE LENGTHY PROGRAMS

There are certain program sequences which are quite lengthy and which are employed in an office on a mutually exclusive basis. For example, when an office is installed a particular concentration ratio is specified for the network. In one office a ratio of 2:1 may be employed while in other offices other ratios may be employed. A single ratio applies to the entire office. The program sequences which are dependent on office concentration ratio are examples of programs employed in the office on a mutually exclusive basis. Although it would be possible to place all of these mutually exclusive programs in the generic program location 1, such assignment of space would be wasteful. Accordingly, in the case of lengthy sequences which are employed in an office on a mutually exclusive basis the appropriate sequences which meet the requirements of the office at the time of installation are placed in location 2 of the program store.

The information which uniquely defines an office is divided into two general categories, namely, parameters and translations. The unique mutually exclusive programs comprise the first element of the office parameters. Office translations will be described with respect to locations 6 and 7 of the program store 102.

FEATURE POINTS

The generic program in location 1 also includes many relatively short sequences of program order words which are employed on a mutually exclusive basis in each office of a class. Since these sequences are short, little space would be saved by selecting the appropriate sequences at the time of installation and compiling them in location 2. The choice of the selection of such sequences is accomplished by means of transfer instructions, termed "feature points," which are in location 3 in the program store. The call processing sequences include unconditional transfer instructions to absolute addresses in location 3. The program store at these absolute addresses contain other unconditional transfer instructions to appropriate absolute addresses in location 1 of the program store. The transferred to address in location 1 contains the first instruction of the sequence which applies to the particular office.

EQUIPMENT PARAMETERS

As previously stated, a single generic program serves offices having many distinguishing physical characteristics. The physical characteristics of interest to the following discussion are those which define the size of the office and the traffic handling capacity of the office. As employed herein the term "office size" relates to the number of lines and trunks served by the office and the term "traffic handling capacity" relates to the equipments which are provided to serve the lines and trunks. The following discussion does not include a description of features and services associated with the lines and trunks as this subject is subsequently covered herein under the general heading of "translations."

The information in locations 4 and 5 of the program store 102 are employed in initializing the information in locations B and C of the call store 103. There is not a one-to-one correspondence between the information in locations 4 and 5 and the information in locations B and C. The generic programs include program sequences termed the "initialization program sequences" and the "audit program sequences." These program sequences include instructions to read data in location 4 of the program store. As shown in FIG. 6, the information in location 4, like the information in locations 1 through 3, is always at the same absolute address in the program store 102. The information in location 4 comprises pointers to data in location 5 of the program store. The data in location 5 is required by the initialization sequence to generate the information to be stored in locations B and C of the call store 103. The amount of data to be stored in location 5 varies from office to office; therefore, location 5 is not assigned the same fixed location in every office and the number of word locations assigned varies from office to office. The pointers in location 4 serve to locate the initialization data for the initialization and audit program sequences of the generic program.

The call processing sequences do not require access to the data in program store locations 4 and 5 since this data is only required to initialize the information in locations B and C of the call store 103. The call processing sequences have direct access to the information in location B of the call store through instructions which are included in these sequences. The call processing sequences have access to the data in location C of the call store by means of the data obtained from location B.

The data in location B defines the equipment configuration employed in the office. It should be noted that there are basic equipment configurations of the processor for a particular generic class of office and that the information in locations B and C is not concerned directly with these basic configurations. In the processors 100A and 100B of FIGS. 1 and 2 the central control 101 always comprises two functionally equivalent central controls, the program store 102 always comprises at least two functionally equivalent program stores and the call store 103 always comprises at least two functionally equivalent call stores. The numbers of program stores 102 and call stores 103 are a function of office size and traffic handling capacity and the parameters in location B reflect this fact. This will be understood from the following discussion.

The call processing sequences employ a large amount of bulk memory space in the call store 103 to record data which is accumulated during the course of serving a call and to maintain a record of the availability of equipments engaged by calls in process or by trouble conditions. A portion of the memory which is employed to record accumulated data is termed "a register" herein. There are, as explained below, several types of registers which are arranged in groups in location C in the call store 103. An originating register is an example of a register employed in accumulating data during the processing of a call. The general organization of an originating register in the call store 103 is shown in FIG. 13. Every office comprises a plurality of originating registers and there are two call store words which are common to all of the originating registers of the office. The two common words are termed the head cell word and the end cell word. The head cell word contains the address of the next originating register to be assigned and the end cell word contains the address of the last originating register to be assigned. Originating registers are assigned in the order of their release. That is, the originating register which has been idle the longest period of time is the first register to be assigned. The common head cell and end cell entries are shown in FIG. 13A. These entries are in location B of the call store 103 and always appear at the same absolute addresses in memory in all offices of the same class.

In this one illustrative embodiment an originating register comprises a block of 16 call store words arranged as shown in FIG. 13B. The first word of the register is the call state word. During the time that an originating register is engaged by a call the call may be in a number of states. For example, a connection may be established between an incoming line and the call signaling receiver. Before the calling subscriber has transmitted the first dialed digit the call signaling receiver transmits dial tone to the calling subscriber. However, after the first digit has been received the dial tone is removed. These are two examples of call states which can be defined by the call state word in the originating register.

Figure 7:
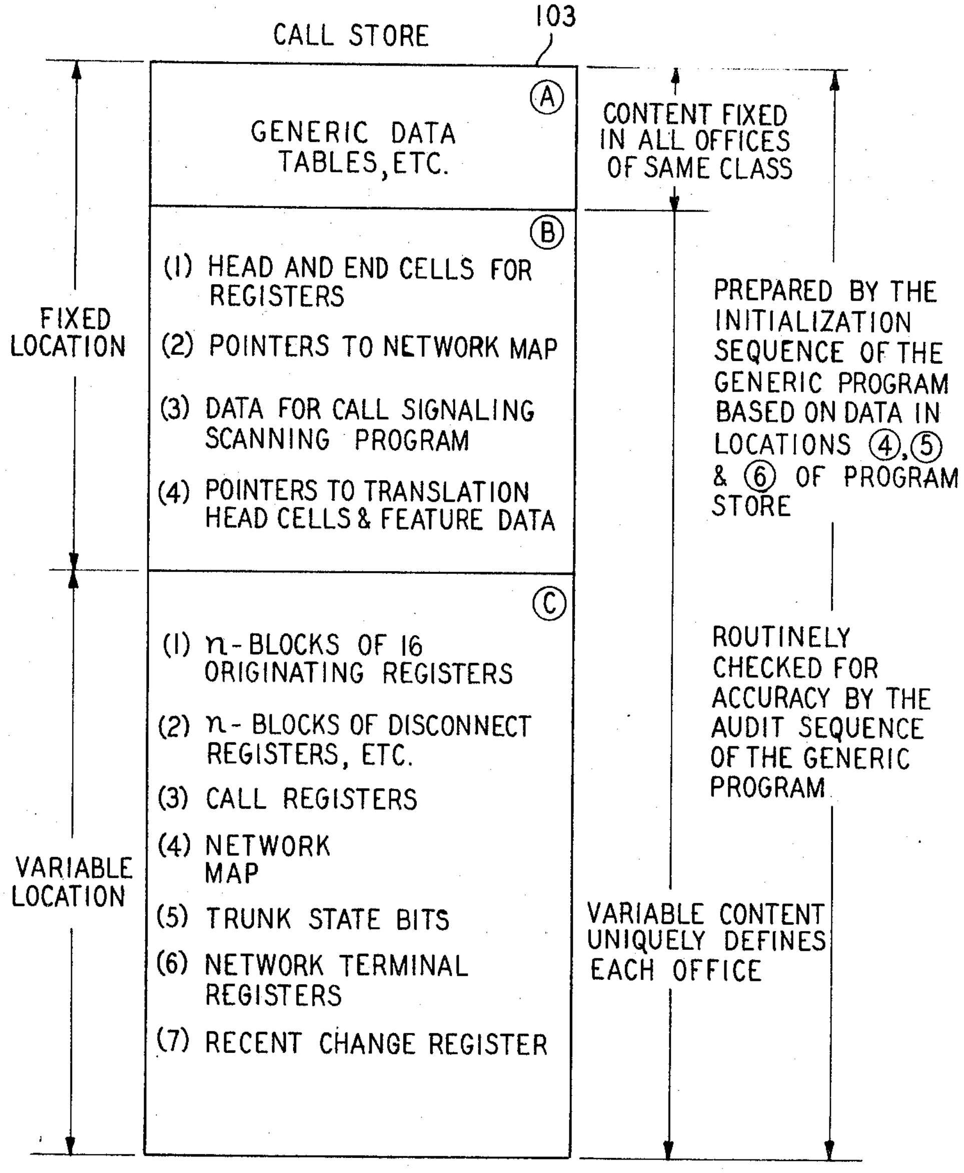
FIG. 7 illustrates an arrangement of information in a call store such as those shown in FIGS. 1 and 2.

The second word of the originating register is the originating register link word. The originating registers are arranged in a linked list and the link word in each originating register indicates the address of the next originating register to be assigned. It is by this mechanism that originating registers are assigned in the order in which they are released. The linked list thus comprises a two word entry (head cell and end cell–FIG. 13) which is common to the linked list and linking entries which are individual to each of the articles which may be assigned (in this one case, originating registers). The two word entry is in location B of the call store 103. In FIG. 7 item 1 in location B is indicated to be the head and end cells for registers.

When the system is first initialized the head cell entry in location B will identify the first originating register as the next to be assigned and the end cell entry will identify the last originating register to be the last to be assigned. The link word (word two) associated with the first originating register will show the second register to be the next to be assigned after the first has become engaged, et cetera, in numerical order through the remaining items to be assigned. After the system has started to process calls registers will be held for varying periods of time depending upon the speed with which the subscriber dials or pulses call signaling information and the relative speeds with which the central processor is able to establish calls and thus release registers. Accordingly, after the system has been in service a random linking of items to be assigned will exist. That is, no longer will the items be assigned in strict numerical sequence but, rather, the longest idle register will always be the next register which is seized to serve a call. This arrangement serves a very useful purpose in that all the registers are used even during very light periods of traffic. Therefore, any troubles which may occur in a register will be detected during normal operating periods and not only when a traffic situation occurs.

Additionally, the use of a linked list permits a single pair of words (FIG. 12A), namely, head cell and end cell words, to suffice for every office of the class without dependence on the number of originating registers in the office. This arrangement facilitates office growth since the addition of one or more groups of registers merely requires the assignment of space within the call store location C and the inclusion of the new registers in the linked list. Accordingly, the information in the originating registers which were part of the system before the addition need not be disturbed and calls are not interrupted.

The originating registers comprise blocks of data in the call store 103. Each register comprises 16 words which for purposes of programming economy occupy 16 successive word locations in the memory. The word blocks of the many originating registers, however, may occur randomly in the memory since the link word gives the address in memory of the next originating register.

The third word of each originating register is reserved for the address of a call signaling receiver register. Words 4 through 16 are reserved for accumulating call signaling information. As will be seen in the following description, call signaling information is detected by call signaling receivers, placed in call signaling receiver registers, and subsequently transferred to an associated originating register. Call signaling receivers are included in the serve circuits which are located in the trunk frame 154. These terminate on the network 122 and are arranged to be responsive to call signaling information received from a connected calling trunk. That is, when a trunk initiates a call, the processor 100 recognizes the request for service and establishes a connection through the network 122 to an idle call signaling receiver in the trunk frame 154. The call signaling receiver responds to call signaling information. The processor 100 executes call processing program whose sequences generate command signals which cause the trunk scanner 155 and the master scanner 144 to regularly examine information terminals (scan points) within the call signaling receiver, to obtain indications of the call signaling receivers responses to call signaling information from the connected originating trunk. The processor 100 receives scanner responses over the communication path 108, interprets the scanner responses via a call signaling scanning program and records these responses in words of associated call signaling receiver registers in location Ⓑ.

Call signaling receivers are associated on a one-for-one basis with call signaling receiver registers which are shown schematically in FIGS. 12A, 12C, 12D, 12E, and 12F. A single-linked list is adequate to show the availability of the call signaling receivers and their associated call signaling receiver registers. The head and end cells for this linked list are shown in FIG. 12A and like the head and end cell entries for the originating registers these two words are in location Ⓑ of the call store 103. The linking words are shown in FIG. 12F with one linking word (AW4–1, AW4–2, etc.) for each call signaling receiver to be assigned.

The call signaling receiver registers comprise the three blocks shown in FIGS. 12C, 12D and 12E. The words in these three blocks are labeled auxiliary word 1, auxiliary word 2 and auxiliary word 3, respectively. In this arrangement the first auxiliary word (AW–1) contains the program store address of the generic program sequence which is required to perform the functions associated with the particular originating register. The second auxiliary word (AW–2) comprises 23 bits. Bits 19–22 comprise a counter for registering the received digit and bits 0–18 comprise the address of an originating register which has become temporarily associated with a call signaling receiver register. That is, in the course of serving a request for service from a subscriber's line the central control 101 first assigns an originating register to the request and subsequently assigns a call signaling receiver and its associated call signaling receiver register to the request. This association of call signaling receiver register and originating register is noted in both the call signaling receiver register and in the originating register.

The third auxiliary word (AW–3) is reserved for the scanner address of TOUCH-TONE numerical interrogation points of a TOUCH-TONE call signaling receiver.

The originating registers are merely illustrative of many types of registers. For example, during the processing of a call the generic program employs ringing registers, disconnect registers, et cetera. The principles by which the generic program communicates with the various registers are identical to those set forth above in case of originating registers and call signaling receiver registers. In each instance a single pair of words (head cell word and end cell word) completes the necessary tie between the generic program and the above registers.

FIG. 14 shows the organization of service task information in the memory and the means of access to such information. The service task information is contained in a plurality of call registers (FIG. 14D) and a plurality of network terminal registers (FIG. 14E). The service task information is in the call store 103 at location C (FIG. 7). The size of this information area is variable from office to office; therefore, it is in the variable portion of the call store 103. Each call register comprises two 23-bit call store words which are in adjacent memory locations. The information in a call register defines:

A. The activity state of the register (active or inactive)

B. The state of the call (awaiting answer or talking)

C. The incoming terminal network number

D. The outgoing terminal network number

E. The elements of the connection through the network between the incoming and outgoing terminals.

As seen in FIG. 14D, the register activity is determined by the state of bit 22 of the first call register word and the call state is indicated by the state of bit 21 of that word.

A 15-bit address fully defines a network terminal and for the incoming terminal bits 0 through 14 of the first call register word define the network number. The remaining bits 15 through 20 of the first call register word define the junctor subgroup which is one of the elements required to define the connection through the network between the incoming and outgoing network terminals. The remaining information for defining the connection through the network is found in bits 11 through 22 of the second word of the call register.

Since a network terminal is identified by a 15-bit number, the 11 bits 0 through 10 of word 2 of the call register only partially define the location of the outgoing terminal on the network. However, since the incoming terminal network number and the junctor subgroup are both known from the contents of the first word, it is possible through a simple table look-up to derive the remaining four bits of the outgoing terminal network number.

In summary, each call register contains information relevant to a single call, and which fully defines the network terminals served by the call and the elements of the network employed in processing the call. Additionally, there is information in the call register which indicates whether the register is active or inactive and there is an indication as to whether the call is incomplete (awaiting answer) or completed (talking).

Additional service task information is found in the network terminal register which, in this one illustrative embodiment, is associated on a one-for-one basis with the network terminals. The network terminal registers contain two basic elements of information, namely a call progress mark and the memory address of a call register when a service task is being performed with respect to that network terminal. As seen in FIG. 14E, a network terminal register comprises a single 23-bit call store word. Bits 0 through 17 define the memory address of a call register assigned to a service task being performed with respect to that terminal. The remaining five bits 18 through 22 in combination define the call progress mark. In the illustrative embodiment there are four possible states of the call progress mark, namely:

1. Idle—(inactive stable)

2. Served by call processing register (e.g., originating register, disconnect register, etc.)—(active unstable)

3. Out of service—(inactive)

4. Served by a call register (FIG. 14D)—(active stable)

As seen from the information content of the network terminal register, the call progress mark portion is updated as a service task performed with respect to that network terminal progresses. When the service task approaches an active stable state (i.e., when signaling of the trunk connected to the outgoing terminal has commenced), a call register (FIG. 14) is assigned and the address of that call register is inserted in bit locations 0 through 17 of the network terminal register. Immediately thereafter the information concerning the service task which is performed with respect to that network terminal is written in the call register indicated by the memory address in the network terminal register.

A task is considered to be incomplete until such time as the connection is established through the network and the outgoing terminal has responded to the call (i.e., the outgoing trunk has answered in response to the signaling). An incomplete task is indicated by bit 21 of the first call register word being in the "0" state and after answer has occurred, bit 21 is changed to the "1" state to indicate completion of the task.

The generic program has access to the call registers and the network terminal registers by way of data found in location 4 of the program store 102. The means of access are shown in FIGS. 14A through 14C. As seen in FIG. 14A, an address of a data block in location 5 is found at bits 0 through 20 of a program store word in location 4 (fixed address area) in the program store 102. This memory address defines a program store address in the variable portion 5 of the program store 102. The information in location 5 is shown in FIG. 14C. As shown in FIG. 14C, the first word comprises three elements, namely:

1. The address in location B of the head cell for call registers;
2. The number of words in each call register, and
3. The number of call register groups.

The remainder of the information in location 5, relative to call registers, comprises a number of words equal in number to the number of call register groups. Each such word comprises two portions, namely, a first portion which defines the address in location C of the first call register of the corresponding group and a second portion which defines the number of call registers in that group.

The generic program has access to the network terminal registers by means of the information shown in FIG. 14B. There is one call store word in location 4 for each network frame. Bits 0 through 17 of each such program store word define the address in location C of the first network terminal register of the corresponding network frame.

As previously explained, the network terminal registers are associated on a one-for-one basis with network terminals and since trunk circuits are permanently wired to corresponding trunk terminals there is a one-to-one relationship between a network terminal register and trunk circuit. The network terminal registers are arranged in ordered groups corresponding to a network frame. The address in memory of a network terminal register corresponding to a network terminal number can be derived. As previously explained with respect to the call registers, a network terminal number comprises 15 bits. The seven high ordered bits of that number define a network frame and these bits, when combined with a fixed program constant obtained from memory, define the starting address in memory for the group of network terminal registers associated with a network frame. The eight low-ordered bits of the network terminal number define the equipment location within a network frame. Thus, by combining the eight low ordered bits with this starting address in memory, the address of the network terminal register corresponding to a terminal network number is defined.

Another example of the use of a few entries in location B of the call store 103 to permit the generic program to communicate with a block of information in location C is item (2), the pointers to the network map. The network 122 comprises transmission paths, switches for establishing those transmission paths, and control circuits for selectively controlling the switches. Many other telephone switching networks include either lockout provisions for excluding busy links from a new connection or include a sleeve conductor for holding a busy connection and indicating the busy state of the elements of the connection. The network 122 does not include either lockout arrangements or sleeve connections and as previously noted the availability of elements of the network is indicated by the network map which is in location C of the call store 103. The size of the network map is a direct function of the traffic handling capacity of the office. The network map must include entries for each physical item of the network. Since the network map is an item which varies with office traffic handling capacity, it is situated in location C of the call store 103.

Communication between the sequences of the generic program, the sequences of the unique mutually exclusive programs and the network map is by way of pointers (Item 2) which are situated in location B of the call store 103. A word in location B is reserved for the maximum number of pointers which are required in the generic office. This arrangement means that a small number of word locations are reserved and not used in the smaller offices of a class. This disadvantage, however, is minor compared to the ease with which additional network capacity may be added to the office and the overall saving in memory capacity. That is, in accordance with this arrangement the network map may be distributed throughout a number of call stores and when a new network frame is added, network map space need only be assigned in location C of the call store 103 and the pointer word in location B reserved for the new network frame updated to show the assignment in location C.

In the case of the network map, the amount of memory area required for a network frame is relatively extensive. Therefore, economies may be effected by providing pointers which permit the generic program or the mutually exclusive program to communicate with the network map. Where the total memory area required to serve the largest office of a generic class is relatively small, all of the space required to store that data may be reserved in location B for the largest office of the class. The data for the call signaling scanning program falls into this latter category. In this one illustrative example logic word locations are required for each group of 16 call signaling receivers. Additionally, there are three common call store words required to serve all of the call signaling receivers of an office. The organization of data for the call signaling scanning program is illustrated schematically in FIGS. 12B and 12G. In the illustrative system a scanner is arranged to interrogate a group of 16 supervisory elements in parallel. Such a group of 16 elements is termed herein to reside in a scanner row. The maximum number of call signaling receivers contemplated in the particular class of office illustrated herein is 256. Therefore, a maximum of 16 scanner rows provides sufficient capacity for this maximum number of call signaling receivers.

In FIG. 12B scanner row addresses (CW1) are stored in a maximum of 16 word locations. The scanner row address defines both the scanner in which the row resides and identifies the particular row. In any given office the assigned scanner rows may run only through N; therefore, the word locations in the reserved block of 16 words in excess of N are wasted. However, if the scanner row addresses and the other data for the call signaling scanning program were stored in location C, pointers would be required in location B. Accordingly, not all of the words wasted by the arrangement employed herein would be saved. Additionally, the use of pointers to read this data requires additional machine time. Since scanning is a highly repetitive function of the system, minimizing the time required to execute the scanning sequences is extremely important. The economies to be effected by placing the data for the call signaling scanning program in location C are relatively small; therefore, this data is situated in location B.

The word blocks W1 through W5 illustrated in FIG. 12B similarly reserve one word per possible scanner row. In these blocks, however, only bit positions 0 through 15 of each word are employed. Within these bit positions the first bit of each word is assigned to the first scanning element of the corresponding scanner row, the second bit position to the second element of the scanner row, et cetera. Accordingly, in these word blocks corresponding bit positions of corresponding rows are assigned to the same scanning element.

The data stored in the block labeled CW2 comprises the address of the associated auxiliary words of the corresponding call signaling receiver registers. As previously noted, call signaling receivers and call signaling receiver registers are associated on a one-for-one basis. In FIG. 12B a single row, for example the "0" row, of each of the words W1 through W5 and CW1 through CW3 corresponds to a group of 16 call signaling receivers. Therefore, there are 16 call signaling receiver registers (FIGS. 12C through 12E) associated with each such row. The words AW1, AW2, and AW3 which comprise a call signaling receiver register are arranged in 48 consecutive word locations in location C of the call store 103. Accordingly, word AW2–1 is removed 16 word locations from word AW1–1 and word AW3–1 is an additional 16 word locations removed from word AW1–1. This arrangement facilitates programming.

The data stored in the block labeled CW3 of FIG. 12B comprises a program return address. That is, in the course of executing the call signaling scanning program a transfer may be made to a sequence to, for example, update one of the counters of the originating registers previously described. After the counter has been incremented, the processor returns to the execution of the call signaling scanning program at the point indicated by the address stored in the block CW3. Again there is one word for each possible scanner row.

There are three common entries shown in FIG. 12G and these are labeled ADR1, ADR2, and ACS1. The scanning of call signaling receivers is performed at timed interrupts. Scanning must be repeated approximately once every 10 milliseconds and in the illustrative system there are odd and even timed interrupts. Successive odd interrupts occur at 10-millisecond intervals and, similarly, successive even interrupts occur at 10-millisecond intervals. Odd and even interrupts occur at 5-millisecond intervals. In the illustrative embodiment approximately one-half of the scanner rows are served at the odd interrupt and the remaining half served at the succeeding even interrupt. Since time is to be minimized, only the word locations associated with the number of scanner rows should be addressed. Accordingly, the word ADR1 shown in FIG. 12G indicates the number of even rows to be scanned at each even interrupt and the word ADR2 indicates the number of odd rows to be scanned at each odd interrupt. The common word SCN1 shown in FIG. 12G is employed by the call signaling scanning program to set an index register which is employed in the course of executing the program.

In summary, since only minor memory space is wasted in any office of a class, space is reserved in location B for all of the data required for the maximum number of scanner rows; however, since great economies may be effected, the associated call signaling receiver registers are placed in location C and communication between the program and these registers is by way of pointers in location B.

TRANSLATIONS

In a modern telephone switching system and particularly in a program controlled telephone switching system there are many possible services and features which may be embodied in the operation of both subscribers' lines and trunks. Additionally, in any telephone switching office there must be provision for interpreting call signaling information requesting connections along with means for providing the information required to establish the desired connections. The office parameters, which have been described previously herein, relate to the office as a whole. There is similar data associated with the lines and trunks which defines the characteristics of the associated lines and trunks. This information is termed "-translations" herein. Translation information is in location 7 of the program store 102 and communication between the call processing program sequences and the translation data is by way of pointers in location 6 of the program store. These pointers are repeated in the call store (location B item 4). The pointers which provide access to the translations are always found at the same absolute addresses in both the program store and the call store for offices of a given generic class. The memory area required to store the office translations varies greatly from office to office. Accordingly, the pointers in locations 6 and B provide access to other pointers (translation head cells) which are in location 7 and which translations thus are not in fixed addresses for all offices. The pointers (translation head cells) in location 7 provide access to the various classes of translation.

In summary, the call processing sequences which are found in locations 1 and 2 of the program store have direct access to the pointers to translation head cells which are found in location 6. The call processing program sequences may thus communicate with the translation head cells in location 7 and through these head cells can communicate with the various translations found in location 7.

The exact translations employed in the illustrative system are not of great significance to the present invention. However, the isolation of the translation data from the memory area which was reserved for the generic program, the generic data, and the unique mutually exclusive programs is of great significance. This isolation permits the operating company to readily change translations to reflect subscribers' service requirements and effects substantial economies since the translations may be distributed through new program stores as the size of an office is increased.

The following discussion is intended to illustrate the types of features which are attributable to lines and trunks and which are implemented by means of translation tables in location 7. With regard to lines there are a number of originating classes. For example, 1. A line may be part of a business group of lines and have restricted calling rights.

2. A line may be serving a physically handicapped person and every call origination requires the assistance of an operator. This type of line is called a manual origination line.

Similarly, there are a number of terminating classes of lines. For example, one line may be part of a group of lines and in the event that a line in the group which is called is busy, the system must automatically complete a connection to another line of the same group.

The telephone switching office of the illustrative embodiment permits a random association of directory numbers of the office and office equipment; therefore, there must be provision for translating a called directory number to an equipment number so that the central processor may establish the appropriate connection.

There are, similarly, a number of features which may be embodied in a trunk circuit and, additionally, trunks inherently serve different functions such as incoming trunks, outgoing trunks, two-way trunks, operator trunks, special announcement trunks, et cetera. The translations serve to define both the function and the features of the trunks and, additionally, set forth the assignment of output points of the signal distributors, the central pulse distributors, and the scanners to the various trunks.

Although the offices of a class are standardized to the greatest possible extent, there is certain wiring in association of equipments which is done on a per office basis. For example, the assignment of CPD points, scan points, and signal distributor points to various pieces of equipment varies from office to office. Therefore, there are unit translations in location 7 which reflect the associations of such equipments.

As previously noted, call signaling information must be interpreted and a path found for establishing the desired connection. This is accomplished by means of the office code translations which are also in location 7. The office code translations provide information for routing the call.

NETWORKS 122A AND 122B

Figure 8:
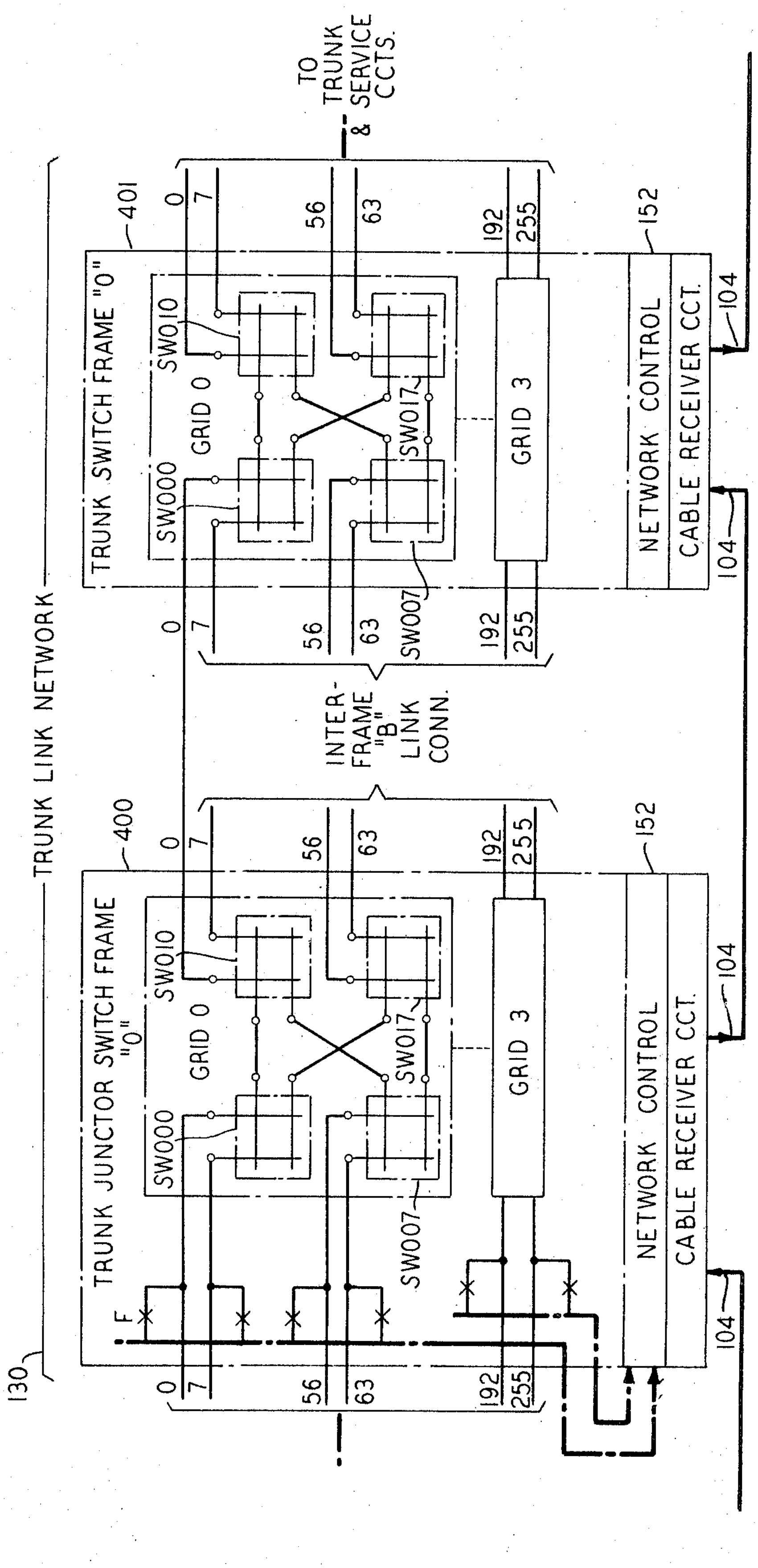
FIG. 8 illustrates, in abbreviated form, the transmission paths through an illustrative network such as those shown in FIGS. 1 and 2.

The switching subnetwork 122A of FIG. 1 is shown in greater detail in FIGS. 8, 9, 9A, and 15. As noted earlier herein, the network 122B of FIG. 2 is substantially identical to network 122A of FIG. 1. In FIG. 8 there is shown the transmission paths of a network such as network 122A and FIG. 9 sets forth certain of the control paths which parallel the transmission paths. In FIG. 8 there is shown the connections for a single-trunk switch frame and a single-trunk junctor switch frame. Each such frame serves 256 terminals. The trunk switch frames and the trunk junctor switch frames which make up a network such as 122A are interconnected by B links which are arranged in a prescribed pattern to provide the necessary access between trunk terminals and junctor terminals. This access pattern is described in greater detail later herein.

Figure 9A:
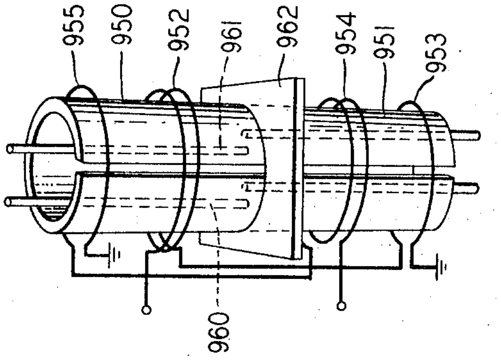
FIG. 9A illustrates the makeup of one cross-point of the network.
Figure 9:
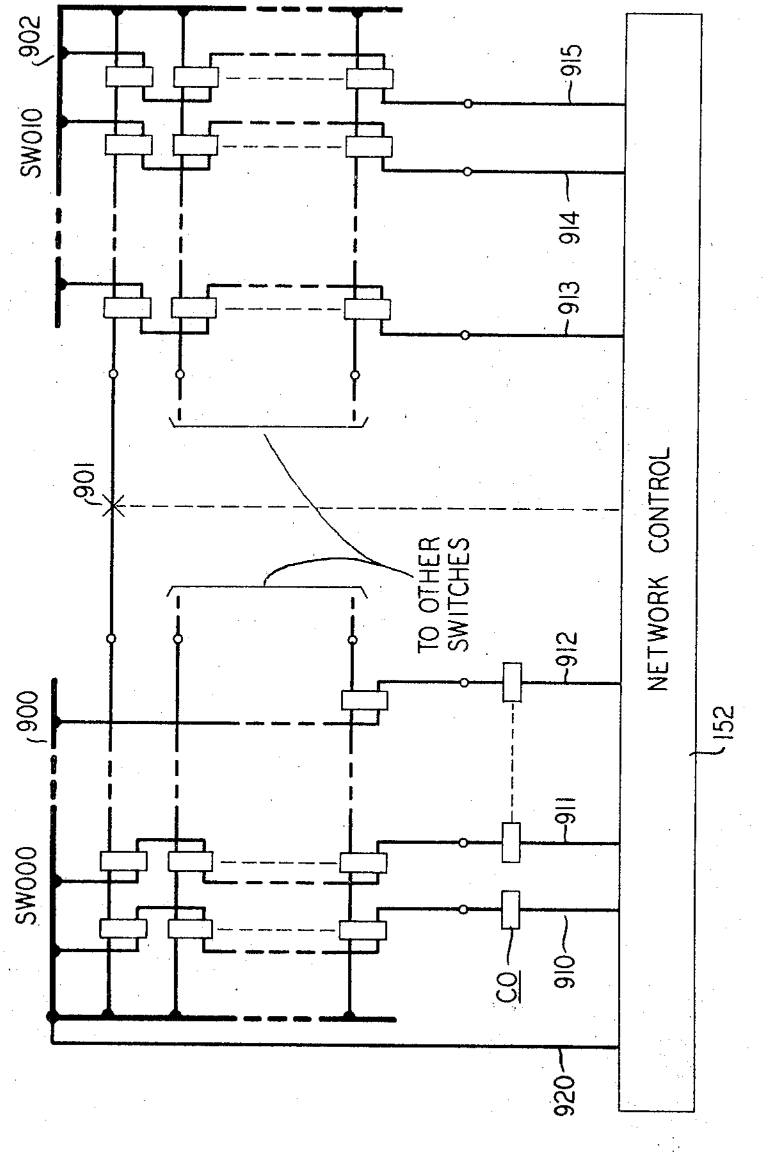
FIG. 9 illustrates, in abbreviated form, the control paths employed in establishing and releasing connections through a network such as those shown in FIGS. 1 and 2.

The basic cross-point of all the stages of the network 122A comprises a pair of differentially wound ferreed switches such as is shown in FIG. 9A. A ferreed switch of the type employed herein is shown in U.S. Pat. No. 3,075,059 issued Jan. 22, 1963. Each switch comprises a magnetic control member effectively divided into two magnetic control members 950 and 951, one above the shunt plate 962 and one below the shunt plate. On each of these magnetic members there are wound two separate windings. In each case one of the windings on a magnetic member has approximately twice as many turns as the other winding on the same magnetic member. The windings on the two magnetic members are interconnected so that the winding 952 having the larger number of turns on the upper magnetic member 950 is connected in series with the winding 953 having the smaller member of turns on the lower magnetic member. Similarly, the remaining upper winding 955 and lower winding 954 also are connected in series. The interconnection is such that it is possible to pulse coincidentally both interconnected pairs of windings to effect closure of the associated cross-point contacts 960, 961. It also is possible to pulse one serially connected pair of windings individually to effect the release of the associated contact set 960, 961.

As seen in FIG. a, the column conductors of the switch 000 are discreet to a particular terminal. Similarly, the windings associated with the switches of a row are connected in series with each other. One end of each of the column control conductors is connected to the network control 152. The other ends of each of the column conductors are connected to the bus 900. Similarly, the windings of the ferreeds of a row are connected in series with each other and one end of each of the windings is connected in series with a selection relay contact such as 901 to a row conductor of a switch such as SW010. The other ends of the control windings of the rows of the switch SW000 are connected to the bus 900. The link selection contacts, such as the make contact 901, are under the control of the network control 152 and are employed in the process of selectively establishing a path between terminals of a switch frame.

In a like manner, one end of each of the row conductors of the switch SW010 and one end of each of the column conductors of the switch SW010 also are connected to a bus 902. The network control 152, in response to commands from the central control 101A, can selectively apply either a positive pulse or a negative signal to the column conductors 910, 911 and 912; may selectively apply either a positive pulse or a negative signal to the control conductors 914 and 915; or may selectively apply via conductor 920 either a positive pulse or a negative signal to the bus arrangement 900. With this range of available control signals and the selective control of the link selection relay contacts, it is possible to perform all of the desired functions in the control of a switch frame.

A fully equipped network such as 122A contains four junctor switch frames and four trunk switch frames which are interconnected as shown in FIG. 15. Each of the trunk switch frames and the junctor switch frames is divided into four grids. Each grid comprises two stages (0 and 1) of switching. Each stage in a grid contains eight 8×8 switches. The links interconnecting the first and second switching stages within the grids of a trunk switch frame are designated A links. The links interconnecting the switches of each grid of a junctor switch frame are designated C links. The links connecting the second stage (stage 1) of a trunk switch frame to the first stage (stage 0) of a junctor switch frame are designated B links. The wiring pattern of the A, B, and C links in a fully equipped network is illustrated in FIG. 6. The B links between stage 1 of the trunk switch frame and stage 0 of the junctor switch frame follow a pattern; the eight vertical outputs (levels) on stage 1, switch 0, grid 0 in trunk switch frame 0, are connected to the input horizontal level 0, stage 0 on switch 0, grids 0–3 of junctor switch frames 0 and 1. A similar relationship exists between each of the other trunk switch frame blocks and the corresponding junctor switch frame blocks. The rules governing the wiring pattern are defined by tables 16A, 16B, 16C, and 16D. The pattern of B link grid to switch level connections as shown in FIG. 15 indicates that two of the second stage switches of a trunk switch frame grid provide access to each of the grids in a junctor switch frame. Thus, in a fully equipped network, there are four paths between any given trunk terminal 164 and any given junctor terminal 160.

As indicated on FIGS. 1 and 2, a junctor grouping frame JGF- provides the means for interconnecting junctor terminals 160- within and between trunk link networks. The wiring patterns of the junctor grouping frame are designed to reduce network blocking by providing uniform distribution of the traffic load.

PATH HUNTING

A complete network path is formed by a combination of links and junctors joined together by the closure of eight ferreed switches. When a path is established, the eight ferreed switches are closed and then cut through contacts in the appropriate trunk circuits or service circuits are closed to establish the communications connection. Communication paths between terminals of a single suboffice network are U-shaped in that they transverse the network twice. Communication paths between terminals of different suboffice networks traverse each suboffice network only once. Thus, for either intrasuboffice or intersuboffice communication paths, the same number of switching stages are traversed.

Each of the trunk terminals 164- on the network of a suboffice is assigned a six-digit trunk network number TNN-. The first two digits of the number define the particular trunk link network upon which the terminal appears. The third digit defines the trunk switch frame. The fourth digit defines the grid. The fifth digit defines the switch. The sixth digit defines the level on the switch. This trunk network number TNN- uniquely defines the equipment location of each trunk terminal 164- of the network. As noted earlier, this TNN is defined by 15 bits of a data word.

As noted earlier herein, processor 101A keeps a continuous record of all pertinent switching information in its temporary memory, call store 103A. This information is used by the processor 101A in hunting fro idle paths through the network 122A. Programs which use this network map and path memory information, either in setting up paths or in releasing them, must keep the network records up to date. There are two basic records maintained, namely, a link memory and a path memory. Link memory is provided on the basis of one bit for each link. A 0 indicates a busy link and a 1 indicates an idle link. Path memory is provided on a basis of one word for each of the trunk terminals 164- in a network. It is used to store the data necessary for idling the link memory associated with a path which has been released.

FIG. 17 is a schematic representation of the communication paths available between one trunk terminal TNN–I of a trunk link network 122- and a specific subgroup JSG1 of the junctor terminals 160-.

FIG. 18 is a schematic representation of the communication paths available between another trunk terminal TNN–O of either the same or a different network and the same specific subgroup of junctors JSG1.

The procedure followed in hunting for an idle path through the network occurs in two segments. First, a search is made for all idle paths between an incoming terminal, e.g., TNN–I and a selected subgroup of junctors, e.g., JSG1. Then a search is made for an idle path from the outgoing terminal, e.g., TNN–O to the same selected subgroup of junctors, e.g., JSG1. This latter search includes hunting for a path to a junctor of the selected subgroup which is accessible from both the incoming and outgoing terminals. If an idle path cannot be found, the process is repeated with respect to a different subgroup of junctors.

A typical path hunt will now be described with respect to the incoming trunk link network terminal TNN–I shown in FIG. 17 and the outgoing network terminal TNN–O shown in FIG. 18. Each of the pertinent A, B, and C links is labeled with a 0 or a 1 defining its busy or idle state. These bits also represent the information stored in the link memory network map described earlier herein.

The A link numbers in FIGS. 17 and 18 correspond to the position or level of the A link as an output of the stage 0 switch of the trunk switch frame.

Each terminal, e.g., TNN–I on a trunk switch frame stage 0 switch has access to eight A links (numbered 0 through 7) which emerge from this switch. The busy-idle status bits for these A links and for the eight A links emerging from an adjacent switch are contained in a single A link word of the network map. Through the eight A links, each terminal TNN–I has access to 64 B links. The 64 busy-idle status bits corresponding to these links are contained in four B link words of the network map. A path through the network must be set up through an idle A link and an idle B link. The bits corresponding to two adjacent A links, e.g., A links 6 and 7, are extracted from the A link word and expanded into a 16-bit word with eight bits for each original A link bit occupying bit positions corresponding to the status bit position of each of the associated B links. This is demonstrated in FIG. 19 where the original A link word 1010111111100110 is selectively expanded to produce the expanded A link word 1111111111111111.

The expanded A link work and the associated B link word are logically combined using the AND function to produce a resultant 16-bit A–B word as indicated in FIG. 19. Each 1 in the A–B word represents an idle partial path from the network terminal TNN–I through the B links to the switches in stage 0 of the junctor switch frame.

Continuing through the network, each B link has access to eight C links. The busy-idle bits corresponding to these C links are arranged so that a bit in a C link word represents only one of the eight C links accessible to a B link. When a C link word is logically ANDed with the appropriate A–B word, a resultant A–B–C word is formed, as shown in FIG. 19. Each 1 in the A–B–C word represents an idle path one stage farther into the network.

The busy-idle state of each junctor is represented by a bit in a junctor word. These words are organized so that each word represents the busy-idle states of a subgroup of 16 junctors, e.g., JSG1. When, as shown in FIG. 19, the A–B–C word is combined by the logical AND function with the appropriate junctor word, the resulting A–B–C–J word includes a plurality of 1's, each of which represents an idle path from the network terminal to a particular idle junctor within a selected subgroup of 16 junctors. Junctor connections within or between networks always are made in integral numbers of junctor subgroups, each including 16 junctors. Different combinations of C link and junctor words can be used to examine paths from a network terminal through any of the 64 junctor subgroups of a full network.

After an A–B–C–J word is determined between a network terminal TNN–I and a junctor subgroup JSG1, a similar word can be derived for another network terminal TNN–O and the same junctor subgroup JSG1, as shown in FIG. 19. Assuming that idle paths are indicated in both A–B–C–J words, it is necessary to consider only the junctor slip. Because of this slip, the bit positions in the A–B–C–J word derived for one network terminal TNN–I will not correspond to those in the A–B–C–BJ word derived for the other terminal TNN–O. In the specific example shown in FIGS. 17 and 18, the junctor slip is equal to one. One of the A–B–C–J words is logically rotated by one bit position, as indicated in FIG. 19, to line up the path bits. The two A–B–C–J words are then logically ANDed to produce a matching word as shown in FIG. 19 and thereby ascertain if any idle path between the network terminals TNN–I and TNN–0 exists. If more than one 1 exists in the resulting matching word, the rightmost one is selected to identify the path which will be used. If no idle path is indicated in the matching word, the remaining A link pairs are tested with the same junctor subgroup. If no idle paths are found, a second junctor subgroup will be tested.

Because the above path hunt technique tests 16 paths at a time and because there is a reasonably high chance of success in locating an idle path using the first junctor subgroup selected, path hunting time is relatively low. Random selection of the A link pair out of the possible four pairs for use in a path hunt ensures some distribution of traffic through the ferreeds of the first stage of switching.

As noted earlier herein, prior to establishing a path between an incoming and an outgoing terminal it is necessary to connect the incoming terminal to a service circuit so that call signaling information can be gathered from the incoming terminal and to connect the outgoing terminal to a service circuit so that call signaling information can be forwarded to a distant office. It occasionally is necessary or advantageous to reuse links for a terminal to terminal connection which have been in use on a previous section of a call or which are being reserved for an anticipated connection. This is termed link sharing. In the above-described example, at least the A links and B links which were used in the service circuit connection to the incoming network terminal should be available for the terminal to terminal connection. Similarly, the A links and B links that are reserved for the terminal to terminal connection should be available for a service circuit to outgoing terminal connection. A failure to share these links would reduce the network traffic capacity by increasing the probability of blocking.

The foregoing description of path hunting provides a basis for the understanding of the present invention in terms of the content of the data messages exchanged between processors of different suboffices when a network connection must be established between terminals serviced by different suboffices.

INTER SUBOFFICE CALL

Two basically different types of calls are possible with the office configuration shown in FIGS. 1 and 2, namely, intrasuboffice and intersuboffice. In the first type of call, both the incoming and outgoing terminals are terminated on a single suboffice network and conventional call processing procedures can be followed. These procedures are described in detail in the aforenoted Doblemaier et al. patent application and the aforenoted Bell System Technical Journal publication. Further description of the usual call handling procedures will not be presented herein. However, if the incoming and outgoing terminals are terminated on different suboffice networks which are controlled by different processors, cooperative call processing becomes necessary. On inter suboffice calls one suboffice processor establishes a path from the incoming terminal through its own network to an appropriate junctor leading to the network of the other suboffice where the processor of the other suboffice must complete the connection. Thus, every call, regardless of type, is switched through only eight stages of switching.

Intersuboffice calls require the exchange of path hunt data in order to determine an idle intersuboffice junctor accessible through the two suboffice networks both to the incoming and outgoing terminals. Also, certain supervisory signaling information and address digits are transmitted between the processors of the suboffices.

For purposes of this description, it is assumed that a request for service is received from a trunk circuit of trunk frame 154A appearing on the terminal identified in FIG. 1 as TNNAI. Interrogation of the program store 102A by central control 101A has provided an order word which includes an instruction commanding the scanning of the trunk circuits of trunk frame 154A. Central control 101A transmits a command via the peripheral bus 104A to trunk scanner 155A requesting that the scanner determine the individual supervisory states of a group of 16 trunk circuits. The identity of the group of circuits is included in the command transmitted from central control 101A. The individual supervisory states of the scanned circuits are transmitted back to central control 101A in parallel over the scanner answer bus 108A.

Central control 101A interprets the scanning results by comparing the present supervisory states of the scanned circuits with their prior supervisory states as recorded in call store 103A. Requests for service are thereby detected. If there is an appropriate change in supervisory state of a scanned circuit, the call store 103A is updated to reflect this change in supervisory state and central control 101A interprets such a change as a request for service.

Central control 101A initiates steps to provide a connection through the network 122A between the incoming trunk terminal and a service circuit comprising an appropriate call signaling receiver. The type of receiver required is determined by examining the class of service mark associated with the incoming trunk terminal TNNAI. This information is found in the program store 102. Having determined the type of call signaling receiver required, central control 101A locates an idle receiver of that type and examines the network map to determine an idle path between the incoming terminal TNNAI and the idle receiver. It is assumed that the selected receiver is terminated on network 122A at terminal TNNAO. The path hunt is performed as described earlier herein with respect to two network terminals, both of which appear on the same network 122A. As a path is found, the links comprising the path are marked busy in the network map and central control 101A prepares a list of operations required to complete the desired connection through the network 122A. This work list and work lists associated with other desired connections through the network 122A are assembled in call store 103A in a network queue to assure timely completion of all the work operations associated with the control of the network 120A.

Supervision of the incoming trunk terminal TNNAI to detect the receipt of call signaling information is transferred to the connected call signaling receiver. The call signaling receivers are not capable of storing information but merely respond to transient signaling received from the incoming trunk terminal. In response to call signaling information the receivers provide information to scanning elements associated therewith. These scanning elements are located either in the ferrod matrix of master scanner 144A or in the ferrod matrix of trunk scanner 155A, depending upon the type of signaling used to convey the information.

The processor 100A, by means of information derived from trunk scanner 155A or master scanner 144A, registers the derived call signaling information in a selected storage area comprising a plurality of storage cells in call store 103. As the call signaling information is registered, processor 100A, by means of program instructions, examines the registered information to determine the destination of the call. The registered information is examined at discrete times in order to determine the destination of the call as early as possible.

Figure 21:
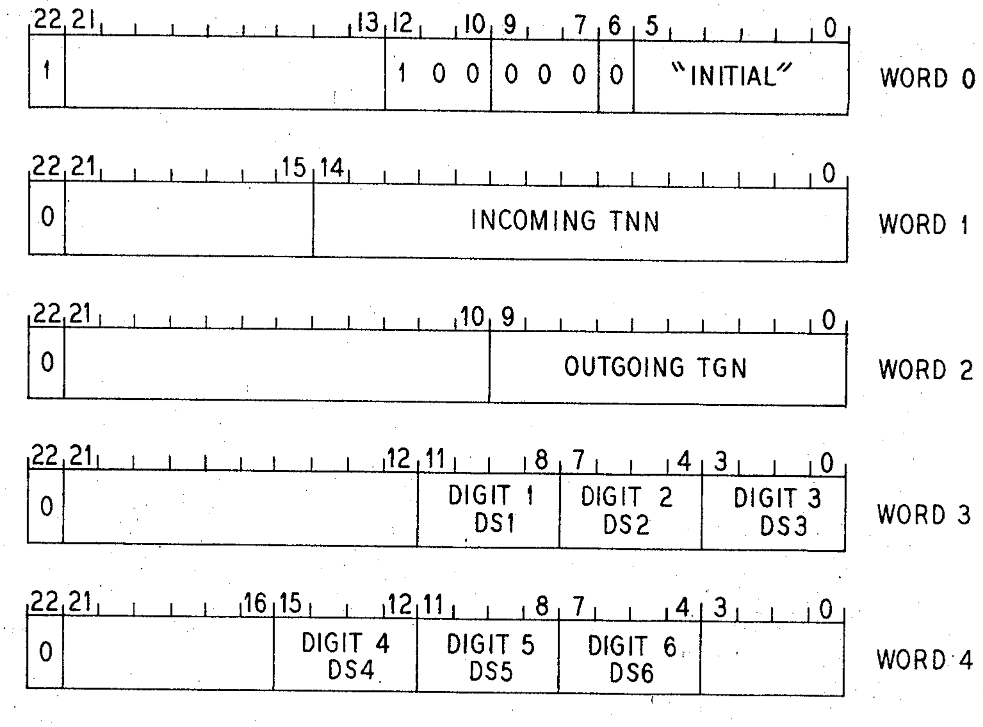

The registered digits are translated to determine the call destination. If the call destination is a specific line served by the network 122B of suboffice B or is one of a plurality of outgoing trunks from suboffice B to a distant office, this information is ascertained by the translation of the digits received from the incoming terminal. Assuming that the call destination can be reached only through a group of trunks terminated on the network of suboffice B, a message must be sent from central processor 100A to central processor 100B. This INITIAL data message is illustrated in FIG. 21.

Figure 20:
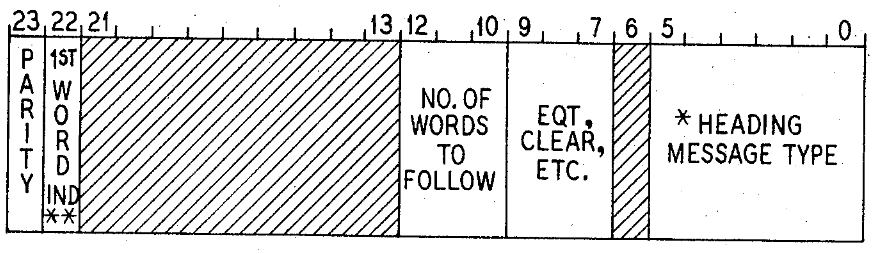

The basic format for all data messages is shown in FIG. 20.

The data messages include separate words for each piece of information and are organized so as to minimize the program steps required for forming and interpreting the data messages. The first word of each message contains a heading code of six binary bits, thereby permitting definition of 64 unique types of messages. It should be noted that the most significant bit of each initial word of a message is a 1 and the most significant bit of each subsequent word of a message is a 0. Thus, one bit of each word specifies whether or not the word is the first word of a data message. Also, three bits of the initial word of every message are used to specify the number of words to follow before the message is complete. For example, the coding of bits 10, 11, and 12 of the first word of the INITIAL message shown in FIG. 21 specifies that four additional words are required to complete the entire message, whereas the coding of the first word of the HUNT message shown in FIG. 22 specifies that five additional words are needed to complete the message. Bits 7, 8, and 9 are reserved for indications of special control functions related to the transmission of data between the suboffices. The particular data message format described herein was designed specifically for compatibility with the organization of the Bell System No. 1 ESS. Many different message formats are possible depending upon the specific processor configurations employed as control elements of the communication system.

The INITIAL message includes five data words. The first word is coded to define the type of message. The second word is coded to define the network number TNNAI of the incoming terminal. The third word is coded to define a number TGN which specifies the group of trunks served by suboffice B through which the call destination can be reached. The fourth word is coded to define the first three digits of the call signaling information received at suboffice A. The fifth word is coded to define the second three digits of the call signaling information received at suboffice A.

This data message is transmitted by central control 101A over peripheral bus 104A to data buffer 121B of suboffice B. An accompanying enable signal from central pulse distributor 143A on a conductor of cable 111A enables the buffer control 150B to accept the data message words transmitted on peripheral bus 104A through cable receiver 151B. As noted earlier herein, data buffer 121B comprises a word-organized memory similar to that employed in call store 103A. Buffer control 150B causes each successively received word of the data message to be stored in successive memory locations of the buffer 121B.

As a part of its normal functions, central processor 100B routinely interrogates data buffer 121B to ascertain if any messages are present therein. Under program control, central control 101B retrieves information stored in data buffer 121B by transmitting commands over the call store communication bus system 106B. These commands specify the addresses of memory locations which are to be accessed by the buffer 121B. In response, buffer 121B transmits the data message words stored therein to central control 101B over the call store bus system 106B. This form of communication between data buffer 121B and central control 101B is identical to that employed for communication between call store 103B and central control 101B. A detailed description of this communication procedure is included in the aforenoted Doblmaier et al. application and the aofrenoted Bell System Technical Journal publication.

The first word of the INITIAL data message is used by processor 101B as a pointer to the appropriate program segment which will interpret and perform data processing functions in accordance with the content of the other words of the INITIAL message. The incoming terminal number TNNAI serves as a unique identifier for the call in addition to specifying the suboffice which serves the incoming terminal. The group of trunks served by suboffice B through which the specified call destination can be reached is identified by a trunk group number TGN. Processor 100B utilizes the trunk group number TGN as a basis for selecting a particular idle trunk to the call destination from the outgoing trunk group identified by the TGN received from suboffice A.

The busy-idle status bits for the trunks in trunk group TGN in call store 103B are examined to determine if any of the trunks are idle. If all trunks are busy, processor 100B would formulate a BUSY data message including the incoming terminal number TNNAI previously received from suboffice A and transmit this BUSY message to processor 100A. Processor 100A then would cause the release of the connection between the incoming terminal TNNAI and the call signaling receiver previously established and would select a tone trunk and cause it to be connected to the incoming terminal TNNAI. In ascertaining the busy state of the outgoing trunk group TGN prior to the establishment of a talking connection through network 122A of suboffice A, useless blocking of network 122A is avoided and the time required to establish such a connection is not wasted. A similar action would be taken if a line were terminated on a busy outgoing terminal TNNBO.

In the example being described it was assumed that the outgoing terminal TNNBO serves a presently idle trunk which is one of the trunk group identified by the trunk group number TGN received by suboffice B from suboffice A in the INITIAL data message. Processor 100B, after selecting trunk terminal TNNBO as an idle member of the trunk group TGN, records the outgoing terminal number in memory and selects an appropriate call signal transmitter. The type of transmitter required is determined by examination of the class of service mark associated with the outgoing terminal TNNBO. A path through network 122B is then hunted between the selected call signal transmitter and the outgoing terminal TNNBO. Upon completion of a successful path hunt, processor 100B controls network 122B to establish the connection from the selected call signal transmitter to the terminal TNNBO.

Processor 100B ascertains by examination of the digits received as a part of the INITIAL data message from suboffice A the appropriate call signaling information which must be forwarded to the distant office over the outgoing trunk terminated on terminal TNNBO. Responsive to control by processor 100B, central pulse distributor 143B causes the signal transmitter to forward the appropriate call signalling information to the distant office.

Interleaved with the above operations, processor 100B selects a subgroup of 16 junctors, defined as JSG1, which interconnects the networks 122A and 122B of suboffices A and B. This selection is made by examination of the previously described parameter and translation information defining the network organization contained in memory. Processor 100B next performs a path hunt between the outgoing trunk terminal TNNBO and the selected junctor subgroup JSG1. As a result of this path hunt, assuming the hunt is successful, an outgoing A–B–C–J word is generated that defines all idle paths through network 122B between the outgoing terminal TNNBO and junctor subgroup JSG1. This outgoing A–B–C–J word is transmitted from processor 100B via peripheral bus 104B to data buffer 121 as a part of a HUNT data message. As described earlier herein with respect to data buffer 121B, the HUNT message is stored in data buffer 121A and retrieved for use by processor 100A.

Figure 22:
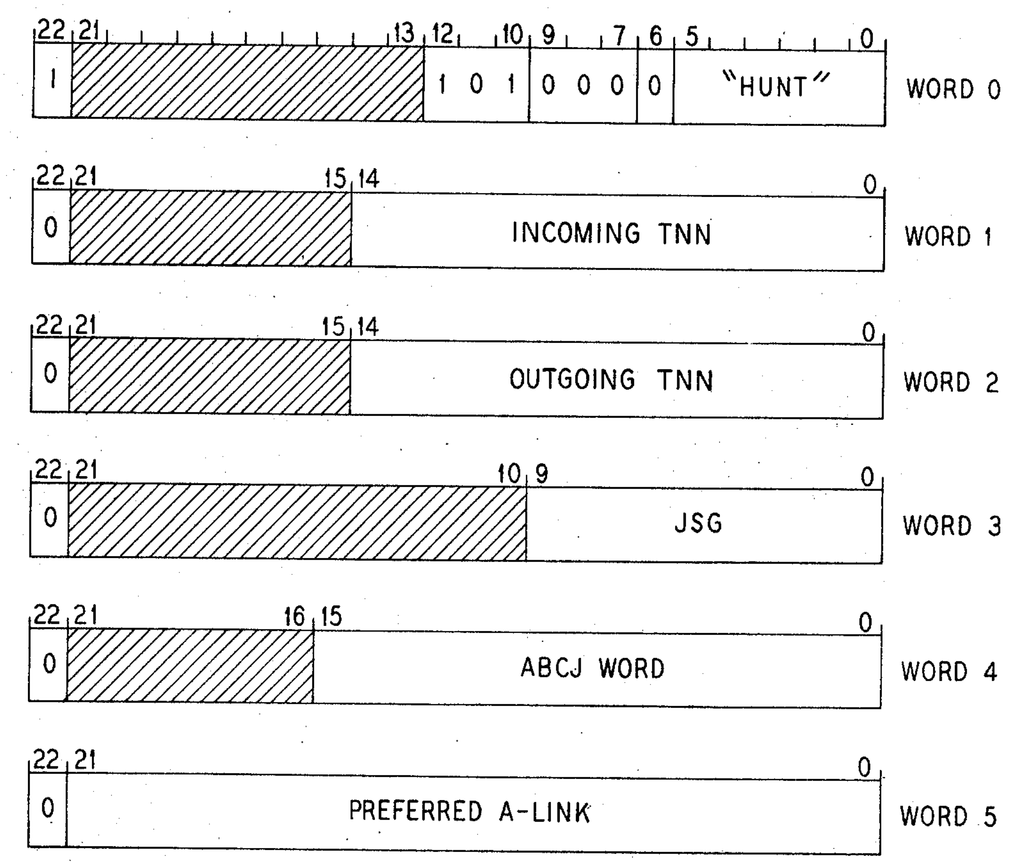

The message format of the HUNT message is illustrated in FIG. 22. The first word of this message defines the type of message and informs processor 100A that a path hunt through network 122A is necessary. Thus the first word is coded to specify a HUNT message and is used to direct central processor 100A to the proper program sequence. The second word of the HUNT data message defines the incoming terminal number TNNAI. This terminal number TNNAI of the incoming terminal serves as a specific identifier for suboffice A of the call being processed throughout the cooperative processing of processors 100A and 100B. The third word of the HUNT message is coded to specify the number of the outgoing terminal TNNBO. The fourth word of the HUNT message is coded to identify the junctor subgroup JSG1 selected by processor 100B and to which the outgoing A–B–C–BJ word, included as the fifth word of the HUNT message, is pertinent. The last word of the HUNT message identifies the preferred A link which is the A link used as a part of the connection between the outgoing terminal TNNBO and the selected call signal transmitter in suboffice B. As noted above, network blocking will be minimized when this particular A link can be shared with the talking connection. Sharing is possible because the call signaling path through network 122B and the talking path through network 122B never will be connected simultaneously.

Processor 100A responds to the HUNT message by searching its own network map in call store 103A for all idle paths between the incoming terminal TNNAI and junctor subgroup JSG1. The result of this path hunt is a matching word defining all the possible paths through networks 122A and 122B, between the incoming terminal TNNAI and the outgoing terminal TNNBO which use members of junctor subgroup JSG1. One of these paths is selected and reserved for future use by processor 100A.

Figure 23:
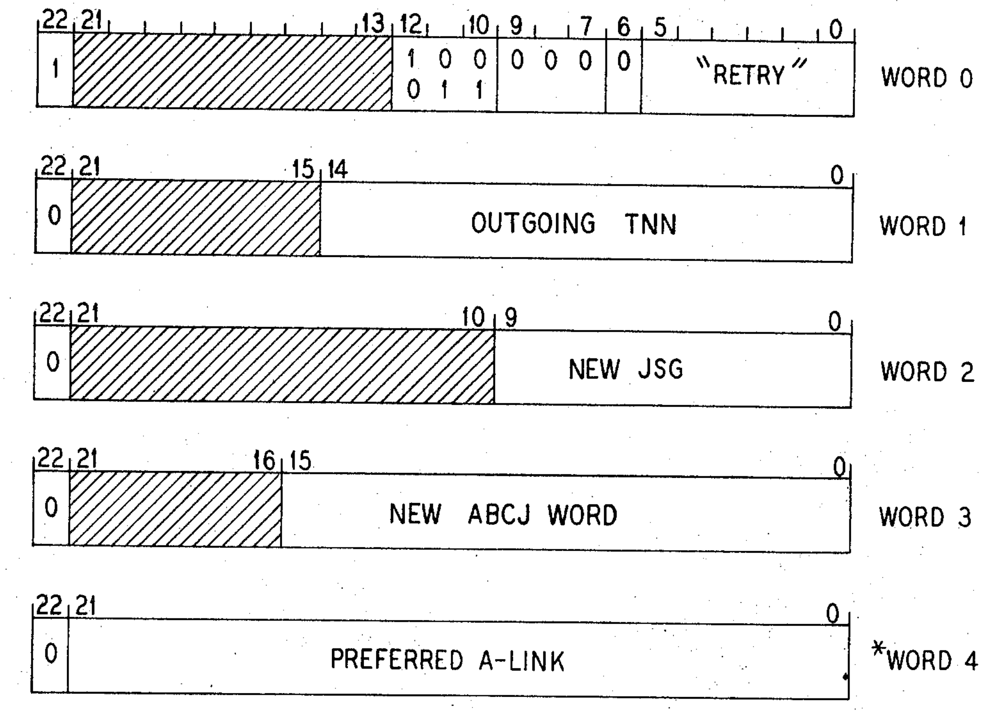

For purposes of the description which follows, it is assumed that the path hunt performed by processor 100A is successful in locating an idle path between the incoming terminal TNNAI and an idle member of junctor subgroup JSG1 which is accessible to outgoing terminal TNNBO. However, in the event that no such idle path is found, processor 100A will select and hunt paths to other intersuboffice junctor subgroups until an idle path is found between the incoming terminal TNNAI and an idle member of junctor subgroup JSG1. When such additional path hunts are performed, a RETRY data message, as shown in FIG. 23, is formulated by processor 100A for transmission to suboffice B. The RETRY message initial word defines the type of message and indicates the program segments necessary for processing the content of the message. The second word of the RETRY message defines the number TNNBO of the outgoing terminal. The outgoing terminal number TNNBO serves as an identifier for suboffice B of the call to be processed. The third word of this message specifies the junctor subgroup JSG- to which the successful path hunt was made by processor 100A. The fourth word of the message defines an incoming A–B–C–J word which indicates all idle paths between the incoming terminal TNNAI and the junctor subgroup JSG- defined in the previous word of the message. The last word of the message defines the preferred A link for the same link sharing purposes noted above with respect to the HUNT message. Responsive to the reception of a RETRY message, processor 100B of suboffice B discards its previous path hunt results, performs a new path hunt between the outgoing terminal TNNBO and the junctor subgroup JSG- defined in the third word of the RETRY message, generates a matching word using its own path hunt result, i.e., an outgoing A–B–C–J word, and the incoming A–B–C–J word from the RETRY message, and considers the preferred A link to determine if it is possible for use with respect to the generated matching word. If processor 100B is not successful in defining a path between the outgoing terminal TNNBO and the junctor subgroup JSG- identified in the RETRY message, processor 100B will perform another path hunt to another junctor subgroup and formulate a second RETRY message for transmission to suboffice A. This attempt to locate an idle path through both networks 122A and 122B by the processors 100A and 100B continues until an idle path is found. When a commonly accessible idle path is defined, the successful processor formulates a PATH data message for transmission to the other suboffice.

Figure 24:
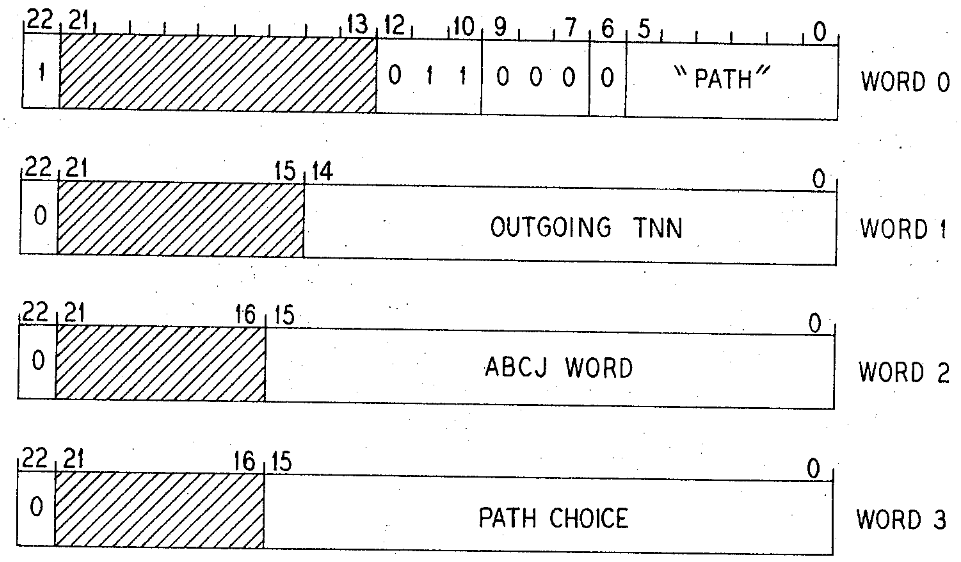
Figure 28:
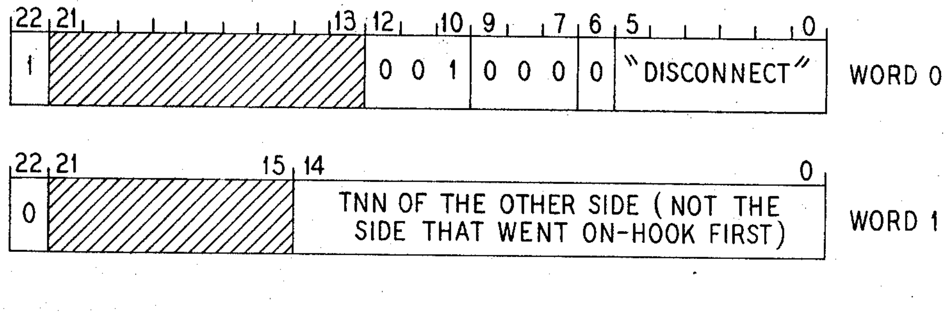

It is assumed that processor 100A is successful in finding a commonly accessible junctor between the incoming and outgoing terminals TNNAI and TNNBO. Accordingly, processor 100A formulates a PATH data message for transmission to suboffice B as shown in FIG. 24.

The first word of this PATH message is coded to define the type of message and to indicate to processor 100B the program sequences it must perform with respect to the message content. The second word of the PATH message is coded to define the number of the outgoing terminal TNNBO. This identifies the particular call to which the message is relevant. The third word of this message defines the aforenoted matching word indicating all possible paths between the incoming and outgoing terminals using junctor subgroup JSG1. The last word of the PATH message specifies the particular path selected by processor 100A for use as a talking path between the incoming and outgoing terminals TNNAI and TNNBO.

The PATH message is transmitted from central processor 100A via peripheral bus 104A to data buffer 121B as previously described. The message is retrieved from data buffer 121B by processor 100B via the call store communication system 106B as previously described.

Figure 25:
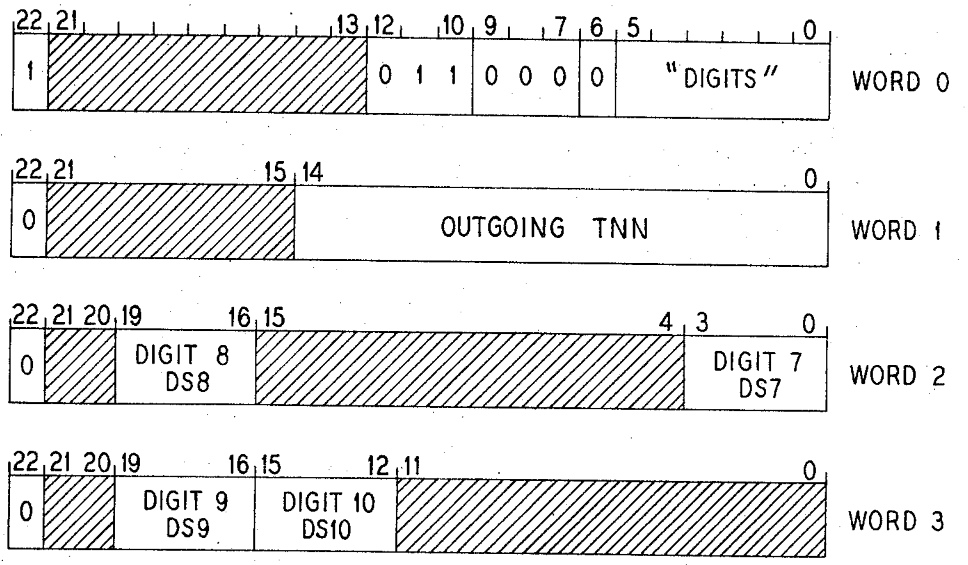

No further inter suboffice communication is necessary after the complete talking path has been hunted and reserved in both suboffices A and B. During the time the above-described cooperative path hunt operations were being performed, processor 100A continued to collect and store all additional call signaling information received over the incoming terminal TNNAI. When all call signaling information has been received, collected, and stored in call store 103A, processor 100A formulates a DIGITS message, as shown in FIG. 25, for transmission to suboffice B.

The initial word of the DIGITS message defines the type of data message and serves as an indicator to processor 100B of the program sequences necessary to process the content of the message. The second word of the DIGITS message defines the number TNNBO of the outgoing terminal in suboffice B. The third and the last words of this message are coded to define the remaining digits received by suboffice A from the incoming terminal TNNAI. The DIGITS message is transmitted from processor 100A via data buffer 121B to processor 100B as described earlier herein.

After transmitting the DIGITS message to suboffice B, processor 100A proceeds to disconnect the call signaling receiver from the incoming terminal TNNAI and to connect the incoming terminal TNNAI to the selected junctor of junctor subgroup JSG1. The aforenoted matching word retained in call store 103A of central processor 100A serves as a basis for defining the selected talking path through network 122A whose establishment is now completed under control of processor 100A.

Figure 26:
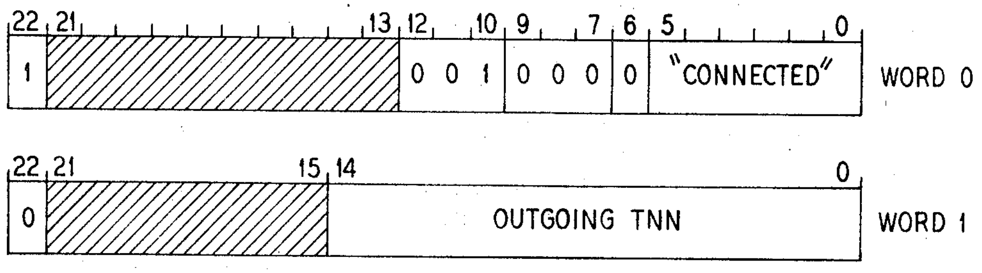

Processor 100A notifies suboffice B of the establishment of a partial talking path through network 122A by means of a CONNECTED data message, as shown in FIG. 26. The first word of this message is coded to specify the type of message and thereby indicate the program segments needed to process its contents. The second word of the CONNECTED message defines the number TNNBO of the outgoing terminal. This message is transmitted from processor 100A via data buffer 121B to processor 100B as described above.

While the above-described operations were occurring in suboffice A, processor 100B completes its control of the transmission of call signaling information over the outgoing terminal TNNBO to the distant office as required in accordance with the content of the previously received DIGITS message. Upon completion of call signaling information transmission and reception of the aforementioned CONNECTED message from suboffice A, processor 100B releases the connection through network 122B between the call signaling transmitter and the outgoing trunk terminal TNNBO. Processor 100B then transmits commands to network 122B which cause the establishment of a partial talking path between the outgoing terminal TNNBO and the selected junctor of junctor subgroup JSG1. The selected path defined by the previously received PATH message provides the basis for this operation. This operation completes the establishment of a complete talking path through both networks 122A and 122B, between the incoming trunk terminal TNNAI and the outgoing trunk terminal TNNBO.

Figure 27:
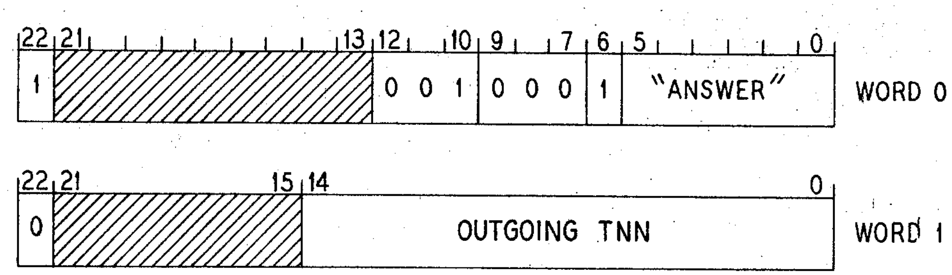

The next event to occur in the course of processing a normal call is the detection of an answer signal from the outgoing terminal TNNBO. As a part of its normal processing routines, processor 100B causes trunk scanner 155B periodically to scan the supervisory state of the outgoing terminal TNNBO and to return this state information to processor 100B. When a change of state is detected indicating an answer signal, processor 100B formulates an ANSWER data message for transmission to suboffice A, as shown in FIG. 27. This two-word message includes information defining the type of message and information specifying the number TNNAI of the incoming terminal. This message is transmitted from processor 100B via peripheral bus 104B and data buffer 121 to processor 100A in the same manner as described earlier. In response to the ANSWER message, processor 100A controls signal distributor 156A in such a way that an answer signal is forwarded over the incoming terminal TNNAI toward the call originating station.

The setup of the call is now complete. The next event which will occur is the termination of the call by one of the parties to the call. Assuming that the called party hangs up first, this change in supervisory state will be detected by trunk scanner 155B at outgoing terminal TNNBO during routine scanning under the control of processor 100B. When the change in supervisory state is noted by central processor 100B, a DISCONNECT data message is formulated for transmission to suboffice A. This two-word message shown in FIG. 28 defines the type of message and the number TNNAI of the incoming terminal. The DISCONNECT data message is transmitted to processor 100A as described above.

In response to the DISCONNECT data message, the processor 101A controls signal distributor 156A so that a disconnect signal will be forwarded toward the originating station over the incoming terminal TNNAI. Processor 100A then controls trunk scanner 155A periodically to scan the incoming terminal TNNAI for a disconnect signal from the originating end of the call.

Figure 29:
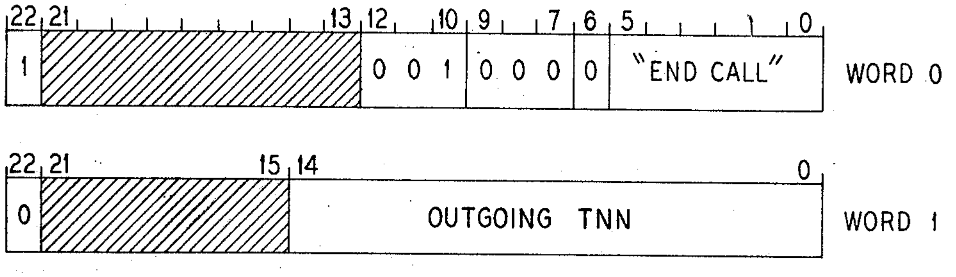

In response to the detection of a disconnect signal by trunk scanner 155A and the receipt of this information by processor 100A, and END CALL message is prepared, as shown in FIG. 29, for transmission to suboffice B. This message is transmitted to processor 100B as described above. The END CALL message includes information defining the type of message and the number TNNBO of the outgoing terminal. Responsive to the receipt of the END CALL message, processor 100B updates the terminal and path memory associated with the call in call store 103B. Following transmission of the END CALL message, central processor 100A updates the terminal and path memory bits associated with the call in call store 103A.

FIGS. 30, 31 and 32 illustrate respectively various embodiments of the invention with respect to the organization of the data channels between the processors of suboffices A and B. The specific illustrative embodiment described in the aforegoing text is illustrated in FIG. 30. In this arrangement, the central control 101A of suboffice A is connected by way of peripheral bus 104A to the data buffer 121B of suboffice B, and central control 101B of suboffice B is connected to data buffer 121A of suboffice A by peripheral bus 104B. Thus, the data buffer of one suboffice is treated as a peripheral output unit of the processor of the other suboffice. Also in FIG. 30, data buffer 121A of suboffice A is connected to central control 101A by the memory communication system 106A, and data buffer 121B of suboffice B is connected to central control 101B by the memory organization system 106B. Thus, in this arrangement, the data buffer of one suboffice is treated as a part of call store memory by the central control of that same suboffice.

FIG. 31 illustrates a different communicating arrangement between the central controls of the suboffices A and B. In this arrangement, central control 101A of suboffice A is connected directly by a data channel DCAB to the central control 101B of suboffice B, and central control 101B of suboffice B is connected directly by a data channel DCBA to central control 101A of suboffice A. Any buffering necessary is performed internally within the respective central controls 101A and 101B. In this arrangement each central control is treated as an input-output unit of the central control in the other suboffice.

FIG. 32 illustrates still another embodiment of the invention. In this arrangement each central control 101A, 101B is connected by its own peripheral bus 104A, 104B, to a data buffer 121B, 121A in the other suboffice. Thus, as in the case of the arrangement shown in FIG. 30, each data buffer is treated as an output device of the central control in the other suboffice. In FIG. 32, data buffer 121A of suboffice A is connected to central control 101A by way of an input bus arrangement 108A. Similarly, data buffer 121A of suboffice B is connected to central control 101B by its input bus arrangement 108B. In the context of a No. 1 ESS switching office, the input bus 108 serves as a communication channel from the scanner circuits associated with the network to the central control. Thus, in the arrangement shown in FIG. 32, the data buffer of each suboffice is treated as a peripheral output device by the central control of the other suboffice, and as a peripheral input device by the central control of its own office.

What is claimed is:

1. A communications switching office comprising
   a first network and first control means for controlling said first network selectively to establish communications paths between terminals thereof;
   a second network and second control means for controlling said second network selectively to establish communication paths between terminals thereof;
   connections between terminals of said first and second networks;
   means for exchanging data messages between said first and second control means;
   path hunt means in said first and second control means for cooperatively selecting and generating data defining an idle path from a terminal of said first network through said first network, an idle one of said connections, and said second network to a terminal of said second network in accordance with a plurality of data messages exchanged via said data exchanging means between said first and second control means;
   and said first and second control means respectively controlled in accordance with said generated data for controlling said first and second networks selectively to establish said selected idle path.

2. A communications switching office according to claim 1 wherein said exchanged data messages comprise
   a first message defining idle paths through said first network between said terminal of said first network and idle ones of said connections transmitted from said first control means to said second control means;
   and a second message defining said selected idle path transmitted from said second control means to said first control means.

3. A communications switching office according to claim 1 wherein said data messages comprise:
   a first message defining idle paths through said first network between said terminal of said first network and idle ones of said connections transmitted from said first control means to said second control means;
   a second message defining idle paths through said second network between said terminal of said second network and different idle ones of said connections transmitted from said second control means to said first control means;
   and a third message defining said selected idle path transmitted from said first control means to said second control means.

4. A communications switching office according to claim 1 wherein
   said first control means comprises a first program-controlled data processor;
   said first network comprises a portion of a first input-output system which provides input data to said first processor and which executes commands received from said first processor;
   said second control means comprises a second program-controlled data processor;
   said second network comprises a portion of a second input-output system which provides input data to said second processor and which executes commands received from said second processor;
   said data exchange means comprises first and second data buffer means;
   said first buffer means being accessible to said second processor as an output element of said second input-output system and being accessible to said first processor as an input element of said first input-output system;
   and said second buffer means being accessible to said first processor as an output element of said first input-output system and being accessible to said second processor as an input element of said second input-output system.

5. A communications switching office according to claim 1 wherein
   said first control means comprises a first program-controlled data processor, a first memory, and a first memory bus system for communicating data between said first memory and said first processor;
   said first network comprises a portion of an input-output system providing input data to said first processor by way of a first input-output bus system and executing commands received from said first processor over said first input-output bus system;
   said second control means comprises a second program-controlled data processor, a second memory, and a second memory bus system for communicating data between said second memory and said second processor;
   said second network comprises a portion of a second input-output system providing input data to said second processor over a second input-output bus system and executing commands received from said second processor over said second input-output bus system;
   said data exchanging means comprises first and second data buffer means;
   said first buffer means being accessible to said second processor over said second input-output bus system and to said first processor over said first memory bus system;
   and said second buffer means being accessible to said first processor over said first input-output bus system and to said second processor over said second memory bus system.

6. A communications switching office in accordance with claim 1 wherein said second control means comprises means for ascertaining the busy-idle state of said terminal of said second network and means for inhibiting said path hunt means if said terminal of said second network is ascertained to be busy.

7. A communications switching office comprising at least first and second suboffices;
   each said suboffice comprising a suboffice network for selectively establishing communication paths between terminals thereof, suboffice control means, and means for providing said suboffice control means with call information defining a suboffice network terminal and a call destination, said suboffice control means being responsive to said call information for hunting and selecting an idle path from said defined terminal through said suboffice network in accordance with said defined call destination and for controlling selectively said suboffice network to establish said selected idle path;
   intersuboffice junctors connected between terminals of said first and second suboffice networks;
   data exchanging means, separate from said networks and junctors, for exchanging data messages between said first and second suboffice control means;
   said first and second suboffice control means being cooperatively responsive to call information defining a first suboffice network terminal and a call destination connectable to said defined first suboffice network terminal through a second suboffice network terminal for cooperatively hunting, selecting, and controlling the establishment of an idle communication path between said defined first suboffice network terminal and said second suboffice network terminal through said first suboffice network, an idle one of said intersuboffice junctors, and said second suboffice network;

said cooperative path hunting and selection by said first and second suboffice control means being controlled in accordance with data messages exchanged between said first and second suboffice control means by way of said data exchanging means.

8. A communications switching office according to claim 7 wherein said exchanged data messages comprise a first message defining idle paths between said second suboffice network terminal and idle ones of said intersuboffice junctors transmitted from said second control means to said first control means;

and a second message defining said idle communication path transmitted from said first control means to said second control means.

9. A communications switching office according to claim 7 wherein said data messages comprise:

a first message defining idle paths through said second suboffice network between said second suboffice network terminal and idle ones of said intersuboffice junctors transmitted from said second control means to said first control means;

a second message defining idle paths through said first suboffice network between said first suboffice network terminal and different idle ones of said intersuboffice junctors transmitted from said first control means to said second control means;

and a third message defining said idle communication path transmitted from said second control means to said first control means.

10. A communications office comprising:

a first network having a calling terminal;

first control means responsive to received call data for hunting, selecting, and controlling the establishment of idle paths between terminals of said first network;

a second network having a called terminal;

second control means responsive to received call data for hunting, selecting, and controlling the establishment of idle paths between terminals of said second network;

junctors connected between terminals of said first and second networks;

bidirectional data exchange means, separate from said networks and said junctors, for exchanging data messages between said first and second control means;

said first control means comprising means responsive to call data defining said calling terminal and a call destination connectable to said calling terminal via said called terminal for deriving a first call data message specifying said called terminal for transmission over said data exchange means to said second control means;

said second control means comprising means responsive to said first call data message for deriving a second call data message specifying idle paths between said called terminal and idle ones of said junctors for transmission over said data exchange means to said first control means;

said first control means comprising means responsive to said second call data message for deriving a third call data message specifying a selected idle path between said calling terminal and said called terminal for transmission over said data exchange means to said second control means;

said first and second control means being controlled in accordance with the content of said third call data message to control the establishment of said selected idle path.

11. A communications switching office comprising at least two switching networks, each having control means respectively associated therewith for controlling said associated networks selectively to establish communication paths between terminals thereof;

junctors connected between said networks;

data exchange means between said control means;

means in one of said control means for determining idle paths through its associated network between a terminal thereof and idle ones of said junctors and for transmitting a first data message defining said determined idle paths to another of said control means via said data exchange means;

means in said other control means controlled in accordance with said first data message for determining and selecting an idle path through its associated network, an idle one of said junctors, and the network associated with said one control means between a terminal of said network associated with said other control means and said terminal of said network associated with said one control means and for transmitting another data message defining said selected idle path to said one control means via said data exchange means;

and said one and said other control means including means controlled in accordance with the content of said other data message to control said networks associated therewith selectively to establish said selected idle path.

12. A communications switching office comprising a first network controlled by a first control means for selectively establishing communication paths between terminals of said first network;

a second network controlled by second control means for selectively establishing communication paths between terminals of said second network;

junctors connecting terminals of said first network with terminals of said second network;

means for exchanging data between said first and second control means;

said first control means comprising means for hunting and identifying idle paths through said first network between a specified first network terminal and idle junctors and means for transmitting path hunt data defining said identified idle paths to said second control means via said data exchanging means;

said second control means comprising means for selecting and identifying one idle path through said second network between a specified second network terminal and one idle junctor to which an idle first network path is available according to said path hunt data, and means for transmitting path selection data defining said one idler junctor to said first control means via said data exchanging means;

said second control means being controlled in accordance with the identity of said one selected idle path for controlling said second network selectively to establish said selected one idle path between said specified second network terminal and said one idle junctor;

and said first control means being controlled in accordance with said path selection data for controlling said first network selectively to establish said available idle path between said specified first network terminal and said one idle junctor.

13. A communications switching office in accordance with claim 12 wherein said first control means comprises a first program-controlled data processor;

said first network comprises a portion of a first input-output system which provides input data to said first processor and which executes commands received from said first processor;

said second control means comprises a second program-controlled data processor;

said second network comprises a portion of a second input-output system which provides input data to said second processor and which executes commands received from said second processor;

said data exchange means comprises first and second data buffer means;

said first buffer means being accessible to said second processor as an output element of said second input-output system and being accessible to said first processor as an input element of said first input-output system;

and said second buffer means being accessible to said first processor as an output element of said first input-output system and to said second processor as an input element of said second input-output system.

14. A communications switching office in accordance with claim 12 wherein said first control means comprises a first program-controlled data processor;

said first network comprises a portion of an input-output system for providing input data to said first processor by way of a first input-output bus system and for executing commands received from said first processor over said first input-output bus system;

said second control means comprises a second program-controlled data processor;

said second network comprises a portion of a second input-output system for providing input data to said second processor over a second input-output bus system and for executing commands received from said second processor over said second input-output bus system;

said first control means comprises a first memory and a first memory bus system for communicating data between said first memory and said first processor;

said second control means comprises a second memory and a second memory bus system for communicating data between said second memory and said second processor;

said data exchanging means comprises first and second data buffer means;

said first buffer means being accessible as an output element to said second processor over said second input-output bus system and as a memory element to said first processor over said memory bus system;

and said second buffer means being accessible as an output element to said first processor over said first input-output bus system and as a memory element to said second processor over said second memory bus system.

15. A communications switching office comprising a first network selectively controlled by a first control means to establish communication paths between terminals of said first network;

a second network selectively controlled by a second control means to establish communication paths between terminals of said second network;

junctor means connecting terminals of said first network to terminals of said second network;

data exchange means for exchanging data messages between said first and second control means;

means in said first control means responsive to call information received with respect to an incoming terminal of said first network and specifying a call destination reachable through an outgoing terminal of said second network for deriving a first data message identifying said outgoing terminal and for transmitting said first data message to said second control means via said data exchange means;

means in said second control means responsive to said first data message for hunting and defining second network idle paths between said outgoing terminal and idle ones of said junctor means;

means in said second control means for deriving a second data message identifying said defined second network idle paths and for transmitting said second data message to said first control means via said data exchange means;

means in said first control means responsive to said second data message for hunting and defining first network idle paths between said incoming terminal and said idle ones of said junctor means;

means in said first control means for deriving from said second data message and said defined first network idle paths a third data message identifying one idle path between said incoming and outgoing terminals through both said networks and one idle junctor means;

means in said first control means controlled in accordance with the content of said third data message for controlling the establishment of a path through said first network between said incoming terminal and said one idle junctor means;

and means in said second control means controlled in accordance with the content of said third data message for controlling the establishment of a path through said second network between said outgoing terminal and said one idle junctor means.

16. A communications switching office comprising a first suboffice comprising a first network having first terminals and second terminals and first control means for selectively controlling said first network in accordance with call data to establish communication paths between said first and second terminals;

a second suboffice comprising a second network having third terminals and fourth terminals and second control means for selectively controlling said second network in accordance with call data to establish communication paths between said third and fourth terminals;

intranetwork junctors interconnecting certain of said terminals and interconnecting certain of said third terminals;

internetwork junctors connecting others of said second terminals with others of said third terminals, said internetwork junctors being arranged in groups;

data exchange means for exchanging data messages between said first and second control means;

said first control means comprising means responsive to call data defining a calling first terminal and a call destination available through one or more of said fourth terminals for formulating a first data message identifying said one or more fourth terminals and means for transmitting said first data message via said data exchange means to said second control means;

said second control means comprising means responsive to said first data message and controlled in accordance with the content thereof for selecting an idle one of said one or more fourth terminals, means for defining idle paths between said selected idle fourth terminal and idle ones of said internetwork junctors within a selected group thereof, means for formulating a second data message identifying said defined idle paths, and means for transmitting said second data message via said data exchange means to said first control means;

said first control means comprising means responsive to said second data message and controlled in accordance with the content thereof for defining one idle path between said calling first terminal and said selected idle fourth terminal through an idle one of said selected group of internetwork junctors, means for formulating a third data message identifying said defined idle path, and means for transmitting said third data message via said data exchange means to said second control means;

said first control means being controlled in accordance with the content of said third data message to control said first network in establishing a communication path between said calling first terminal and the second terminal to which said selected one idle internetwork junctor is connected;

and said second control means being controlled in accordance with the content of said third data message to control said second network in establishing a communication path between said selected idle fourth terminal and the third terminal to which said selected one idle internetwork junctor is connected.

17. A communications switching office in accordance with claim 16 wherein said second control means comprises means responsive to a failure by said selecting means to locate an idle one of said one or more fourth terminals for formulating a BUSY data message for transmission by said transmitting means via said data channel means to said first control means;

and said first control means comprises means responsive to said busy data message for selecting an idle terminal of said first network to which a tone source is connected, means for selecting an idle path between said idle terminal of said first network and said calling first terminal, and means for controlling said first network to establish a communication path between said calling first terminal and said idle terminal of said first network.

18. A communications switching office in accordance with claim 16 wherein said first control means comprises means responsive to establishment of said path between said calling first terminal and said second terminal for formulating a CONNECTED data message for transmission to said second control means via said data channel means;

and said second control means comprises means responsive to said CONNECTED data message for initiating control by said second control means of said second network to establish said path between said selected idle fourth terminal and said third terminal.

19. A communications switching office comprising a first network and first control means for controlling said first network selectively to establish communication paths between terminals thereof;

a second network and second control means for controlling said second network selectively to establish paths between terminals thereof;

junctor means connecting terminals of said first network with terminals of said second network;

data exchange means for exchanging data messages between said first and second control means;

means in said first control means responsive to data received with respect to an incoming terminal of said first network and specifying a call destination available through an outgoing terminal of said second network for formulating an INITIAL data message specifying said outgoing terminal and said incoming terminal for transmission via said data exchange means to said second control means;

means in said second control means responsive to said INITIAL data message for formulating a HUNT data message specifying said incoming terminal, said outgoing terminal, a selected group of said junctor means, and idle paths between said outgoing terminal and idle ones of said selected group of junctor means for transmission via said data exchange means to said first control means;

means in said first control means responsive to said HUNT data message for formulating a PATH data message specifying said outgoing terminal, idle paths between said incoming terminal and said idle ones of said selected group of junctor means, and a selected idle path between said incoming terminal and said outgoing terminal through one idle junctor means within said selected group thereof;

said first control means controlled in accordance with the content of said PATH data message for selectively controlling said first network to establish a first portion of said selected one idle path between said incoming terminal and said one idle junctor means;

means in said first control means for formulating a CONNECTED data message specifying said outgoing terminal for transmission via said data exchange means to said second control means;

said second control means being responsive to said CONNECTED data message and controlled in accordance with the content of said PATH data message for selectively controlling said second network to establish a second portion of said selected one idle path between said outgoing terminal and said one idle junctor means.

20. A communication switching office comprising a plurality of discrete switching networks interconnected by groups of junctors;

a plurality of control means interconnected by data exchange means, each said control means being discrete to one of said networks;

each said control means comprising means for receiving data messages relative to said one network and other networks, for hunting and selecting idle paths between terminals of said one network in accordance with received data messages, for formulating data messages relative to said one network and other networks for transmission via said data exchange means to the other control means discrete to said other networks, and for controlling said one network selectively to establish paths between terminals thereof in accordance with received data messages;

said data messages comprising:

an INITIAL message identifying a terminal of said one network, terminals of another network through which a call destination specified by data received with respect to said identified terminal of said one network can be reached, and information to be transmitted to said call destination;

a HUNT message identifying the terminal of another network identified in a previously received INITIAL message, a selected one of the terminals of said one network defined in said previously received INITIAL message, a group of said junctors connected between said one network and the other network identified in said previously received INITIAL message, and idle paths between said selected one terminal of said one network and idle ones of said identified groups of junctors;

a RETRY message identifying the terminal of another network identified in a previously received HUNT or INITIAL message, a group of junctors different from the group identified in said previously received HUNT message or in a previously received RETRY message, and idle paths between the terminal of said other network identified in said previously received HUNT or INITIAL message and idle ones of said different group of junctors;

a PATH message identifying the terminal of another network identified in a previously received HUNT or INITIAL message, idle paths between the terminal of said one network identified in said previously received HUNT message or in a previously received RETRY message and idle ones of the group of said junctors identified in said previously received HUNT or RETRY message, and a selected idle path including one idle junctor between said terminal of said one network identified in said previously received HUNT or RETRY message and said terminal of said other network identified in said previously received HUNT or INITIAL message;

each of said control means being controlled in accordance with a PATH message formulated therein for controlling said one network selectively to establish a path between the terminal of said one network identified in said previously received HUNT or RETRY message and said one idle junctor of the group of junctors identified in said formulated PATH message;

and each said control means being controlled in accordance with a received PATH message formulated by another control means for controlling said one network selectively to establish a path between the terminal of said one network identified in said received PATH message and the one idle junctor of the group of junctors identified in said received PATH message.

21. A communications switching office in accordance with claim 20 wherein each of said data messages comprises a plurality of data words and wherein the first data word of each data message includes a first word of message indicator and information defining the type of data message and the number of words in said data message.

22. A communications switching office in accordance with claim 9 wherein each of said data messages comprises a plurality of data words and wherein the first data word of each data message includes a first word of message indicator and information defining the type of data message and the number of words in said data message.

* * * * *

UNITED STATES PATENT OFFICE

CERTIFICATE OF CORRECTION

Patent No. 3,643,032 Dated February 15, 1972

Inventor(s) Werner Ulrich and Frank S. Vigilante

It is certified that error appears in the above-identified patent and that said Letters Patent are hereby corrected as shown below:

Col. 1, line 39, "truck" should read --trunk--;
line 40, "trucks" should read --trunks--;
line 43, "truck" should read --trunk--;
line 57, "trucks" should read --trunks--.

Col. 2, line 46, "H. f. May" should read --H. F. May--.

Col. 3, line 67, after "between" insert --network--.

Col. 4, line 18, "trucks" should read --trunks--;
line 37, "connection" should read --connections--;
line 75, "154" should read "154A".

Col. 5, line 41, after "103A." delete complete sentence --The communications system 106A and in the same manner employed by central control 101A to access call store 103A.--;
line 54, after "suboffice B" insert --serves as a data channel from processor 100B of suboffice B--.

Col. 6, line 63, "(order combing gates)" should read --(order combining gates)--.

Col. 8, line 38, after "specified" delete "for";
line 46, after "during" change "said" to --and--;
line 55, change "operation" to --operational--;
line 60, after "which are" delete "are";
line 70, after "during" change "are" to --and--.

Col. 14, line 5, "operand" should read --operands--.

Col. 15, line 1, after "of" insert --the--.

Col. 16, line 45, after "101" change "is" to --in--.

Col. 17, line 73, "manufacture" should read --manufacturer--.

FORM PO-1050 (10-69)

USCOMM-DC 60376-P69
* U.S. GOVERNMENT PRINTING OFFICE 1969 O-366-334

UNITED STATES PATENT OFFICE

CERTIFICATE OF CORRECTION

Patent No. 3,643,032 Dated February 15, 1972

Inventor(s) Werner Ulrich and Frank S. Vigilante

It is certified that error appears in the above-identified patent and that said Letters Patent are hereby corrected as shown below:

Col. 20, line 59, after "when a" insert --heavy--.

Col. 21, line 62, "TOUCH-TONE" should read --TOUCH-TONE®--;
line 63, "TOUCH-TONE" should read --TOUCH-TONE®--.

Col. 23, line 38, before "trunk" insert --a--.

Col. 27, line 29, after "FIG." change "a" to --9--.

Col. 28, line 28, change "transverse" to --traverse--;
line 47, after "hunting" change "fro" to --for--.

Col. 29, line 69, delete "A-B-C-BJ" and insert --A-B-C-J--.

Col. 30, line 43, "intersuboffice" should read --inter suboffice--;
line 60, "intersuboffice" should read --inter suboffice--;
line 61, "intersuboffice" should read --inter suboffice--.

Col. 32, line 56, "aofrenoted" should read --aforementioned--.

Col. 33, line 69, delete "A-B-C-BJ" and insert --A-B-C-J--.

Signed and sealed this 28th day of November 1972.

(SEAL)
Attest:

EDWARD M.FLETCHER,JR.
Attesting Officer

ROBERT GOTTSCHALK
Commissioner of Patents

USCOMM-DC 60376-P69
U.S. GOVERNMENT PRINTING OFFICE 1969 O-366-334